US012089274B2

(12) United States Patent
Cheng

(10) Patent No.: US 12,089,274 B2
(45) Date of Patent: Sep. 10, 2024

(54) RESUME OF DUAL CONNECTIVITY FROM SECONDARY NODE WITH DELTA CONFIGURATION

(71) Applicant: Qualcomm Incorporated, San Diego, CA (US)

(72) Inventor: Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 17/641,778

(22) PCT Filed: Sep. 11, 2020

(86) PCT No.: PCT/CN2020/114771
§ 371 (c)(1),
(2) Date: Mar. 9, 2022

(87) PCT Pub. No.: WO2021/047637
PCT Pub. Date: Mar. 18, 2021

(65) Prior Publication Data

US 2023/0164867 A1 May 25, 2023

(30) Foreign Application Priority Data

Sep. 13, 2019 (WO) ................ PCT/CN2019/105826

(51) Int. Cl.
*H04B 17/20* (2015.01)
*H04W 24/08* (2009.01)
(Continued)

(52) U.S. Cl.
CPC .......... *H04W 76/15* (2018.02); *H04B 17/252* (2023.05); *H04B 17/255* (2023.05);
(Continued)

(58) Field of Classification Search
CPC . H04B 7/02–12; H04B 17/0082–3913; H04W 8/22–245; H04W 24/02–10;
(Continued)

(56) References Cited

U.S. PATENT DOCUMENTS

2013/0196631 A1 8/2013 Vanderveen et al.
2019/0387420 A1 12/2019 Li et al.
(Continued)

FOREIGN PATENT DOCUMENTS

CN 106454910 A 2/2017
CN 108337695 A 7/2018
(Continued)

OTHER PUBLICATIONS

International Search Report and Written Opinion—PCT/CN2019/105826—ISA/EPO—Jun. 15, 2020.
(Continued)

*Primary Examiner* — Timothy J Weidner
(74) *Attorney, Agent, or Firm* — Holland & Hart LLP/Qualcomm Incorporated

(57) ABSTRACT

Generally, the described techniques provide for efficiently identifying a lower layer configuration for communicating in a dual connectivity mode after transitioning from an inactive state to a connected state. To efficiently identify the lower layer configuration, a UE operating in a dual connectivity mode may perform measurements on signals received from a master node, a secondary node, and other nearby nodes in an inactive state. Once the UE decides to transition back to a connected state, the UE may report the measurements and restore an original lower layer configuration used to communicate in a dual connectivity mode. The UE may then receive an indication of an updated lower layer configuration
(Continued)

as an offset of the original lower layer configuration, where the updated lower layer configuration may be based on the reported measurements.

30 Claims, 23 Drawing Sheets

(51) Int. Cl.

| | |
|---|---|
| ***H04W 24/10*** | (2009.01) |
| ***H04W 36/00*** | (2009.01) |
| ***H04W 60/00*** | (2009.01) |
| ***H04W 60/04*** | (2009.01) |
| ***H04W 76/15*** | (2018.01) |
| ***H04W 76/27*** | (2018.01) |
| ***H04W 84/02*** | (2009.01) |
| ***H04W 88/02*** | (2009.01) |
| ***H04W 88/08*** | (2009.01) |
| ***H04W 92/02*** | (2009.01) |
| ***H04W 92/10*** | (2009.01) |

(52) U.S. Cl.

CPC .......... *H04W 24/08* (2013.01); *H04W 24/10* (2013.01); *H04W 36/0064* (2023.05); *H04W 36/0069* (2018.08); *H04W 60/005* (2013.01); *H04W 60/04* (2013.01); *H04W 76/27* (2018.02); *H04W 84/02* (2013.01); *H04W 88/02* (2013.01); *H04W 88/08* (2013.01); *H04W 92/02* (2013.01); *H04W 92/10* (2013.01)

(58) Field of Classification Search

CPC .......... H04W 28/02–26; H04W 36/0005–385; H04W 48/02–20; H04W 60/005–06; H04W 72/02–569; H04W 74/002–0891; H04W 76/10–50; H04W 84/02–16; H04W 88/02–12; H04W 92/02–04; H04W 92/10

See application file for complete search history.

(56) References Cited

U.S. PATENT DOCUMENTS

| | | | | |
|---|---|---|---|---|
| 2020/0128422 | A1 | 4/2020 | Kim et al. | |
| 2022/0182868 | A1* | 6/2022 | Rugeland | H04W 76/15 |
| 2024/0032135 | A1* | 1/2024 | Cheng | H04W 76/15 |

FOREIGN PATENT DOCUMENTS

| | | | | |
|---|---|---|---|---|
| CN | 109756994 | A | 5/2019 | |
| CN | 109803282 | A | 5/2019 | |
| CN | 110035495 | A | 7/2019 | |
| EP | 3322254 | A1 | 5/2018 | |
| WO | WO-2018236172 | A1 | 12/2018 | |
| WO | WO-2019099550 | A1 * | 5/2019 | H04W 76/15 |

OTHER PUBLICATIONS

International Search Report and Written Opinion—PCT/CN2020/114771—ISA/EPO—Dec. 1, 2020.

CATT: "Consideration on SCG Configuration Methods During RRC Resume", 3GPP TSG-RAN WG2 Meeting #107, R2-1908900, 3rd Generation Partnership Project, Mobile Competence Centre, 650, Route Des Lucioles, F-06921 Sophia-Antipolis Cedex, France, vol. RAN WG2, No. Prague, Czech, Aug. 26, 2019-Aug. 30, 2019, Aug. 16, 2019, XP051766718, 4 pages.

Ericsson (Rapporteur): "Summary of Email Discussion [106#38][NR/DCCA]: SCG and MCG Well Configuration with RRC Resume", 3GPP TSG-RAN WG2 #107, R2-1910291, 3rd Generation Partnership Project, Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 15, 2019, XP051768070, 17 pages.

Supplementary European Search Report—EP20862395—Search Authority—Berlin—Sep. 8, 2023.

* cited by examiner

RESUME OF DUAL CONNECTIVITY FROM SECONDARY NODE WITH DELTA CONFIGURATION

CROSS REFERENCE TO RELATED APPLICATIONS

The present Application is a 371 national stage filing of International PCT Application No. PCT/CN2020/114771 by CHENG, entitled "RESUME OF DUAL CONNECTIVITY FROM SECONDARY NODE WITH DELTA CONFIGURATION," filed Sep. 11, 2020; and claims priority to International Patent Application No. PCT/CN2019/105826 by CHENG, entitled "RESUME OF DUAL CONNECTIVITY FROM SECONDARY NODE WITH DELTA CONFIGURATION," filed Sep. 13, 2019, each of which is assigned to the assignee hereof, and each of which is expressly incorporated by reference in its entirety herein.

BACKGROUND

The following relates generally to wireless communications and more specifically to resume of dual connectivity from secondary node with delta configuration.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a UE may operate in a dual connectivity mode where the UE may be connected to and may communicate with a master node and a secondary node simultaneously. The master node may be associated with a primary cell (PCell) and secondary cells (SCells) in a master cell group (MCG), and the secondary node may be associated with a primary SCell (PSCell) and other SCells in a secondary cell group (SCG). In some cases, it may be appropriate for a UE operating in a dual connectivity mode to transition to an inactive state (e.g., when projected data traffic is low). In such cases, it may be challenging for the UE to resume communications in the dual connectivity mode when the UE transitions back to a connected state.

SUMMARY

The described techniques relate to improved methods, systems, devices, and apparatuses that support resume of dual connectivity from secondary node with delta configuration. Generally, the described techniques provide for efficiently identifying a lower layer master cell group (MCG) and secondary cell group (SCG) configuration for communicating in a dual connectivity mode after transitioning from an inactive state to a connected state. To efficiently identify the lower layer MCG and SCG configuration, a UE operating in a dual connectivity mode may perform measurements on signals received from a master node, a secondary node, and other nearby nodes in an inactive state. Once the UE decides to transition back to a connected state, the UE may report the measurements and restore an original lower layer MCG and SCG configuration used to communicate in a dual connectivity mode. The UE may then receive an indication of an updated lower layer MCG and SCG configuration as an offset of the original lower layer MCG and SCG configuration, where the updated lower layer MCG and SCG configuration may be based on the reported measurements.

A method of wireless communication at a UE is described. The method may include communicating with a master node and a secondary node in a dual-connectivity mode using a first lower layer configuration, performing, after transitioning to an inactive state, cell quality measurements on signals received from the master node and the secondary node, determining that the cell quality measurements satisfy one or more thresholds, determining to transition from the inactive state to a connected state to resume communications in the dual-connectivity mode, reporting the cell quality measurements performed on the signals received from the master node and the secondary node, and receiving an indication of a second lower layer configuration for communicating in the dual-connectivity mode based on the reporting, the second lower layer configuration being indicated as an offset of the first lower layer configuration.

An apparatus for wireless communication at a UE is described. The apparatus may include a processor, memory coupled with the processor, and instructions stored in the memory. The instructions may be executable by the processor to cause the apparatus to communicate with a master node and a secondary node in a dual-connectivity mode using a first lower layer configuration, perform, after transitioning to an inactive state, cell quality measurements on signals received from the master node and the secondary node, determine that the cell quality measurements satisfy one or more thresholds, determine to transition from the inactive state to a connected state to resume communications in the dual-connectivity mode, report the cell quality measurements performed on the signals received from the master node and the secondary node, and receive an indication of a second lower layer configuration for communicating in the dual-connectivity mode based on the reporting, the second lower layer configuration being indicated as an offset of the first lower layer configuration.

Another apparatus for wireless communication at a UE is described. The apparatus may include means for communicating with a master node and a secondary node in a dual-connectivity mode using a first lower layer configuration, performing, after transitioning to an inactive state, cell quality measurements on signals received from the master node and the secondary node, determining that the cell quality measurements satisfy one or more thresholds, determining to transition from the inactive state to a connected state to resume communications in the dual-connectivity mode, reporting the cell quality measurements performed on the signals received from the master node and the secondary node, and receiving an indication of a second lower layer configuration for communicating in the dual-connectivity mode based on the reporting, the second lower layer configuration being indicated as an offset of the first lower layer configuration.

A non-transitory computer-readable medium storing code for wireless communication at a UE is described. The code may include instructions executable by a processor to communicate with a master node and a secondary node in a dual-connectivity mode using a first lower layer configuration, perform, after transitioning to an inactive state, cell quality measurements on signals received from the master node and the secondary node, determine that the cell quality measurements satisfy one or more thresholds, determine to transition from the inactive state to a connected state to resume communications in the dual-connectivity mode, report the cell quality measurements performed on the signals received from the master node and the secondary node, and receive an indication of a second lower layer configuration for communicating in the dual-connectivity mode based on the reporting, the second lower layer configuration being indicated as an offset of the first lower layer configuration.

In some examples of the method, apparatuses, and non-transitory computer-readable medium described herein, receiving the indication of the second lower layer configuration for communicating in the dual-connectivity mode may include operations, features, means, or instructions for receiving an indication of the offset of the first lower layer configuration, and determining the second lower layer configuration based on the first lower layer configuration and the offset of the first lower layer configuration. Some examples of the method, apparatuses, and non-transitory computer-readable medium described herein may further include operations, features, means, or instructions for receiving a resume message indicating that the UE may be to restore the first lower layer configuration for communicating in the dual-connectivity mode, and restoring the first lower layer configuration as a baseline configuration for communicating in the dual-connectivity mode.

In some examples of the method, apparatuses, and non-transitory computer-readable medium described herein, the offset of the first lower layer configuration used to indicate the second lower layer configuration may be based on the reported cell quality measurements. Some examples of the method, apparatuses, and non-transitory computer-readable medium described herein may further include operations, features, means, or instructions for receiving a release message prompting the UE to transition to the inactive state, where the release message indicates the one or more thresholds, a first resume identifier for indicating that the cell quality measurements fail to satisfy the one or more thresholds, and a second resume identifier for indicating that the cell quality measurements satisfy the one or more thresholds.

Some examples of the method, apparatuses, and non-transitory computer-readable medium described herein may further include operations, features, means, or instructions for transmitting, to the master node or the secondary node, a resume request message with the second resume identifier that indicates that the cell quality measurements satisfy the one or more thresholds. In some examples of the method, apparatuses, and non-transitory computer-readable medium described herein, the resume request message may be transmitted to the master node, and where the indication of the second lower layer configuration may be received from the master node. In some examples of the method, apparatuses, and non-transitory computer-readable medium described herein, the resume request message may be transmitted to the secondary node, and where the indication of the second lower layer configuration may be received from the secondary node.

Some examples of the method, apparatuses, and non-transitory computer-readable medium described herein may further include operations, features, means, or instructions for receiving an indication to switch the secondary node to a new master node and the master node to a new secondary node for subsequent communications in the dual-connectivity mode. Some examples of the method, apparatuses, and non-transitory computer-readable medium described herein may further include operations, features, means, or instructions for performing additional cell quality measurements on signals received from another node, reporting the additional cell quality measurements performed on the signals received from the other node to the secondary node, and receiving an indication to add the other node as a new secondary node or as a new master node based on reporting the additional cell quality measurements.

In some examples of the method, apparatuses, and non-transitory computer-readable medium described herein, the one or more thresholds include reference signal received power thresholds, reference signal received quality thresholds, or both, and the cell quality measurements include reference signal received power measurements, reference signal received quality measurements, or both. In some examples of the method, apparatuses, and non-transitory computer-readable medium described herein, the one or more thresholds include a single threshold for both the master node and the secondary node or separate thresholds for the master node and the secondary node. In some examples of the method, apparatuses, and non-transitory computer-readable medium described herein, the second lower layer configuration includes a master cell group and secondary cell group configuration and an indication to activate a secondary cell group.

A method of wireless communication at a master node is described. The method may include communicating with a UE operating in a dual-connectivity mode in accordance with a first lower layer configuration, transmitting a release message prompting the UE to transition from a connected state to an inactive state, receiving a report of cell quality measurements performed by the UE in the inactive state, where the report is received as part of a procedure used by the UE to transition back to the connected state, and transmitting an indication of a second lower layer configuration for the UE to use for communicating in the dual-connectivity mode based on receiving the report, the second lower layer configuration being indicated as an offset of the first lower layer configuration.

An apparatus for wireless communication at a master node is described. The apparatus may include a processor, memory coupled with the processor, and instructions stored in the memory. The instructions may be executable by the processor to cause the apparatus to communicate with a UE operating in a dual-connectivity mode in accordance with a first lower layer configuration, transmit a release message prompting the UE to transition from a connected state to an inactive state, receive a report of cell quality measurements performed by the UE in the inactive state, where the report is received as part of a procedure used by the UE to transition back to the connected state, and transmit an indication of a second lower layer configuration for the UE to use for communicating in the dual-connectivity mode based on receiving the report, the second lower layer configuration being indicated as an offset of the first lower layer configuration.

Another apparatus for wireless communication at a master node is described. The apparatus may include means for communicating with a UE operating in a dual-connectivity mode in accordance with a first lower layer configuration, transmitting a release message prompting the UE to transition from a connected state to an inactive state, receiving a report of cell quality measurements performed by the UE in the inactive state, where the report is received as part of a procedure used by the UE to transition back to the connected state, and transmitting an indication of a second lower layer configuration for the UE to use for communicating in the dual-connectivity mode based on receiving the report, the second lower layer configuration being indicated as an offset of the first lower layer configuration.

A non-transitory computer-readable medium storing code for wireless communication at a master node is described. The code may include instructions executable by a processor to communicate with a UE operating in a dual-connectivity mode in accordance with a first lower layer configuration, transmit a release message prompting the UE to transition from a connected state to an inactive state, receive a report of cell quality measurements performed by the UE in the inactive state, where the report is received as part of a procedure used by the UE to transition back to the connected state, and transmit an indication of a second lower layer configuration for the UE to use for communicating in the dual-connectivity mode based on receiving the report, the second lower layer configuration being indicated as an offset of the first lower layer configuration.

In some examples of the method, apparatuses, and non-transitory computer-readable medium described herein, transmitting the indication of the second lower layer configuration may include operations, features, means, or instructions for transmitting an indication of the offset of the first lower layer configuration. Some examples of the method, apparatuses, and non-transitory computer-readable medium described herein may further include operations, features, means, or instructions for receiving an indication that cell quality measurements performed by the UE in the inactive state satisfy the one or more thresholds, and transmitting a resume message indicating that the UE may be to restore the first lower layer configuration as a baseline configuration for communicating in the dual-connectivity mode based on receiving the indication.

Some examples of the method, apparatuses, and non-transitory computer-readable medium described herein may further include operations, features, means, or instructions for transmitting, in the release message, an indication of the one or more thresholds, an indication of a first resume identifier for indicating that the cell quality measurements fail to satisfy the one or more thresholds, and an indication of a second resume identifier for indicating that the cell quality measurements satisfy the one or more thresholds. In some examples of the method, apparatuses, and non-transitory computer-readable medium described herein, receiving the indication that the cell quality measurements satisfy the one or more thresholds may include operations, features, means, or instructions for receiving a resume request message with the second resume identifier that indicates that the cell quality measurements satisfy the one or more thresholds.

In some examples of the method, apparatuses, and non-transitory computer-readable medium described herein, the offset of the first lower layer configuration used to indicate the second lower layer configuration may be based on the reported cell quality measurements. In some examples of the method, apparatuses, and non-transitory computer-readable medium described herein, transmitting the indication of the second lower layer configuration may include operations, features, means, or instructions for transmitting the indication of the second lower layer configuration to a secondary node on a split signaling radio bearer one (SRB1) for forwarding to the UE on the split SRB1.

In some examples of the method, apparatuses, and non-transitory computer-readable medium described herein, transmitting the indication of the second lower layer configuration may include operations, features, means, or instructions for transmitting the indication of the second lower layer configuration to a secondary node in a configuration message for forwarding to the UE on a signaling radio bearer three (SRB3). In some examples of the method, apparatuses, and non-transitory computer-readable medium described herein, receiving the report of the cell quality measurements may include operations, features, means, or instructions for receiving the report of the cell quality measurements from a secondary node on a split signaling radio bearer one (SRB1).

In some examples of the method, apparatuses, and non-transitory computer-readable medium described herein, receiving the report of the cell quality measurements may include operations, features, means, or instructions for receiving the report of the cell quality measurements from a secondary node in a transfer control message, where the report may be encoded with a radio resource control format of the master node. Some examples of the method, apparatuses, and non-transitory computer-readable medium described herein may further include operations, features, means, or instructions for determining to perform a handover from the master node to another node based on the reported cell quality measurements performed by the UE, and transmitting a handover request message to the other node to perform the handover from the master node to the other node, the handover request message including the first lower layer configuration.

A method of wireless communication at a secondary node is described. The method may include communicating with a UE operating in a dual-connectivity mode in accordance with a first lower layer configuration, receiving a report of cell quality measurements performed by the UE in an inactive state, where the indication is received as part of a procedure used by the UE to transition from the inactive state to a connected state, and transmitting an indication of a second lower layer configuration for the UE to use for communicating in the dual-connectivity mode based on receiving the cell quality measurements, the second lower layer configuration being indicated as an offset of the first lower layer configuration.

An apparatus for wireless communication at a secondary node is described. The apparatus may include a processor, memory coupled with the processor, and instructions stored in the memory. The instructions may be executable by the processor to cause the apparatus to communicate with a UE operating in a dual-connectivity mode in accordance with a first lower layer configuration, receive a report of cell quality measurements performed by the UE in an inactive state, where the indication is received as part of a procedure used by the UE to transition from the inactive state to a connected state, and transmit an indication of a second lower layer configuration for the UE to use for communicating in the dual-connectivity mode based on receiving the cell quality measurements, the second lower layer configuration being indicated as an offset of the first lower layer configuration.

Another apparatus for wireless communication at a secondary node is described. The apparatus may include means for communicating with a UE operating in a dual-connectivity mode in accordance with a first lower layer configuration, receiving a report of cell quality measurements performed by the UE in an inactive state, where the indication is received as part of a procedure used by the UE to transition from the inactive state to a connected state, and transmitting an indication of a second lower layer configuration for the UE to use for communicating in the dual-connectivity mode based on receiving the cell quality measurements, the second lower layer configuration being indicated as an offset of the first lower layer configuration.

A non-transitory computer-readable medium storing code for wireless communication at a secondary node is described. The code may include instructions executable by a processor to communicate with a UE operating in a dual-connectivity mode in accordance with a first lower layer configuration, receive a report of cell quality measurements performed by the UE in an inactive state, where the indication is received as part of a procedure used by the UE to transition from the inactive state to a connected state, and transmit an indication of a second lower layer configuration for the UE to use for communicating in the dual-connectivity mode based on receiving the cell quality measurements, the second lower layer configuration being indicated as an offset of the first lower layer configuration.

In some examples of the method, apparatuses, and non-transitory computer-readable medium described herein, transmitting the indication of the second lower layer configuration may include operations, features, means, or instructions for transmitting an indication of the offset of the first lower layer configuration. Some examples of the method, apparatuses, and non-transitory computer-readable medium described herein may further include operations, features, means, or instructions for receiving an indication that cell quality measurements performed by the UE in the inactive state satisfy the one or more thresholds, and transmitting a resume message indicating that the UE may be to restore the first lower layer configuration as a baseline configuration for communicating in the dual-connectivity mode based on receiving the indication.

In some examples of the method, apparatuses, and non-transitory computer-readable medium described herein, receiving the indication that the cell quality measurements satisfy the one or more thresholds may include operations, features, means, or instructions for receiving a resume request message with a resume identifier that indicates that the cell quality measurements satisfy the one or more thresholds. In some examples of the method, apparatuses, and non-transitory computer-readable medium described herein, the offset of the first lower layer configuration used to indicate the second lower layer configuration may be based on the reported cell quality measurements.

Some examples of the method, apparatuses, and non-transitory computer-readable medium described herein may further include operations, features, means, or instructions for transmitting, to a master node, a request for switching the secondary node or another node to a new master node and switching the master node to a new secondary node, and receiving, from the master node, a configuration for switching the secondary node or the other node to the new master node and switching the master node to the new secondary node. In some examples of the method, apparatuses, and non-transitory computer-readable medium described herein, transmitting the indication of the second lower layer configuration may include operations, features, means, or instructions for determining the second lower layer configuration based on the reported cell quality measurements, and transmitting the indication of the second lower layer configuration to the UE based on the determining.

Some examples of the method, apparatuses, and non-transitory computer-readable medium described herein may further include operations, features, means, or instructions for determining to perform a handover from the master node to the other node based on the reported cell quality measurements performed by the UE, and transmitting a handover request message to the other node to perform the handover from the master node to the other node, the handover request message including the first lower layer configuration.

In some examples of the method, apparatuses, and non-transitory computer-readable medium described herein, transmitting the indication of the second lower layer configuration may include operations, features, means, or instructions for receiving the indication of the second lower layer configuration from a master node on a split signaling radio bearer one (SRB1), and forwarding the indication of the second lower layer configuration to the UE on the split SRB1. In some examples of the method, apparatuses, and non-transitory computer-readable medium described herein, transmitting the indication of the second lower layer configuration may include operations, features, means, or instructions for receiving the indication of the second lower layer configuration from a master node in a configuration message, and transmitting the indication of the second lower layer configuration to the UE on a signaling radio bearer three (SRB3).

Some examples of the method, apparatuses, and non-transitory computer-readable medium described herein may further include operations, features, means, or instructions for transmitting the report of the cell quality measurements to a master node on a split signaling radio bearer one (SRB1) or in a transfer control message. Some examples of the method, apparatuses, and non-transitory computer-readable medium described herein may further include operations, features, means, or instructions for transmitting the report of the cell quality measurements to a master node in a transfer control message, where the report may be encoded with a radio resource control format of the master node.

DETAILED DESCRIPTION

Figure 1:
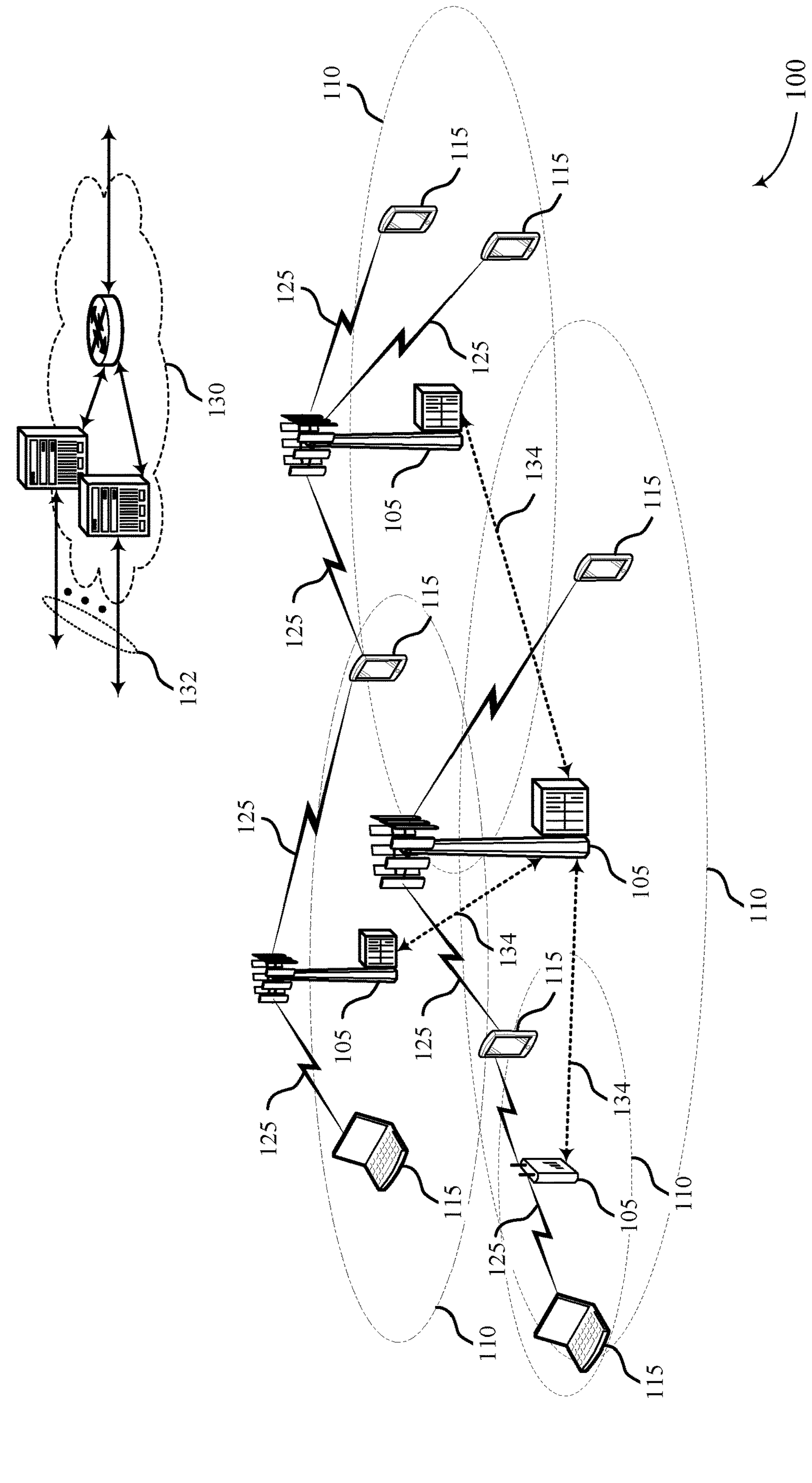
FIG. 1 illustrates an example of a wireless communications system that supports resume of dual connectivity from secondary node with delta configuration in accordance with aspects of the present disclosure.

In some wireless communications systems, a user equipment (UE) may be configured to transition to different states depending on the level of activity at the UE. For instance, the UE may support a connected state where the UE may be actively communicating with one or more cells, an inactive state where the UE may achieve some power savings while being able to quickly transition back to a connected state (e.g., when necessary), and an idle state where the UE may achieve maximum power savings. In such systems, when a UE decides to transition to an inactive state, the UE and the network (e.g., radio access network (RAN)) may save the UE context to enable faster transition to the connected mode. That is, the UE and the RAN may store configurations for communicating in the connected mode.

Because the UE context may be stored, the UE may not have to be reconfigured when the UE transitions back to a connected state for communications with one or more cells. In some cases, however, some configurations (e.g., lower layer configurations) may depend on the radio conditions associated with communications with a network. For instance, in a dual connectivity deployment, the lower layer master cell group (MCG) and secondary cell group (SCG) configurations may depend on the radio conditions. In such cases, since the radio conditions may change over the period of time that the UE is in an inactive state, these configurations may not be suitable for communications once the UE transitions back to a connected state. Thus, in some systems, a UE may be configured to release lower layer MCG and SCG configurations upon transitioning to an inactive state, and the UE may be reconfigured upon transitioning back to a connected state. However, such reconfiguration may result in increased latency which may be detrimental to a wireless communications system.

As described herein, a UE may support efficient techniques for identifying a lower layer MCG and SCG configuration for communicating in a dual connectivity mode after transitioning from an inactive state to a connected state. In particular, the UE may perform measurements on signals received from a master node, a secondary node, and other nearby nodes while in an inactive state. Once the UE decides to transition back to a connected state, the UE may report the measurements and restore an original lower layer MCG and SCG configuration used to communicate in a dual connectivity mode. The UE may then receive an indication of an updated lower layer MCG and SCG configuration as an offset of the original lower layer MCG and SCG configuration, where the updated lower layer MCG and SCG configuration may be based on the reported measurements. Because the updated lower layer MCG and SCG configuration may be indicated as an offset (or delta) of an original lower layer MCG and SCG configuration, the latency associated with reconfiguring the UE for operating in the dual connectivity mode may be minimal.

Aspects of the disclosure introduced above are described below in the context of a wireless communications system. Examples of processes and signaling exchanges that support resume of dual connectivity from secondary node with delta configuration are then described. Aspects of the disclosure are further illustrated by and described with reference to apparatus diagrams, system diagrams, and flowcharts that relate to resume of dual connectivity from secondary node with delta configuration.

FIG. 1 illustrates an example of a wireless communications system 100 that supports resume of dual connectivity from secondary node with delta configuration in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

UEs 115 in wireless communications system 100 may support dual connectivity. For example, the UEs 115 may support single radio access technology (single-RAT) dual connectivity where a UE 115 may communicate with multiple nodes associated with the same RAT, and multi-RAT dual connectivity (MR-DC) where a UE 115 may communicate with multiple nodes associated with different RATs. MR-DC may include evolved universal terrestrial radio access (EUTRA) and NR dual connectivity (EN-DC), NR and EUTRA dual connectivity (NE-DC), next generation RAN and EUTRA dual connectivity (NGEN-DC), and NR dual connectivity (NR-DC). A UE 115 operating in a dual connectivity mode may be connected to and may communicate with a master node and a secondary node simultaneously on a signaling radio bearer (SRB) one (SRB1), a split SRB1, or an SRB3.

Figure 2:
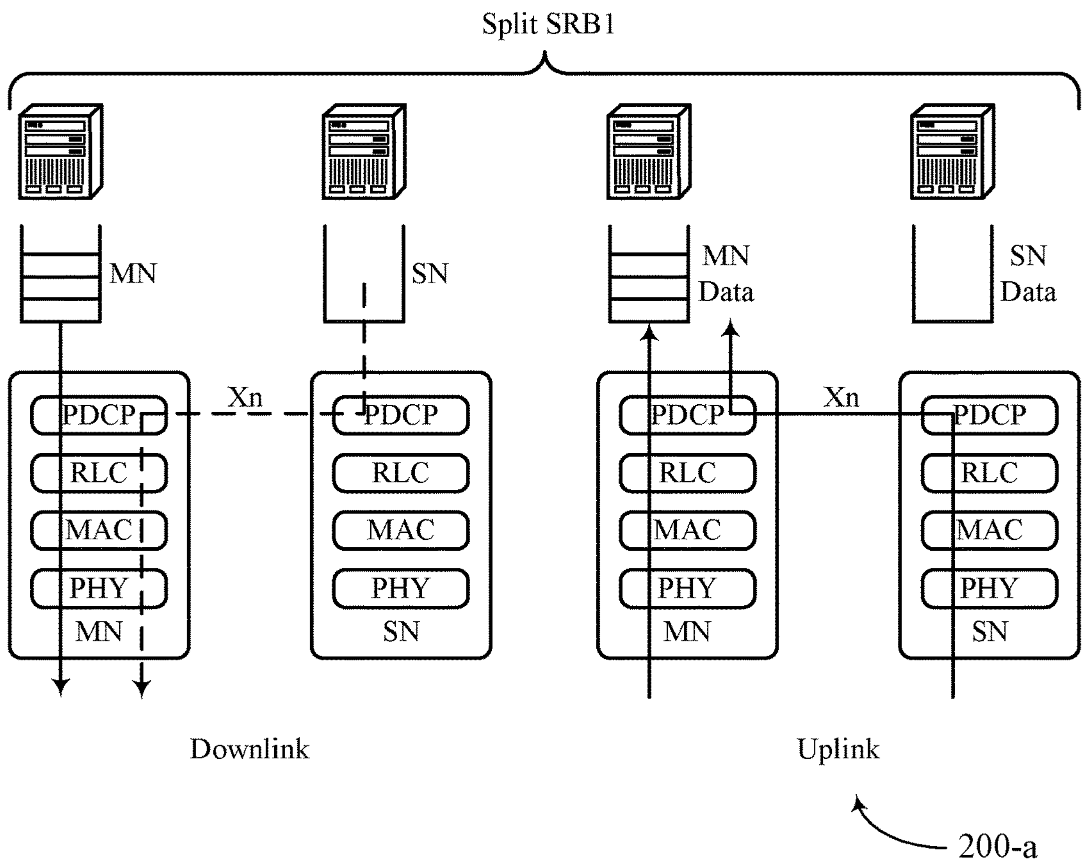
FIG. 2 illustrates an example of communications in a dual connectivity mode in accordance with aspects of the present disclosure.
Figure 2:
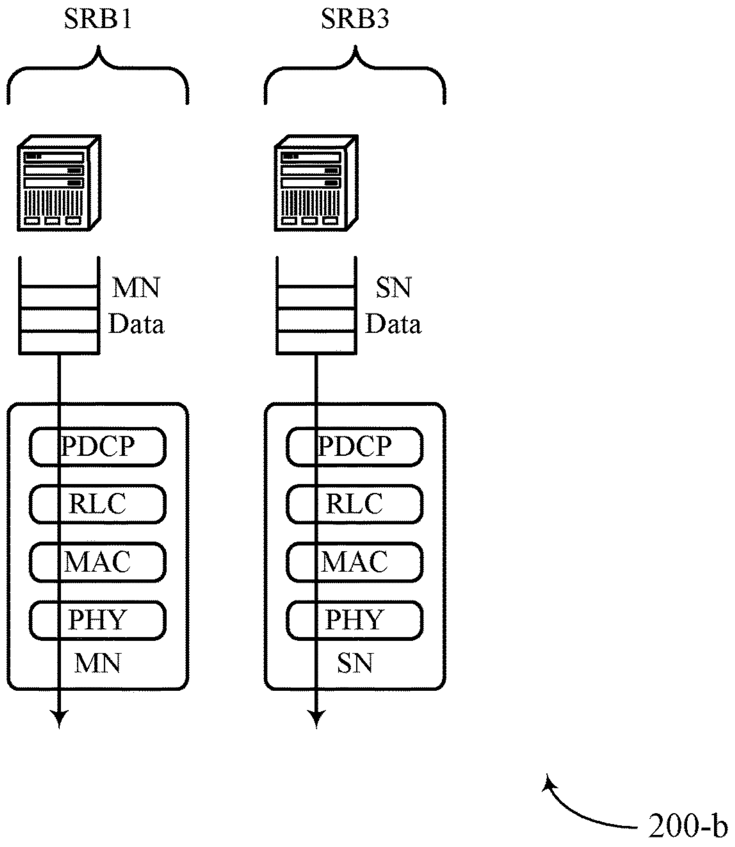

FIG. 2 illustrates an example of communications 200 in a dual connectivity mode in accordance with aspects of the present disclosure. In a first example 200-*a*, for downlink communications, a UE 115 may receive data or control information directly from a master node on a split SRB1 and indirectly from a secondary node on a split SRB1. Alternatively, for uplink communications, a UE 115 may transmit data or control information directly to a master node on a split SRB1 and indirectly to the master node (e.g., through a secondary node) on a split SRB1. In a second example 200-*b*, a UE 115 may communicate directly with a master node on an SRB1 and the UE may communicate directly with a secondary node on an SRB3.

In addition to dual connectivity, UEs 115 in wireless communications system 100 may support operation in different states to facilitate power savings. For instance, a UE 115 may support a connected state where the UE 115 may be actively communicating with one or more cells, an inactive state where the UE 115 may achieve some power savings while being able to quickly transition back to a connected state (e.g., when necessary), and an idle state where the UE 115 may achieve maximum power savings.

Figure 3:
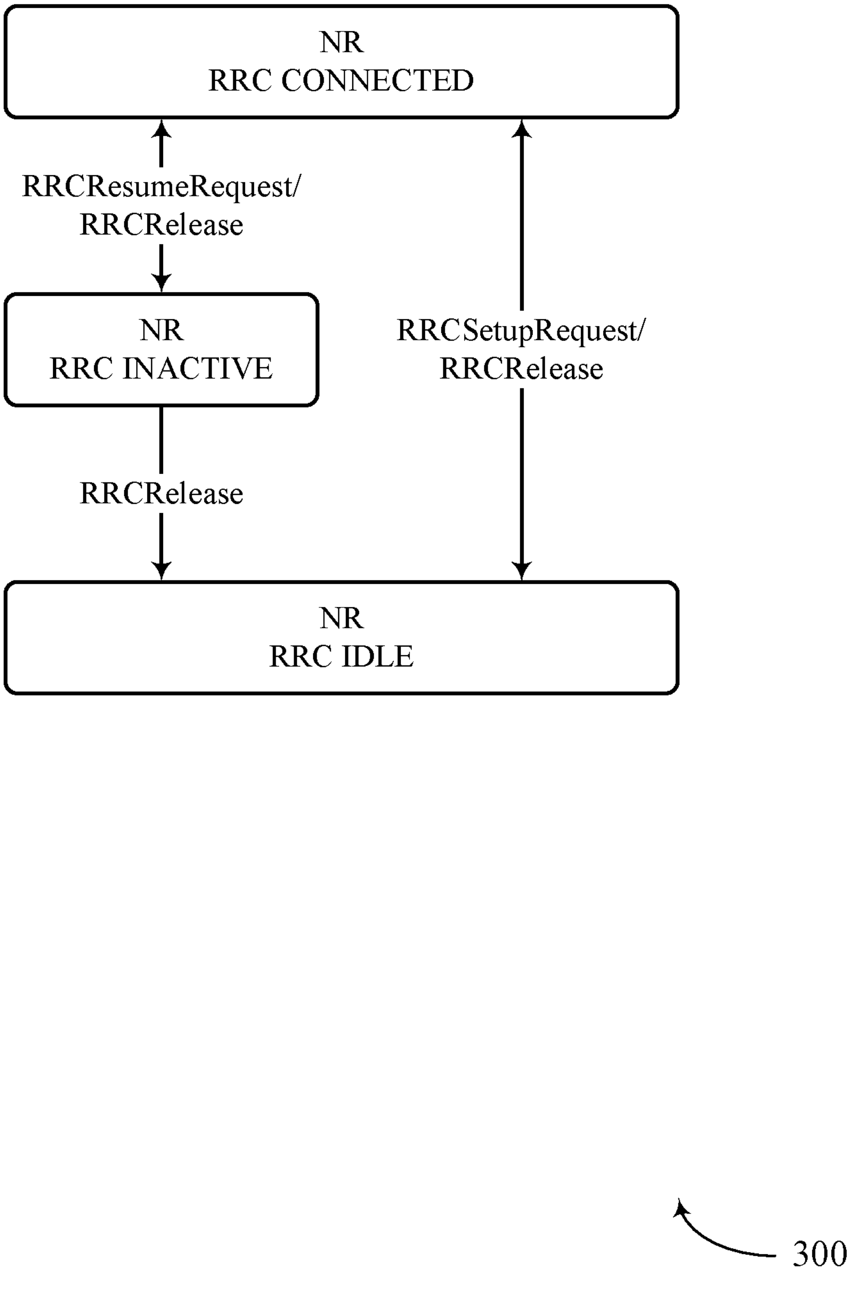
FIG. 3 illustrates an example of different states supported by a user equipment (UE) in a wireless communications system in accordance with aspects of the present disclosure.

FIG. 3 illustrates an example of different states 300 supported by a UE 115 in wireless communications system 100 in accordance with aspects of the present disclosure. In the example of FIG. 3, a UE 115 in a connected state may receive an RRC release message indicating that the UE 115 is to transition to an RRC inactive state or an RRC idle state. Similarly, a UE 115 in an RRC inactive state may receive an RRC release message indicating that the UE 115 is to transition to an RRC idle state. Alternatively, a UE 115 in an RRC idle state may receive an RRC setup request indicating that the UE 115 is to transition to an RRC connected state, or a UE 115 in an RRC inactive state may receive an RRC resume message indicating that the UE 115 is to transition to an RRC connected state.

To enable a fast transition to a connected state from an inactive state, a UE 115 and cells with which the UE 115 is communicating in a network may save the UE context prior to the UE 115 transitioning to the inactive state. As such, the UE may not have to be reconfigured when the UE transitions back to a connected state. In some cases, however, some configurations (e.g., lower layer configurations) may depend on radio conditions, and radio conditions may change over the period of time that a UE 115 is in an inactive state. In such cases, stored configurations may not be suitable for communications once the UE transitions back to a connected state.

Thus, in some systems, a UE may be configured to release lower layer configurations upon transitioning to an inactive state. For instance, a UE operating in a dual connectivity mode may store the PDCP or service data adaptation protocol (SDAP) configuration (e.g., of both the MCG and SCG) when transitioning to an inactive state, and the UE may release lower layer MCG and SCG configurations. The UE may then apply the stored PDCP or SDAP configuration (of both the MCG and the SCG) as in NR-standalone or NR-LTE deployments, and the UE may be reconfigured with new lower layer configurations when the UE transitions back to a connected state. However, such reconfiguration may result in increased latency which may be detrimental to a wireless communications system.

Figure 4:
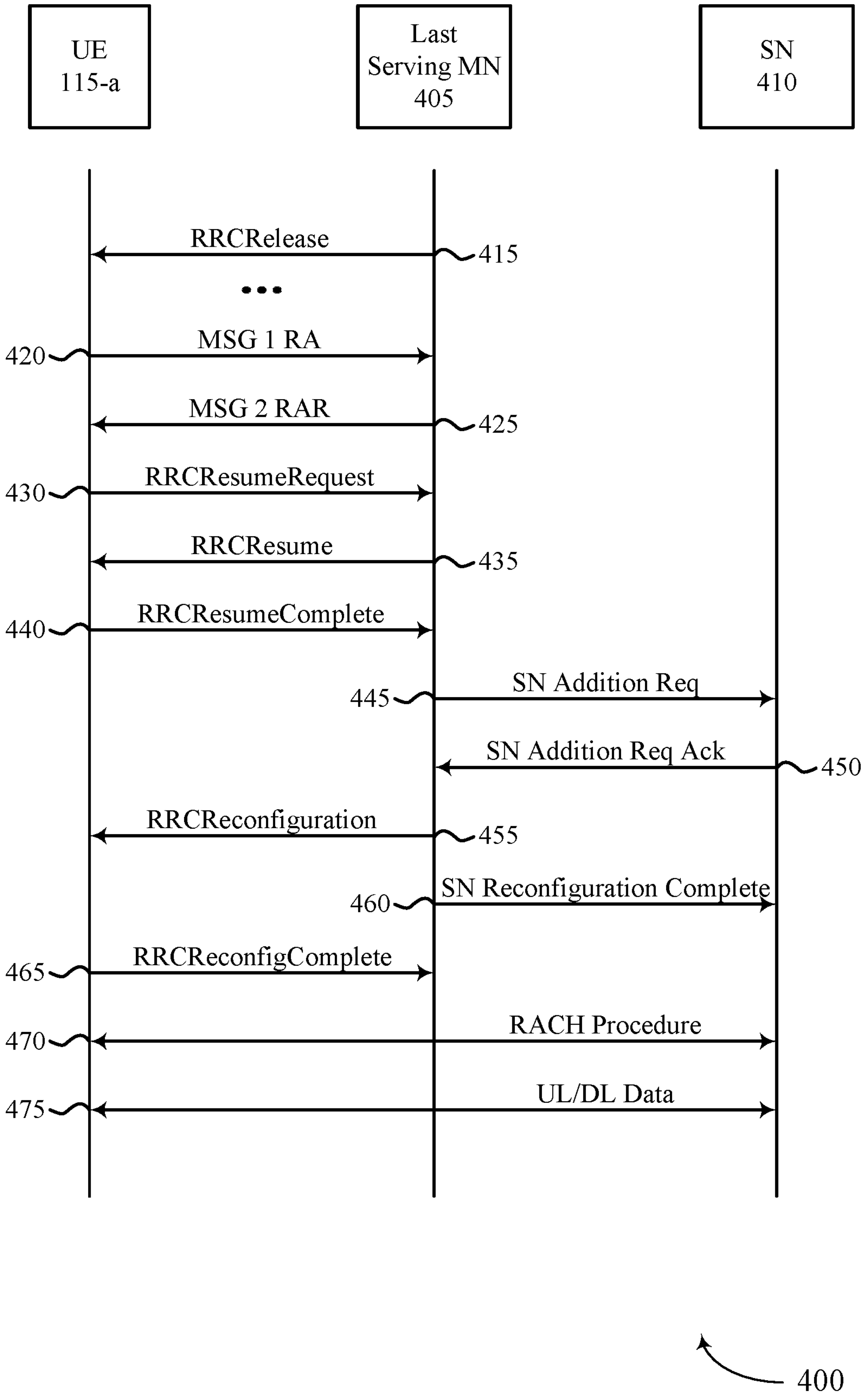
FIG. 4 illustrates an example of a process flow where a UE is reconfigured with new lower layer master cell group (MCG) and secondary cell group (SCG) configurations upon transitioning from an inactive state to a connected state.

FIG. 4 illustrates an example of a process flow 400 where a UE is reconfigured with new lower layer MCG and SCG configurations upon transitioning from an inactive state to a connected state. At 415, a UE 115-*a* may receive an RRC release message indicating that the UE 115-*a* is to transition to an inactive state. The RRC release message may include a measurement configuration (e.g., including potential secondary node frequencies) which the UE 115-*a* may use to perform measurements (e.g., early measurements) in the inactive state. After some time in the inactive state, the UE 115-*a* may decide to transition back to a connected state. Accordingly, at 420, UE 115-*a* may transmit a physical random access channel (PRACH) preamble in a first random access message to the master node 405, and, at 425, UE 115-*a* may receive a random access response (RAR) in a second random access message from the master node 405.

At 430, UE 115-*a* may transmit an RRC resume request in a third random access message to master node 405, at 435, UE 115-*a* may receive an RRC resume message including a request for measurement reporting in a fourth random access message from master node 405. At 440, UE 115-*a* may then transmit an RRC resume complete message to master node 405 including layer three measurement reports (e.g., for measurements performed based on the measurement configuration received at 415). At 445, master node 405 may transmit a secondary node addition request to secondary node 410 to include secondary node 410 in a dual connectivity configuration, and, at 450, secondary node 410 may transmit a secondary node addition request acknowledgment to master node 405.

At 455, master node 405 may transmit an RRC reconfiguration to UE 115-*a* carrying a secondary node RRC configuration, and, at 460, master node 405 may transmit a secondary node reconfiguration complete message to secondary node 410. UE 115-*a* may then transmit an RRC reconfiguration complete message to master node 405. Subsequently, at 470, UE 115-*a* may perform a random access procedure to gain access to secondary node 410, and, at 475, UE 115-*a* may transmit data to or receive data from secondary node 410.

In the above procedure, because the UE 115-*a* may release the lower layer MCG and SCG configurations upon transitioning to an inactive state, the UE 115 may be reconfigured with entirely new MCG and SCG configurations upon transitioning back to a connected state. As described with reference to FIG. 3, such reconfiguration may result in increased latency which may be detrimental to a wireless communications system. A UE 115 in wireless communications system 100 may support efficient techniques for identifying a lower layer MCG and SCG configuration for communicating in a dual connectivity mode after transitioning from an inactive state to a connected state.

Figure 5:
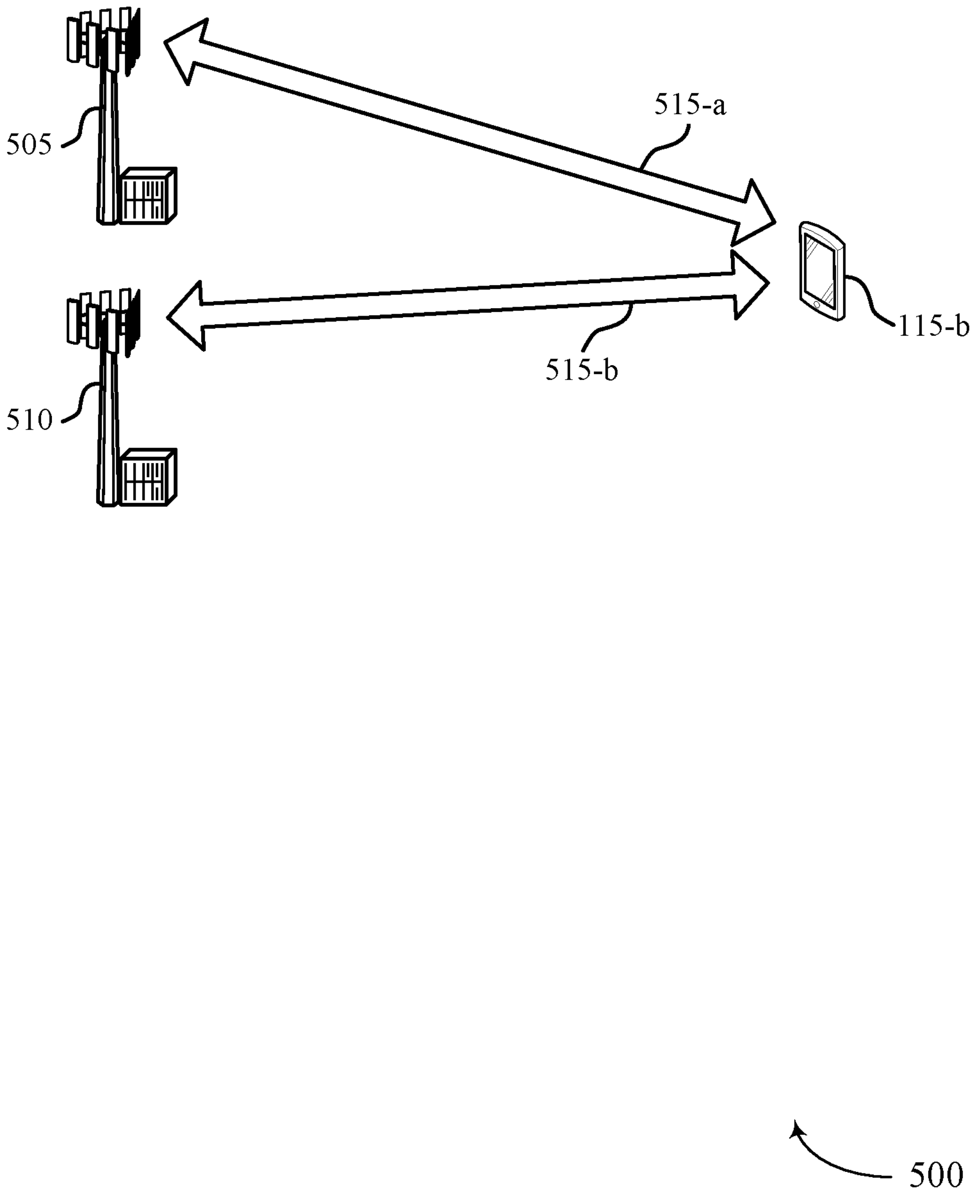
FIG. 5 illustrates an example of a wireless communications system that supports resume of dual connectivity from secondary node with delta configuration in accordance with aspects of the present disclosure.

FIG. 5 illustrates an example of a wireless communications system 500 that supports resume of dual connectivity from secondary node with delta configuration in accordance with aspects of the present disclosure. Wireless communications system 500 includes master node 505 and secondary node 510, which may be examples of a base station 105 described with reference to FIG. 1. Wireless communications system 500 also includes UE 115-*b*, which may be an example of a UE 115 described with reference to FIG. 1. Master node 505 may communicate with UE 115-*b* on one or more carriers 515-*a*, and secondary node 510 may communicate with UE 115-*b* on one or more carriers 515-*b*. Wireless communications system 500 may implement aspects of wireless communications system 100. For example, UE 115-*a* in wireless communications system 500 may support efficient techniques for identifying a lower layer MCG and SCG configuration for communicating in a dual connectivity mode after transitioning from an inactive state to a connected state.

In the example of FIG. 5, UE 115-*b* may communicate with master node 505 and secondary node 510 in a dual connectivity mode using a first lower layer MCG and SCG configuration. After some time, UE 115-*b* may decide to transition to an inactive state to save power, and master node 505 may transmit a release message to UE 115-*b* prompting UE 115-*b* to transition to the inactive state. Upon transitioning to the inactive state or prior to transitioning to the inactive state, UE 115-*b* may store the first lower layer MCG and SCG configuration. In the inactive state, UE 115-*b* may then perform cell quality measurements (e.g., reference signal received power (RSRP) measurements, reference signal received quality (RSRQ) measurements, etc.) on signals received from the master node 505 and the secondary node 510. In some cases, UE 115-*b* may also perform cell quality measurements on signals received on other nodes.

Once UE 115-*b* decides to transition back to a connected state, UE 115-*b* may initiate a resume procedure to continue communications in the dual connectivity mode. In some cases, UE 115-*b* may avoid releasing an SCell configuration for SCells in an MCG upon initiating the resume procedure. UE 115-*b* may also avoid releasing an SCG configuration upon initiating the resume procedure. As part of the resume procedure, UE 115-*b* may transmit a resume request message (e.g., RRCResumeRequest) to master node 505 or secondary node 510, and UE 115-*b* may receive a resume message from the master node 505 or secondary node 510. The resume message (e.g., RRCResume) may include an MCG SCell configuration for delta signaling, an SCG configuration for delta signaling or both. In some cases, if the resume message does not contain an indication to restore or resume the MCG SCells, UE 115-*b* may release the MCG SCells. Similarly, if the resume message does not contain an indication to restore or resume the SCG, UE 115-*b* may release the SCG.

Thus, the resume message from the master node or the secondary node may indicate whether UE 115-*b* is to restore the first lower layer MCG or SCG configuration for subsequent communications in the dual connectivity mode. As described herein, to ensure that the indication of whether to restore the first lower layer MCG or SCG configuration is justified, UE 115-*b* may transmit an indication to the master node or the secondary node of whether the cell quality measurements performed in the inactive state satisfy one or more thresholds. For instance, UE 115-*b* may transmit the resume request message with an identifier (ID) that indicates whether the cell quality measurements satisfy the one or more thresholds. In some cases, the release message used to prompt UE 115-*b* to transition to the inactive mode may configure the one or more thresholds, a first resume ID (resume ID-1) for indicating that cell quality measurements fail to satisfy the one or more thresholds, and a second resume ID (resume ID-2) for indicating that cell quality measurements satisfy the one or more thresholds.

The master node or the secondary node may then use the indication of whether the cell quality measurements satisfy the one or more thresholds to determine whether to transmit an indication to UE 115-*b* to restore the first lower layer MCG or SCG configuration. In particular, if the cell quality measurements performed in the inactive state (i.e., early measurements) satisfy the one or more thresholds, the master node or secondary node may indicate to UE 115-*b* to restore the first lower layer MCG or SCG configuration. Otherwise, the master node or secondary node may indicate to UE 115-*b* to release the first lower layer MCG or SCG configuration.

UE 115-*b* may then transmit an indication of the cell quality measurements to the master node or secondary node in a resume complete message (e.g., RRCResumeComplete), and the master node or secondary node may transmit an indication of a second lower layer MCG or SCG configuration and an indication to activate the SCG to UE 115-*b* in a reconfiguration message (e.g., RRCReconfiguration). If UE 115-*b* is instructed to restore the first lower layer MCG or SCG configuration, the second lower layer configuration may be indicated as an offset (or delta) of the first lower layer MCG or SCG configuration. Otherwise, the second lower layer configuration may be indicated explicitly. UE 115-*b* may then perform another random access procedure to gain access to the secondary node 510, and UE 115-*b* may resume communications with the master node and the secondary node 510 in the dual connectivity mode using the second lower layer configuration.

Figure 6:
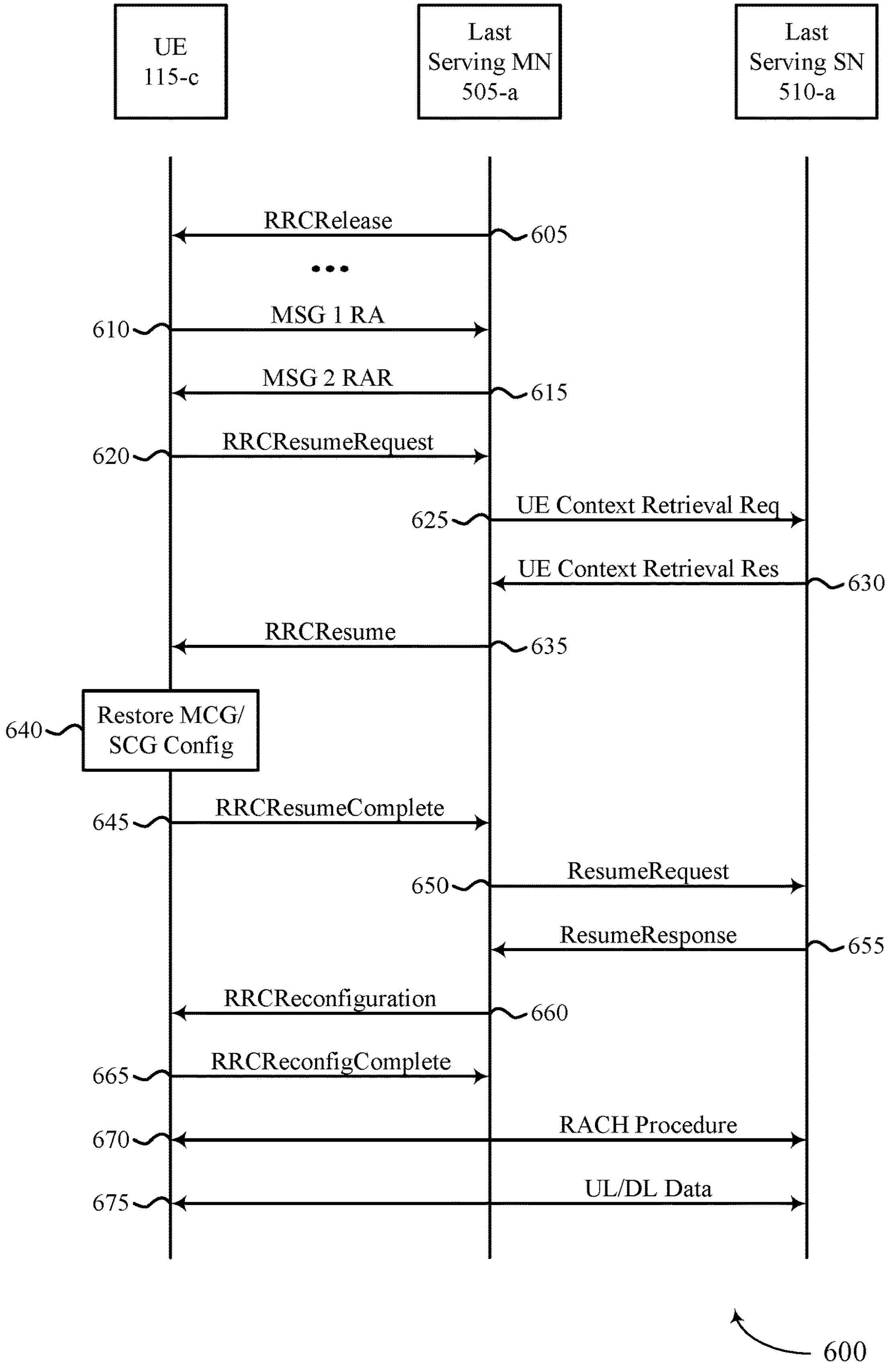
FIGS. 6-12 illustrate examples of process flows that supports resume of dual connectivity from secondary node with delta configuration in accordance with aspects of the present disclosure.

FIG. 6 illustrates an example of a process flow 600 that supports resume of dual connectivity from secondary node with delta configuration in accordance with aspects of the present disclosure. Process flow 600 illustrates aspects of techniques performed by a UE 115-*c*, which may be an example of a UE 115 described with reference to FIGS. 1-5. Process flow 600 also illustrates aspects of techniques performed by a master node 505-*a*, which may be an example of a master node 505 described with reference to FIG. 5. Process flow 600 also illustrates aspects of techniques performed by a secondary node 510-*a*, which may be an example of a secondary node 510 described with reference to FIG. 5. In the example of FIG. 6, UE 115-*c* may blindly resume communications in a dual connectivity mode from a last serving master node 505-*a*.

At 605, last serving MN 505-*a* may transmit a release message to UE 115-*c* with a suspend configuration (e.g., suspendConfig) prompting UE 115-*c* to transition from a connected state to an inactive state. The release message may include an indication of one or more thresholds (e.g., RSRP thresholds, RSRQ thresholds, etc.) and two resume IDs. The one or more thresholds may be used by UE 115-*c* to check whether to restore a stored lower layer MCG and SCG configuration as a baseline configuration and may include a single threshold for the master node (e.g., PCell) and the secondary node (e.g., PSCell) measurements or separate thresholds for the master node and the secondary node. The two resume IDs may include a first resume ID (resume ID-1) which may be used in a resume request message when the predefined thresholds are not satisfied (or met and a second resume ID (resume ID-2) which may be used in a resume request message when the predefined thresholds are satisfied.

After some time in the inactive state, UE 115-*c* may decide to transition back to a connected state. As such, at 610, UE 115-*c* may transmit a first random access message to master node 505-*a*, and, at 615, UE 115-*c* may receive a second random access message (e.g., RAR) from master node 505-*a*. After receiving the RAR, UE 115-*c* may compare the cell quality measurements performed on signals received from the master node and the cell quality measurements performed on signals received from the secondary node to the one or more configured thresholds. If any of the cell quality measurements are lower than a corresponding threshold (e.g., any of the one or more thresholds are not satisfied), UE 115-*c* may regard a stored lower layer MCG and SCG configuration as outdated and may discard the configuration, and, at 620, UE 115-*c* may transmit the resume request message with the first resume ID. Alternatively, if all cell quality measurements are greater than corresponding thresholds (e.g., both PCell and PSCell thresholds are met or all of the one or more thresholds are satisfied), UE 115-*c* may restore the stored lower layer MCG and SCG configuration, and, at 620, UE 115-*c* may transmit the resume request message with the second resume ID.

In the example of FIG. 6, UE 115-*c* may determine that the one or more thresholds are satisfied, and UE 115-*c* may transmit the resume request with the second resume ID. The resume request may also include a cause value, a resume-MAC-I value, and/or an indication of whether early multi-RAT communications is available. At 625, master node 505-*a* may transmit a UE context retrieval request to secondary node 510-*a*, and, at 630, master node 505-*a* may receive a UE context retrieval response from secondary node 510-*a* indicating the context of the UE 115-*c* (e.g., the secondary node or SCG configuration). At 635, master node 505-*a* may then transmit a resume message to UE 115-*c* indicating that UE 115-*c* is to restore the stored lower layer MCG and SCG configuration (e.g., based on the UE indicating that the one or more thresholds are satisfied in the resume request). Thus, at 640, the UE 115-*c* may restore the stored lower layer MCG and SCG configuration and resume (e.g., blindly resume) from last serving master node 505-*a* based on receiving the indication to restore the stored lower layer MCG and SCG configuration.

At 645, UE 115-*c* may transmit a resume complete message to master node 505-*a* including a measurement report with the cell quality measurements performed in the inactive state (e.g., measurement report on the master node 505-*a*). At 650, master node 505-*a* may transmit a resume request message to secondary node 510-*a*, and, at 655, secondary node 510-*a* may transmit a resume response to master node 505-*a*. At 660, master node 505-*a* may then transmit a reconfiguration message including delta signaling for the lower layer MCG and SCG configuration and an indication for UE 115-*c* to activate the SCG. In particular, master node 505-*a* may transmit an indication of an updated lower layer MCG and SCG configuration as an offset (or delta) of the lower layer MCG and SCG configuration stored at UE 115-*c*. In some cases, master node 505-*a* may determine the updated lower layer MCG and SCG configuration based on the cell quality measurements received from UE 115-*c*.

At 665, UE 115-*c* may transmit a reconfiguration complete message to master node 505-*a* indicating that the reconfiguration was successful, and, at 670, UE 115-*c* may perform a random access procedure to gain access to secondary node 510-*a*. At 675, UE 115-*c* may then communicate (e.g., exchange uplink or downlink data) with secondary node 510-*a* using the updated lower layer MCG and SCG configuration. UE 115-*c* may also communicate with master node 505-*a* using the updated lower layer MCG and SCG configuration.

Figure 7:
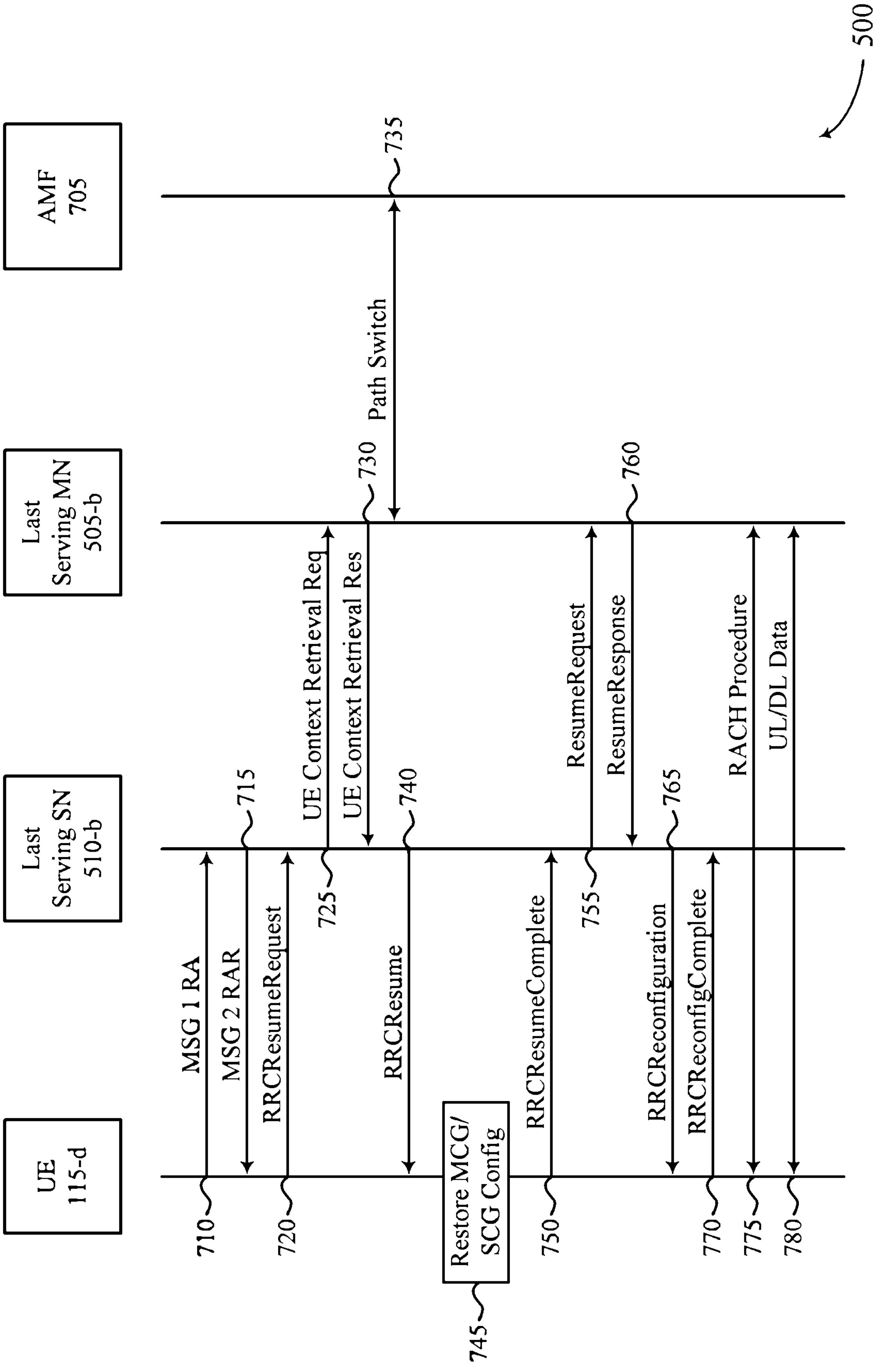

FIG. 7 illustrates an example of a process flow 700 that supports resume of dual connectivity from secondary node with delta configuration in accordance with aspects of the present disclosure. Process flow 700 illustrates aspects of techniques performed by a UE 115-*d*, which may be an example of a UE 115 described with reference to FIGS. 1-6. Process flow 700 also illustrates aspects of techniques performed by a master node 505-*b*, which may be an example of a master node 505 described with reference to FIGS. 5 and 6. Process flow 700 also illustrates aspects of techniques performed by a secondary node 510-*b*, which may be an example of a secondary node 510 described with reference to FIGS. 5 and 6. In the example of FIG. 7, UE 115-*d* may blindly resume communications in a dual connectivity mode from a last serving secondary node 510-*b* (e.g., secondary node and master node role switch with SRB1).

At 710, UE 115-*d* may transmit a first random access message to secondary node 510-*b*, and, at 715, UE 115-*d* may receive a second random access message (e.g., RAR) from secondary node 510-*b*. After receiving the RAR, UE 115-*d* may compare the cell quality measurements performed on signals received from the master node and the cell quality measurements performed on signals received from the secondary node to one or more configured thresholds. If any of the cell quality measurements are lower than a corresponding threshold (e.g., any of the one or more thresholds are not satisfied), UE 115-*d* may regard a stored lower layer MCG and SCG configuration as outdated and may discard the configuration, and, at 720, UE 115-*d* may transmit the resume request message with a first resume ID. Alternatively, if all cell quality measurements are greater than corresponding thresholds (e.g., both PCell and PSCell thresholds are met or all of the one or more thresholds are satisfied), UE 115-*d* may restore the stored lower layer MCG and SCG configuration, and, at 720, UE 115-*d* may transmit the resume request message with a second resume ID.

In the example of FIG. 7, UE 115-*d* may determine that the one or more thresholds are satisfied, and UE 115-*d* may transmit the resume request with the second resume ID. Further, due to changing channel conditions or for other reasons (e.g., if the UE 115-*d* moved while in the inactive state), UE 115-*d* may transmit the resume request to secondary node 510-*b* (e.g., rather than master node 505-*b*). The resume request may also include a cause value, a resume-MAC-I value, and/or an indication of whether early multi-RAT communications is available. The resume-MAC-I value may be integrity protected with a master key. In addition, based on the resume ID, secondary node 510-*b* may determine that UE 115-*d* is or was configured for MR-DC.

At 725, secondary node 510-*b* may transmit a UE context retrieval request to master node 505-*b* with an indication that a master node and secondary node exchange is requested or required. That is, secondary node 510-*b* may request a master node and secondary node exchange (e.g., in an Xn message), similar to a forward handover procedure. At 730, secondary node 510-*b* may receive a UE context retrieval response from master node 505-*b* including a master node and secondary node exchange configuration. Specifically, if UE 115-*d* is verified successfully, master node 505-*b* may accept the forward handover procedure to perform the master node and secondary node exchange (i.e., to switch the master node to the secondary node or a new secondary node and to switch the secondary node to the master node or a new master node). At 735, master node 505-*b* may perform a path switch with access and mobility management function (AMF) 705.

At 740, secondary node 510-*b* may then transmit a resume message to UE 115-*d* including the master node and secondary node exchange configuration, and UE 115-*d* may switch the secondary node 510-*b* to the master node 505-*b* and the master node 505-*b* to the secondary node 510-*b*. The resume message may also indicate that UE 115-*d* is to restore the stored lower layer MCG and SCG configuration (e.g., based on the UE indicating that the one or more thresholds are satisfied in the resume request). Thus, at 745, the UE 115-*d* may restore the stored lower layer MCG and SCG configuration and resume (e.g., blindly resume) from last secondary node 510-*b* based on receiving the indication to restore the stored lower layer MCG and SCG configuration. In some cases, the resume message (e.g., random access message four may be security protected with a new key from SRB1 of the new master node). At 750, UE 115-*d* may transmit a resume complete message to secondary node 510-*b* including a measurement report with the cell quality measurements performed in the inactive state (e.g., measurement report on the master node 505-*b* or the old master node).

At 755, secondary node 510-*b* may transmit a resume request to master node 505-*b*, and, at 760, master node 505-*b* may transmit a resume response to secondary node 510-*b*. At 765, secondary node 510-*b* may then transmit a reconfiguration message including delta signaling for the lower layer MCG and SCG configuration and an indication for UE 115-*d* to activate the SCG. In particular, secondary node 510-*b* may transmit an indication of an updated lower layer MCG and SCG configuration as an offset (or delta) of the lower layer MCG and SCG configuration stored at UE 115-*d*. In some cases, secondary node 510-*b* (e.g., the new master node) may determine the updated lower layer MCG and SCG configuration based on the cell quality measurements received from UE 115-*d*.

At 770, UE 115-*d* may transmit a reconfiguration complete message to secondary node 510-*b* indicating that the reconfiguration was successful, and, at 775, UE 115-*d* may perform a random access procedure to gain access to master node 505-*b* (e.g., new secondary node). At 780, UE 115-*d* may then communicate (e.g., exchange uplink or downlink data) with master node 505-*b* (e.g., new secondary node) using the updated lower layer MCG and SCG configuration. UE 115-*d* may also communicate with secondary node 510-*b* using the updated lower layer MCG and SCG configuration.

Figure 8:
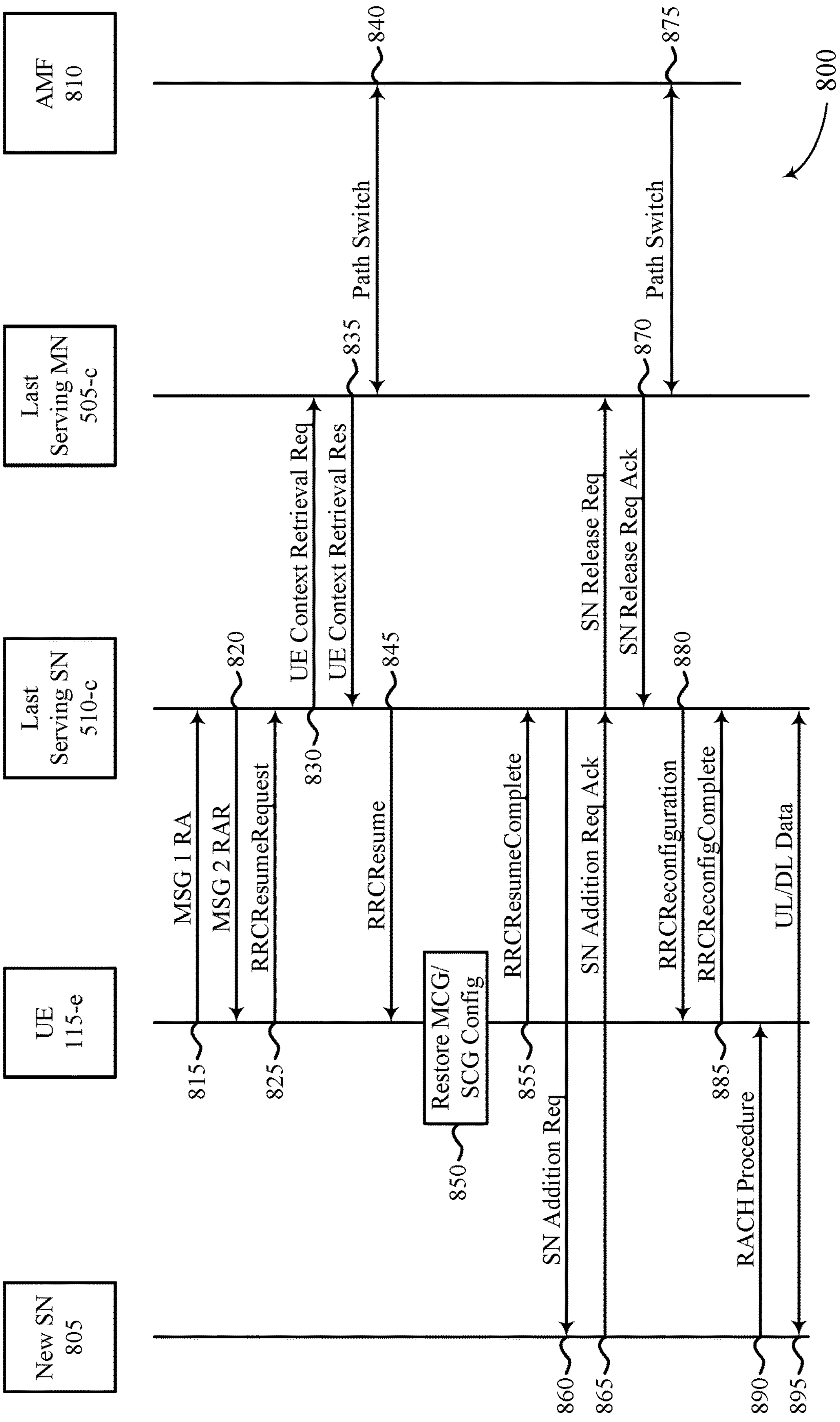

FIG. 8 illustrates an example of a process flow 800 that supports resume of dual connectivity from secondary node with delta configuration in accordance with aspects of the present disclosure. Process flow 800 illustrates aspects of techniques performed by a UE 115-*e*, which may be an example of a UE 115 described with reference to FIGS. 1-7. Process flow 800 also illustrates aspects of techniques performed by a master node 505-*c*, which may be an example of a master node 505 described with reference to FIGS. 5-7. Process flow 800 also illustrates aspects of techniques performed by a secondary node 510-*c*, which may be an example of a secondary node 510 described with reference to FIGS. 5-7. In the example of FIG. 8, UE 115-*e* may blindly resume communications in a dual connectivity mode from a last serving secondary node 510-*b* (e.g., secondary node and master node role switch with SRB1).

At 815, UE 115-*e* may transmit a first random access message to secondary node 510-*c*, and, at 820, UE 115-*e* may receive a second random access message (e.g., RAR) from secondary node 510-*c*. After receiving the RAR, UE 115-*e* may compare the cell quality measurements performed on signals received from the master node and the cell quality measurements performed on signals received from the secondary node to one or more configured thresholds. If any of the cell quality measurements are lower than a corresponding threshold (e.g., any of the one or more thresholds are not satisfied), UE 115-*e* may regard a stored lower layer MCG and SCG configuration as outdated and may discard the configuration, and, at 825, UE 115-*e* may transmit the resume request message with a first resume ID. Alternatively, if all cell quality measurements are greater than corresponding thresholds (e.g., both PCell and PSCell thresholds are met or all of the one or more thresholds are satisfied), UE 115-*e* may restore the stored lower layer MCG and SCG configuration, and, at 825, UE 115-*e* may transmit the resume request message with a second resume ID.

In the example of FIG. 8, UE 115-*e* may determine that the one or more thresholds are satisfied, and UE 115-*e* may transmit the resume request with the second resume ID. Further, due to changing channel conditions or for other reasons (e.g., if the UE 115-*e* moved while in the inactive state), UE 115-*e* may transmit the resume request to secondary node 510-*c* (e.g., rather than master node 505-*c*). The resume request may also include a cause value, a resume-MAC-I value, and/or an indication of whether early multi-RAT communications is available. The resume-MAC-I value may be integrity protected with a master key. In addition, based on the resume ID, secondary node 510-*c* may determine that UE 115-*c* is or was configured for MR-DC.

At 830, secondary node 510-*c* may transmit a UE context retrieval request to master node 505-*c* with an indication that a master node and secondary node exchange is requested or required. That is, secondary node 510-*c* may request a master node and secondary node exchange (e.g., in an Xn message), similar to a forward handover procedure. At 825, secondary node 510-*c* may receive a UE context retrieval response from master node 505-*c* including a master node and secondary node exchange configuration. Specifically, if UE 115-*e* is verified successfully, master node 505-*c* may accept the forward handover procedure to perform the master node and secondary node exchange (i.e., to switch the master node to the secondary node or a new secondary node and to switch the secondary node to the master node or a new master node). At 840, master node 505-*c* may perform a path switch with AMF 810.

At 845, secondary node 510-*c* may then transmit a resume message to UE 115-*e* including the master node and secondary node exchange configuration, and UE 115-*e* may switch the secondary node 510-*c* to the master node 505-*c* and the master node 505-*c* to the secondary node 510-*c*. The resume message may also indicate that UE 115-*e* is to restore the stored lower layer MCG and SCG configuration (e.g., based on the UE indicating that the one or more thresholds are satisfied in the resume request). Thus, at 850, the UE 115-*e* may restore the stored lower layer MCG and SCG configuration and resume (e.g., blindly resume) from last secondary node 510-*c* based on receiving the indication to restore the stored lower layer MCG and SCG configuration. In some cases, the resume message (e.g., random access message four may be security protected with a new key from SRB1 of the new master node). At 855, UE 115-*e* may transmit a resume complete message to secondary node 510-*c* including a measurement report with the cell quality measurements performed in the inactive state (e.g., measurement report on the master node 505-*c* or the old master node).

Based on the measurement report, secondary node 510-*c* may determine to release master node 505-*c* from the dual connectivity configuration, and secondary node 510-*c* may initiate a handover procedure. That is, UE 115-*e* may perform and report measurements on signals received from master node 505-*c* and new node 805, and the measurement report may indicate that the cell quality of master node 505-*c* is low and that the cell quality of a new node 805 is high. Thus, secondary node 510-*c* may initiate a handover procedure from master node 505-*c* to new node 805. At 860, secondary node 510-*c* (e.g., new master node) may transmit a secondary node addition request to new node 805 to add new node 805 as a secondary node (e.g., including an SCG configuration), and, at 865, secondary node 510-*c* may receive a secondary node addition request acknowledgment from new secondary node 805. Secondary node 510-*c* may then transmit a secondary node release request to master node 505-*c* (e.g., new secondary node), and, at 870, secondary node 510-*c* may receive a secondary node release request acknowledgment from master node 505-*c*. At 875, master node 505-*c* may perform a path switch with AMF 810.

At 880, secondary node 510-*c* may then transmit a reconfiguration message including delta signaling for the lower layer MCG and SCG configuration and an indication for UE 115-*e* to activate the SCG. In particular, secondary node 510-*c* may transmit an indication of an updated lower layer MCG and SCG configuration as an offset (or delta) of the lower layer MCG and SCG configuration stored at UE 115-*e*. In some cases, secondary node 510-*c* (e.g., the new master node) may determine the updated lower layer MCG and SCG configuration based on the cell quality measurements received from UE 115-*e*. That is, delta signaling may be used for the lower layer MCG and SCG configuration based on stored UE context in the last serving secondary node 510-*c* (MCG configuration) and, as described above, may be forwarded in the secondary node addition request (SCG configuration).

At 885, UE 115-*e* may transmit a reconfiguration complete message to secondary node 510-*c* indicating that the reconfiguration was successful, and, at 890, UE 115-*e* may perform a random access procedure to gain access to secondary node 805 (e.g., new secondary node). At 895, UE 115-*e* may then communicate (e.g., exchange uplink or downlink data) with secondary node 805 (e.g., new secondary node) using the updated lower layer MCG and SCG configuration. UE 115-*e* may also communicate with secondary node 510-*c* (e.g., new master node) using the updated lower layer MCG and SCG configuration.

Figure 9:
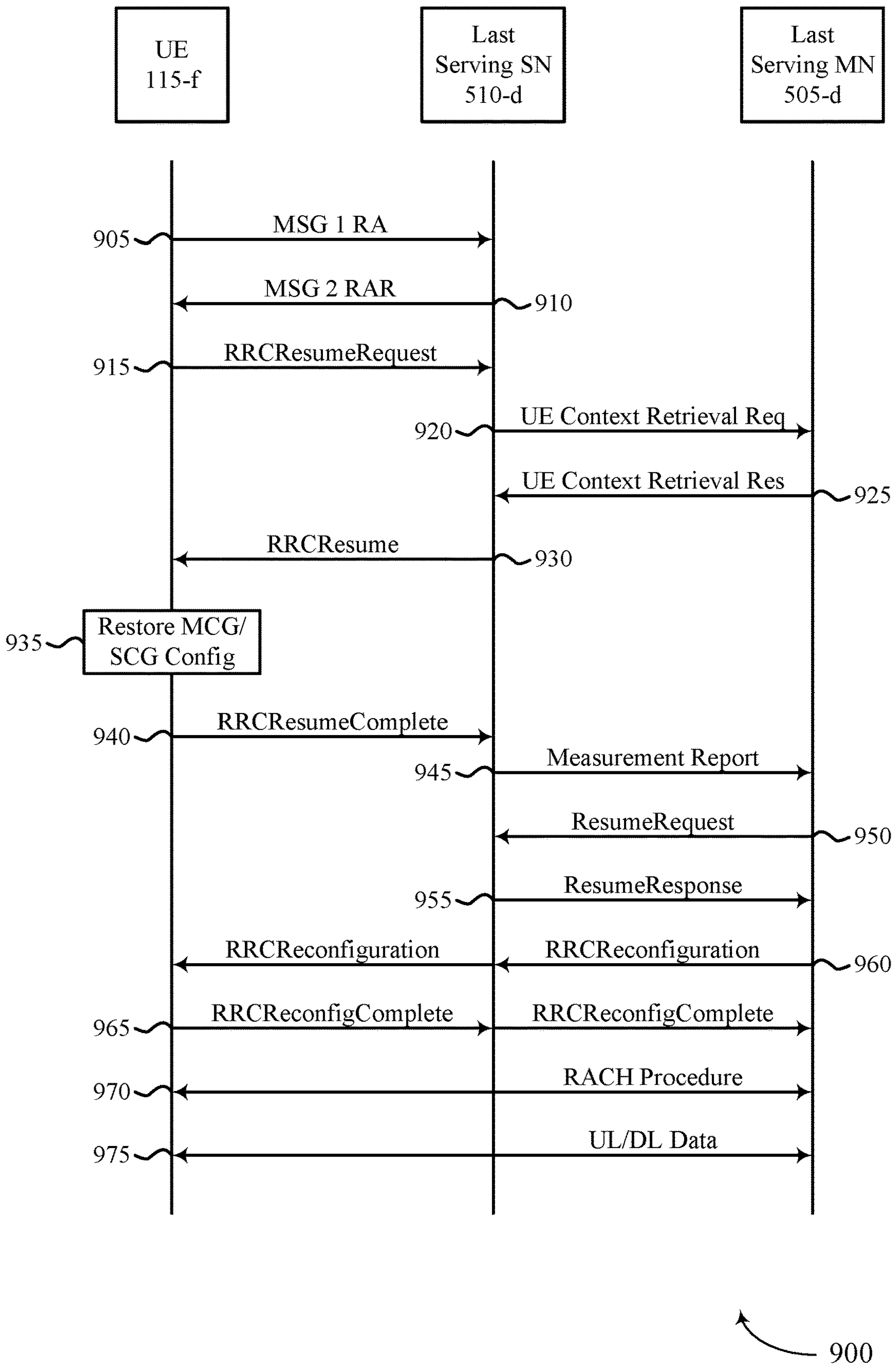

FIG. 9 illustrates an example of a process flow 900 that supports resume of dual connectivity from secondary node with delta configuration in accordance with aspects of the present disclosure. Process flow 900 illustrates aspects of techniques performed by a UE 115-*f*, which may be an example of a UE 115 described with reference to FIGS. 1-8. Process flow 900 also illustrates aspects of techniques performed by a master node 505-*d*, which may be an example of a master node 505 described with reference to FIGS. 5-8. Process flow 900 also illustrates aspects of techniques performed by a secondary node 510-*d*, which may be an example of a secondary node 510 described with reference to FIGS. 5-8. In the example of FIG. 9, UE 115-*f* may blindly resume communications in a dual connectivity mode from a last serving secondary node 510-*d* (e.g., secondary node and master node without role switch and with SRB1).

At 905, UE 115-*f* may transmit a first random access message to secondary node 510-*d*, and, at 910, UE 115-*f* may receive a second random access message (e.g., RAR) from secondary node 510-*d*. After receiving the RAR, UE 115-*f* may compare the cell quality measurements performed on signals received from the master node and the cell quality measurements performed on signals received from the secondary node to one or more configured thresholds. If any of the cell quality measurements are lower than a corresponding threshold (e.g., any of the one or more thresholds are not satisfied), UE 115-*f* may regard a stored lower layer MCG and SCG configuration as outdated and may discard the configuration, and, at 915, UE 115-*f* may transmit the resume request message with a first resume ID. Alternatively, if all cell quality measurements are greater than corresponding thresholds (e.g., both PCell and PSCell thresholds are met or all of the one or more thresholds are satisfied), UE 115-*f* may restore the stored lower layer MCG and SCG configuration, and, at 915, UE 115-*f* may transmit the resume request message with a second resume ID.

In the example of FIG. 9, UE 115-*f* may determine that the one or more thresholds are satisfied, and UE 115-*f* may transmit the resume request with the second resume ID (e.g., where the secondary node 510-*d* may keep the UE resume ID 1 and 2). Further, due to changing channel conditions or for other reasons (e.g., if the UE 115-*f* moved while in the inactive state), UE 115-*f* may transmit the resume request to secondary node 510-*d* (e.g., rather than master node 505-*d*). The resume request may also include a cause value, a resume-MAC-I value, and/or an indication of whether early multi-RAT communications is available. The resume-MAC-I value may be integrity protected with a master key. In addition, based on the resume ID, secondary node 510-*d* may determine that UE 115-*f* is or was configured for MR-DC.

At 920, secondary node 510-*d* may transmit a UE context retrieval request to master node 505-*d* with a secondary node configuration. In the example of FIG. 9, UE 115-*f* may expect to receive a resume message (e.g., random access message four) over an SRB1 secondary node leg from master node 505-*a*. Thus, at 925, master node 505-*d* may transmit a UE context retrieval response to secondary node 510-*d* including an RRC container over an SRB1 secondary node leg (e.g., with the resume message), and secondary node 510-*d* may forward the resume message to UE 115-*f* over the SRB1 secondary node leg (e.g., including an early multi-RAT request). That is, at 925, master node 505-*d* may transmit a resume message on a split SRB1 to secondary node 510-*d*, and, at 930, secondary node 510-*d* may forward the resume message on the spilt SRB1 to UE 115-*f* For example, master node 505-*d* may send the resume message (e.g., in a PDCP message via the Xn interface) to the secondary node 510-*d*, and the secondary node 510-*d* may encapsulate the resume message and send the encapsulated resume message to UE 115-*f* via the SRB1 between the secondary node 510-*d* and the UE 115-*f* In some cases, UE 115-*f* may be configured to split the bearer (e.g., SRB1 or SRB2) before transitioning to an inactive mode (e.g., before suspension).

The resume message may indicate that UE 115-*f* is to restore the stored lower layer MCG and SCG configuration (e.g., based on the UE indicating that the one or more thresholds are satisfied in the resume request). Thus, at 935, the UE 115-*f* may restore the stored lower layer MCG and SCG configuration and resume (e.g. blindly resume) from last secondary node 510-*d* based on receiving the indication to restore the stored lower layer MCG and SCG configuration. At 940, UE 115-*f* may transmit a resume complete message to secondary node 510-*d* including a measurement report with the cell quality measurements performed in the inactive state (e.g., measurement report on the master node 505-*b* or the old master node). The UE 115-*f* may transmit the resume complete message (i.e., including the measurement report) on a split SRB1, and, at 945, secondary node 510-*d* may transmit or forward the measurement report to master node 505-*d* on the split SRB1 (e.g., over SRB1 secondary node leg). For example, UE 115-*f* may encapsulate the resume complete message and transmit the resume complete message to the secondary node 510-*d* via the SRB1, and the secondary node 510-*d* may de-encapsulate the resume message and send the de-encapsulated resume message to the master node 505-*d* (e.g., in a PDCP message via the Xn interface).

At 950, master node 505-*d* may transmit a resume request to secondary node 510-*d*, and, at 955, secondary node 510-*d* may transmit a resume response to master node 505-*d*. At 960, master node 505-*d* may then transmit, to UE 115-*f*, a reconfiguration message including delta signaling for the lower layer MCG and SCG configuration and an indication for UE 115-*f* to activate the SCG. In particular, master node 505-*d* may transmit the reconfiguration message to secondary node 510-*d* on a split SRB1, and secondary node 510-*d* may transmit the reconfiguration message to UE 115-*f* on the split SRB1. The delta signaling may indicate an updated lower layer MCG and SCG configuration for UE 115-*f* to use for communicating in a dual connectivity mode as an offset of an original (or restored) lower layer MCG and SCG configuration. In some cases, master node 505-*d* may determine the updated lower layer MCG and SCG configuration based on the cell quality measurements received from UE 115-*f*.

At 965, UE 115-*f* may transmit a reconfiguration complete message to secondary node 510-*d* indicating that the reconfiguration was successful, and, at 970, UE 115-*f* may perform a random access procedure to gain access to master node 505-*d*. At 975, UE 115-*f* may then communicate (e.g., exchange uplink or downlink data) with master node 505-*d* using the updated lower layer MCG and SCG configuration. UE 115-*f* may also communicate with secondary node 510-*d* using the updated lower layer MCG and SCG configuration.

Figure 10:
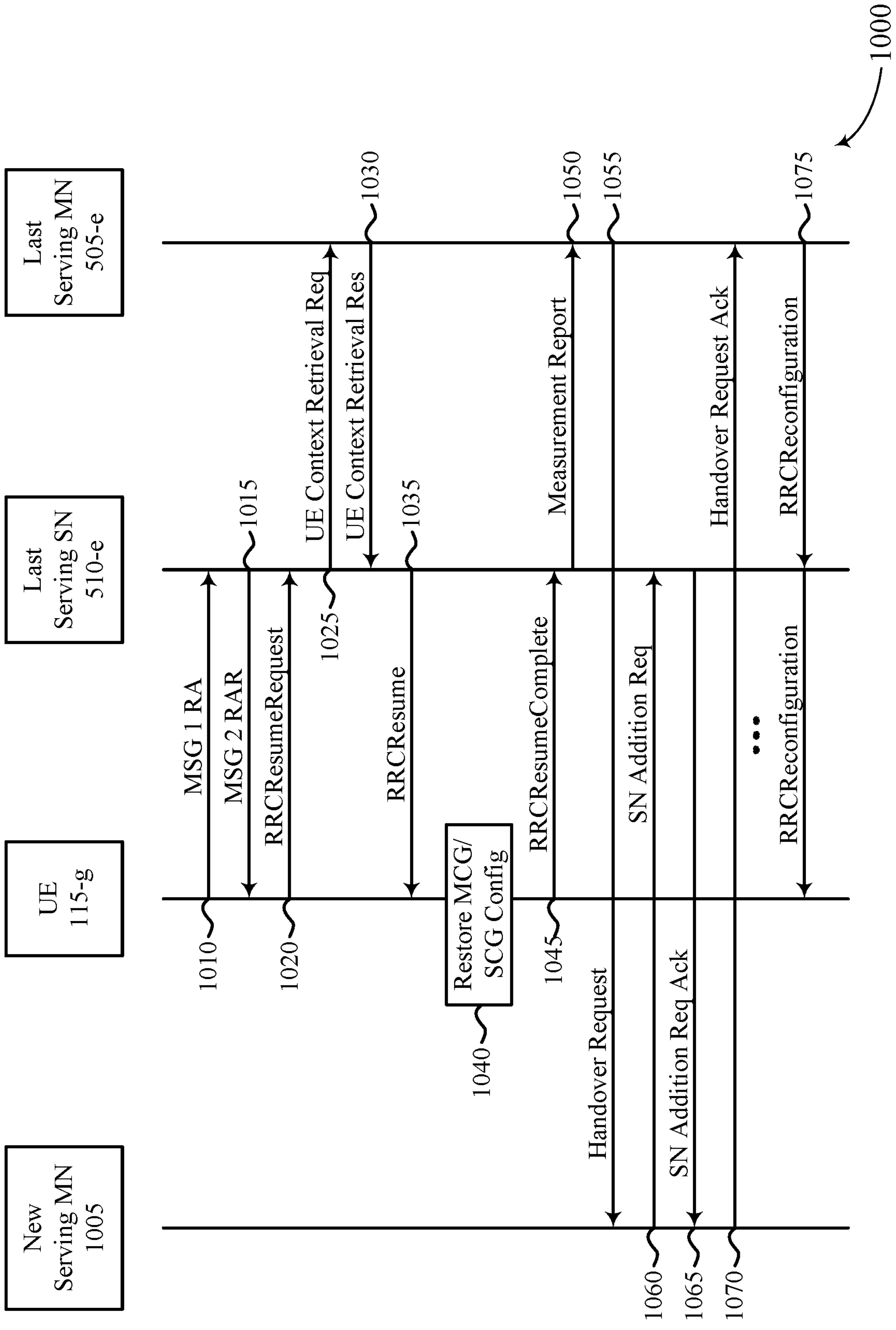

FIG. 10 illustrates an example of a process flow 1000 that supports resume of dual connectivity from secondary node with delta configuration in accordance with aspects of the present disclosure. Process flow 1000 illustrates aspects of techniques performed by a UE 115-*g*, which may be an example of a UE 115 described with reference to FIGS. 1-9. Process flow 1000 also illustrates aspects of techniques performed by a master node 505-*e*, which may be an example of a master node 505 described with reference to FIGS. 5-9. Process flow 1000 also illustrates aspects of techniques performed by a secondary node 510-*e*, which may be an example of a secondary node 510 described with reference to FIGS. 5-9. In the example of FIG. 10, UE 115-*g* may blindly resume communications in a dual connectivity mode from a last serving secondary node 510-*e* (e.g., secondary node and master node without role switch and with SRB1).

At 1010, UE 115-*g* may transmit a first random access message to secondary node 510-*e*, and, at 1015, UE 115-*g* may receive a second random access message (e.g., RAR) from secondary node 510-*e*. After receiving the RAR, UE 115-*g* may compare the cell quality measurements performed on signals received from the master node and the cell quality measurements performed on signals received from the secondary node to one or more configured thresholds. If any of the cell quality measurements are lower than a corresponding threshold (e.g., any of the one or more thresholds are not satisfied), UE 115-*g* may regard a stored lower layer MCG and SCG configuration as outdated and may discard the configuration, and, at 1020, UE 115-*g* may transmit the resume request message with a first resume ID. Alternatively, if all cell quality measurements are greater than corresponding thresholds (e.g., both PCell and PSCell thresholds are met or all of the one or more thresholds are satisfied), UE 115-*g* may restore the stored lower layer MCG and SCG configuration, and, at 1020, UE 115-*g* may transmit the resume request message with a second resume ID.

In the example of FIG. 10, UE 115-*g* may determine that the one or more thresholds are satisfied, and UE 115-*g* may transmit the resume request with the second resume ID (e.g., where the secondary node 510-*e* may keep the UE resume ID 1 and 2). Further, due to changing channel conditions or for other reasons (e.g., if the UE 115-*g* moved while in the inactive state), UE 115-*g* may transmit the resume request to secondary node 510-*e* (e.g., rather than master node 505-*e*). The resume request may also include a cause value, a resume-MAC-I value, and/or an indication of whether early multi-RAT communications is available. The resume-MAC-I value may be integrity protected with a master key. In addition, based on the resume ID, secondary node 510-*e* may determine that UE 115-*g* is or was configured for MR-DC.

At 1025, secondary node 510-*e* may transmit a UE context retrieval request to master node 505-*e* with a secondary node resumption configuration. In the example of FIG. 10, UE 115-*g* may expect to receive a resume message (e.g., random access message four) over an SRB1 secondary node leg from master node 505-*a*. Thus, at 1030, master node 505-*e* may transmit a UE context retrieval response to secondary node 510-*e* including an RRC container over an SRB1 secondary node leg (e.g., with the resume message), and secondary node 510-*e* may forward the resume message to UE 115-*g* over the SRB1 secondary node leg (e.g., including an early multi-RAT request). That is, at 1030, master node 505-*e* may transmit a resume message on a split SRB1 to secondary node 510-*d*, and, at 1035, secondary node 510-*e* may forward the resume message on the spilt SRB1 to UE 115-*g*. For example, master node 505-*e* may send the resume message (e.g., in a PDCP message via the Xn interface) to the secondary node 510-*e*, and the secondary node 510-*e* may encapsulate the resume message and send the encapsulated resume message to UE 115-*g* via the SRB1 between the secondary node 510-*e* and the UE 115-*g*. In some cases, UE 115-*g* may be configured to split the bearer (e.g., SRB1 or SRB2 and master node terminated dedicated radio bearer (DRB)) before transitioning to an inactive mode (e.g., before suspension).

The resume message may indicate that UE 115-*g* is to restore the stored lower layer MCG and SCG configuration (e.g., based on the UE indicating that the one or more thresholds are satisfied in the resume request). Thus, at 1040, the UE 115-*g* may restore the stored lower layer MCG and SCG configuration and resume (e.g. blindly resume) from last secondary node 510-*e* based on receiving the indication to restore the stored lower layer MCG and SCG configuration. At 1045, UE 115-*g* may transmit a resume complete message to secondary node 510-*e* including a measurement report with the cell quality measurements performed in the inactive state (e.g., measurement report on the master node 505-*b* or the old master node). The UE 115-*g* may transmit the resume complete message (i.e., including the measurement report) on a split SRB1, and, at 1050, secondary node 510-*e* may transmit or forward the measurement report to master node 505-*e* on the split SRB1 (e.g., over SRB1 secondary node leg). For example, UE 115-*g* may encapsulate the resume complete message and transmit the resume complete message to the secondary node 510-*e* via the SRB1, and the secondary node 510-*e* may de-encapsulate the resume message and send the de-encapsulated resume message to the master node 505-*e* (e.g., in a PDCP message via the Xn interface).

Based on the measurement report, master node 505-*e* may determine to release master node 505-*e* from the dual connectivity configuration, and master node 505-*e* may initiate a handover procedure. That is, UE 115-*g* may perform and report measurements on signals received from master node 505-*e* and new node 1005, and the measurement report may indicate that the cell quality of master node 505-*e* is low and that the cell quality of a new node 1005 is high. Thus, master node 505-*e* may initiate a handover procedure from master node 505-*e* to new node 1005. At 1055, master node 505-*e* may transmit a handover request to new node 1005 including the MCG configuration of last serving master node 505-*e* (i.e., the master node may trigger a handover procedure towards a new master node with the secondary node remaining unchanged). At 1060, new serving master node 1005 may then transmit a secondary node addition request to secondary node 510-*e*, and, at 1065, secondary node 510-*e* may transmit a secondary node addition request acknowledgment to new serving master node 1005. At 1070, new serving master node 1005 may transmit a handover acknowledgment to last serving master node 505-*e*.

Master node 505-*e* may transmit a secondary node release request to secondary node 510-*e*, and secondary node 510-*e* may transmit a secondary node release request acknowledgment to master node 505-*e*. At 1075, master node 505-*e* may then transmit a reconfiguration message including delta signaling for the lower layer MCG and SCG configuration and an indication for UE 115-*g* to activate the SCG. In particular, master node 505-*e* may transmit the reconfiguration message to secondary node 510-*e* on a split SRB1, and secondary node 510-*e* may transmit the reconfiguration message to UE 115-*g* on the split SRB1. The delta signaling may indicate an updated lower layer MCG and SCG configuration for UE 115-*g* to use for communicating in a dual connectivity mode as an offset of an original (or restored) lower layer MCG and SCG configuration. In some cases, master node 505-*e* may determine the updated lower layer MCG and SCG configuration based on the cell quality measurements received from UE 115-*g*.

UE 115-*g* may transmit a reconfiguration complete message to secondary node 510-*e* indicating that the reconfiguration was successful, and UE 115-*g* may perform a random access procedure to gain access to new serving master node 1005. UE 115-*g* may then communicate (e.g., exchange uplink or downlink data) with new serving master node 1005 using the updated lower layer MCG and SCG configuration. UE 115-*g* may also communicate with secondary node 510-*e* using the updated lower layer MCG and SCG configuration.

Figure 11:
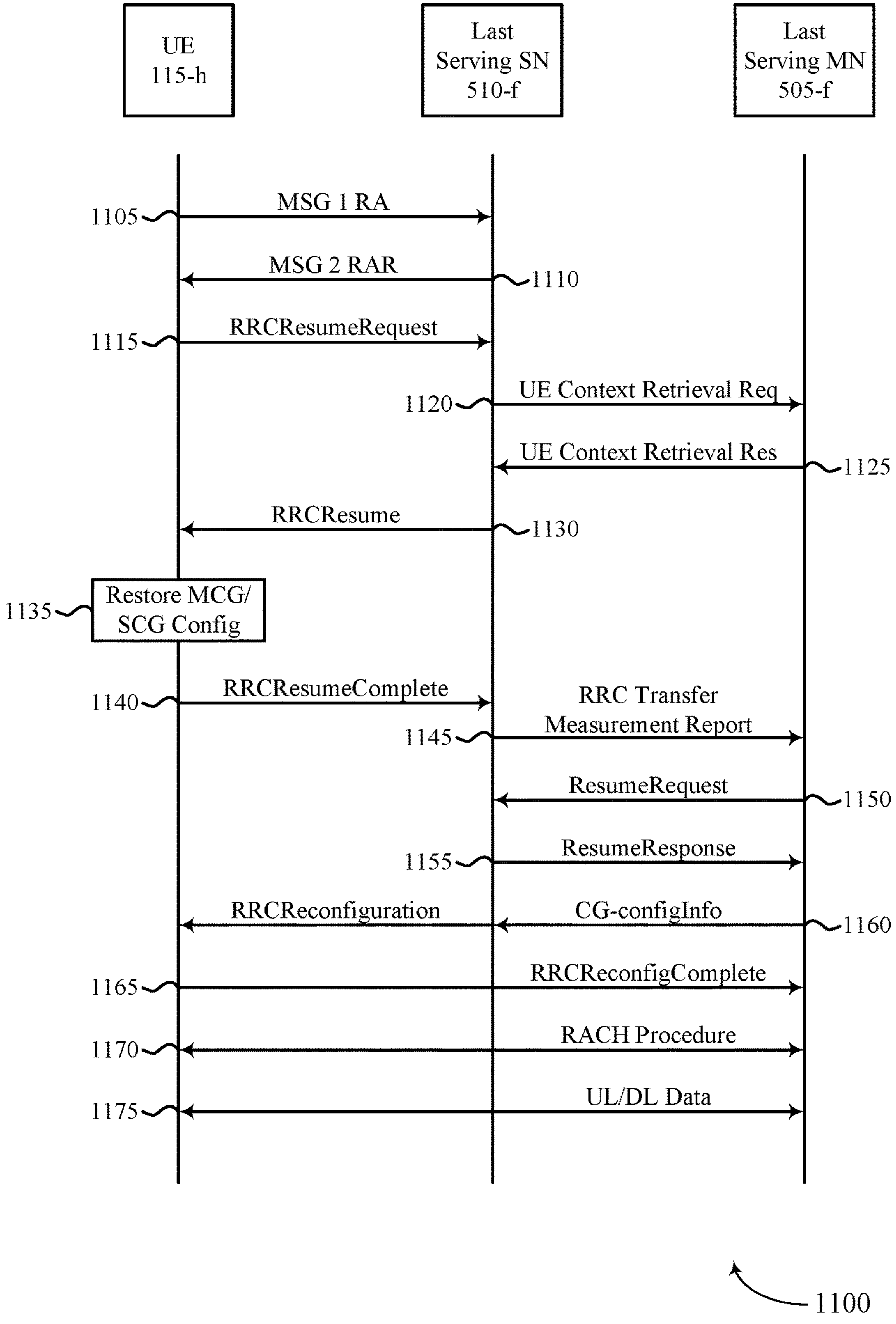

FIG. 11 illustrates an example of a process flow 1100 that supports resume of dual connectivity from secondary node with delta configuration in accordance with aspects of the present disclosure. Process flow 1100 illustrates aspects of techniques performed by a UE 115-*h*, which may be an example of a UE 115 described with reference to FIGS. 1-10. Process flow 1100 also illustrates aspects of techniques performed by a master node 505-*f*, which may be an example of a master node 505 described with reference to FIGS. 5-10. Process flow 1100 also illustrates aspects of techniques performed by a secondary node 510-*f*, which may be an example of a secondary node 510 described with reference to FIGS. 5-10. In the example of FIG. 11, UE 115-*h* may blindly resume communications in a dual connectivity mode from a last serving secondary node 510-*f* (e.g., secondary node and master node without role switch and with SRB3).

At 1105, UE 115-*h* may transmit a first random access message to secondary node 510-*f*, and, at 1110, UE 115-*h* may receive a second random access message (e.g., RAR) from secondary node 510-*f* After receiving the RAR, UE 115-*h* may compare the cell quality measurements performed on signals received from the master node and the cell quality measurements performed on signals received from the secondary node to one or more configured thresholds. If any of the cell quality measurements are lower than a corresponding threshold (e.g., any of the one or more thresholds are not satisfied), UE 115-*h* may regard a stored lower layer MCG and SCG configuration as outdated and may discard the configuration, and, at 1115, UE 115-*h* may transmit the resume request message with a first resume ID. Alternatively, if all cell quality measurements are greater than corresponding thresholds (e.g., both PCell and PSCell thresholds are met or all of the one or more thresholds are satisfied), UE 115-*h* may restore the stored lower layer MCG and SCG configuration, and, at 1115, UE 115-*h* may transmit the resume request message with a second resume ID.

In the example of FIG. 11, UE 115-*h* may determine that the one or more thresholds are satisfied, and UE 115-*h* may transmit the resume request with the second resume ID (e.g., where the secondary node 510-*f* may keep the UE resume ID 1 and 2). Further, due to changing channel conditions or for other reasons (e.g., if the UE 115-*h* moved while in the inactive state), UE 115-*h* may transmit the resume request to secondary node 510-*f* (e.g., rather than master node 505-*f*). The resume request may also include a cause value, a resume-MAC-I value, and/or an indication of whether early multi-RAT communications is available. The resume-MAC-I value may be integrity protected with a master key. In addition, based on the resume ID, secondary node 510-*f* may determine that UE 115-*h* is or was configured for MR-DC.

At 1120, secondary node 510-*f* may transmit a UE context retrieval request to master node 505-*f* with an SCG configuration. In the example of FIG. 11, UE 115-*h* may keep an SRB3 configuration with secondary node 510-*f* and may expect to receive a resume message from the secondary node 510-*f* over SRB3. Thus, at 1125, master node 505-*f* may transmit a UE context retrieval response to secondary node 510-*f* including an MCG configuration (e.g., after verifying UE 115-*h*), and, at 1130, secondary node 510-*f* may transmit the resume message over SRB3 to UE 115-*h* with an indication to restore the MCG and SCG configuration (e.g., based on the UE indicating that the one or more thresholds are satisfied in the resume request) and with an early multi-RAT request. Thus, at 1135, the UE 115-*h* may restore the stored lower layer MCG and SCG configuration and resume (e.g. blindly resume) from last secondary node 510-*f* based on receiving the indication to restore the stored lower layer MCG and SCG configuration.

At 1140, UE 115-*h* may transmit a resume complete message to secondary node 510-*f* including a measurement report with the cell quality measurements performed in the inactive state (e.g., measurement report on the master node 505-*b* or the old master node). The measurement report may be encapsulated in an RRC container with an RRC format of the last serving master node 505-*f*, and UE 115-*h* may transmit the RRC container in the resume complete message to the last serving secondary node 510-*f* via SRB3. At 1145, secondary node 510-*f* may then forward the RRC container including the measurement report in an RRC transfer message that includes the measurement report to master node 505-*f* The RRC transfer message may be X2 or Xn signaling.

At 1150, master node 505-*f* may transmit a resume request to secondary node 510-*f*, and, at 1155, secondary node 510-*f* may transmit a resume response to master node 505-*f*. At

1160, master node 505-*f* may then transmit cell group configuration information (e.g., CG-configInfo) including delta signaling for the lower layer MCG and SCG configuration, and secondary node 510-*f* may forward the delta signaling for the lower layer MCG and SCG configuration to UE 115-*h* in a reconfiguration message. The delta signaling may indicate an updated lower layer MCG and SCG configuration for UE 115-*h* to use for communicating in a dual connectivity mode as an offset (or delta) of an original (or restored) lower layer MCG and SCG configuration. In some cases, master node 505-*f* may determine the updated lower layer MCG and SCG configuration based on the cell quality measurements received from UE 115-*h*.

At 1165, UE 115-*h* may transmit a reconfiguration complete message to master node 505-*f* (e.g., via SRB1) indicating that the reconfiguration was successful, and, at 1170, UE 115-*h* may perform a random access procedure to gain access to master node 505-*f*. At 1175, UE 115-*h* may then communicate (e.g., exchange uplink or downlink data) with master node 505-*f* using the updated lower layer MCG and SCG configuration. UE 115-*h* may also communicate with secondary node 510-*f* using the updated lower layer MCG and SCG configuration.

Figure 12:
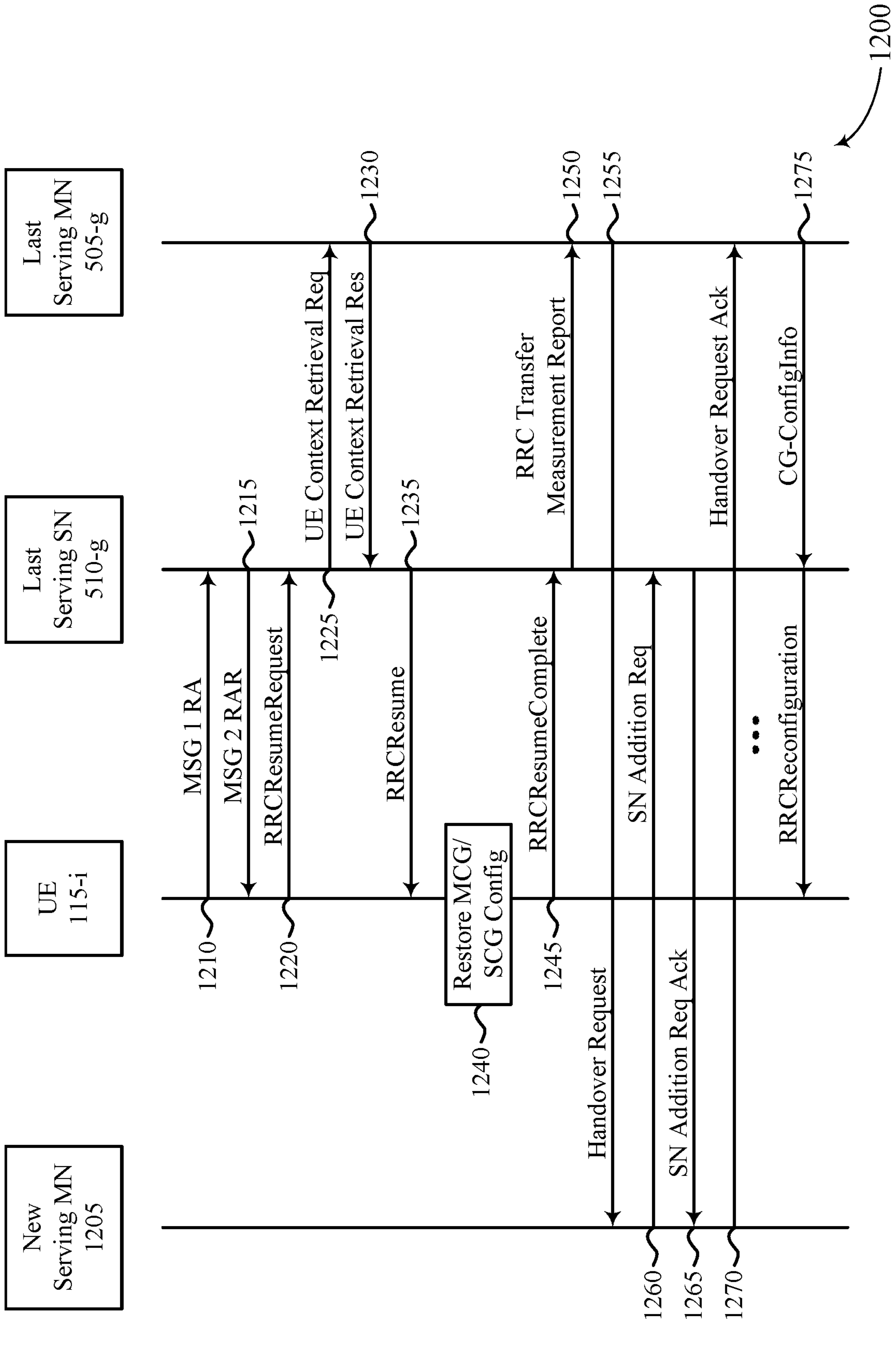

FIG. 12 illustrates an example of a process flow 1200 that supports resume of dual connectivity from secondary node with delta configuration in accordance with aspects of the present disclosure. Process flow 1200 illustrates aspects of techniques performed by a UE 115-*i*, which may be an example of a UE 115 described with reference to FIGS. 1-11. Process flow 1200 also illustrates aspects of techniques performed by a master node 505-*g*, which may be an example of a master node 505 described with reference to FIGS. 5-11. Process flow 1200 also illustrates aspects of techniques performed by a secondary node 510-*g*, which may be an example of a secondary node 510 described with reference to FIGS. 5-11. In the example of FIG. 12, UE 115-*i* may blindly resume communications in a dual connectivity mode from a last serving secondary node 510-*g* (e.g., secondary node and master node without role switch and with SRB3).

At 1210, UE 115-*i* may transmit a first random access message to secondary node 510-*g*, and, at 1215, UE 115-*i* may receive a second random access message (e.g., RAR) from secondary node 510-*g*. After receiving the RAR, UE 115-*i* may compare the cell quality measurements performed on signals received from the master node and the cell quality measurements performed on signals received from the secondary node to one or more configured thresholds. If any of the cell quality measurements are lower than a corresponding threshold (e.g., any of the one or more thresholds are not satisfied), UE 115-*i* may regard a stored lower layer MCG and SCG configuration as outdated and may discard the configuration, and, at 1220, UE 115-*i* may transmit the resume request message with a first resume ID. Alternatively, if all cell quality measurements are greater than corresponding thresholds (e.g., both PCell and PSCell thresholds are met or all of the one or more thresholds are satisfied), UE 115-*i* may restore the stored lower layer MCG and SCG configuration, and, at 1220, UE 115-*i* may transmit the resume request message with a second resume ID.

In the example of FIG. 12, UE 115-*i* may determine that the one or more thresholds are satisfied, and UE 115-*i* may transmit the resume request with the second resume ID (e.g., where the secondary node 510-*g* may keep the UE resume ID 1 and 2). Further, due to changing channel conditions or for other reasons (e.g., if the UE 115-*i* moved while in the inactive state), UE 115-*i* may transmit the resume request to secondary node 510-*g* (e.g., rather than master node 505-*g*). The resume request may also include a cause value, a resume-MAC-I value, and/or an indication of whether early multi-RAT communications is available. The resume-MAC-I value may be integrity protected with a master key. In addition, based on the resume ID, secondary node 510-*g* may determine that UE 115-*i* is or was configured for MR-DC.

At 1225, secondary node 510-*g* may transmit a UE context retrieval request to master node 505-*g* with an SCG configuration. In the example of FIG. 12, UE 115-*i* may keep an SRB3 configuration with secondary node 510-*g* and may expect to receive a resume message from the secondary node 510-*g* over SRB3. Thus, at 1230, master node 505-*g* may transmit a UE context retrieval response to secondary node 510-*g* including an MCG configuration (e.g., after verifying UE 115-*i*), and, at 1235, secondary node 510-*g* may transmit the resume message over SRB3 to UE 115-*i* with an indication to restore the MCG and SCG configuration (e.g., based on the UE indicating that the one or more thresholds are satisfied in the resume request) and with an early multi-RAT request. Thus, at 1240, the UE 115-*i* may restore the stored lower layer MCG and SCG configuration and resume (e.g. blindly resume) from last secondary node 510-*g* based on receiving the indication to restore the stored lower layer MCG and SCG configuration.

At 1245, UE 115-*i* may transmit a resume complete message to secondary node 510-*g* including a measurement report with the cell quality measurements performed in the inactive state (e.g., measurement report on the master node 505-*b* or the old master node and on a new or third node 1205). The measurement report may be encapsulated in an RRC container with an RRC format of the last serving master node 505-*g*, and UE 115-*i* may transmit the RRC container in the resume complete message to the last serving secondary node 510-*g* via SRB3. At 1250, secondary node 510-*g* may then forward the RRC container including the measurement report in an RRC transfer message that includes the measurement report to master node 505-*g*. The RRC transfer message may be X2 or Xn signaling.

Based on the measurement report, master node 505-*g* may determine to release master node 505-*g* from the dual connectivity configuration, and master node 505-*g* may initiate a handover procedure. That is, UE 115-*g* may perform and report measurements on signals received from master node 505-*g* and new node 1205, and the measurement report may indicate that the cell quality of master node 505-*g* is low and that the cell quality of a new node 1205 is high. Thus, master node 505-*g* may initiate a handover procedure from master node 505-*g* to new node 1205. At 1255, master node 505-*e* may transmit a handover request to new node 1205 including the MCG configuration of last serving master node 505-*g* (i.e., the master node may trigger a handover procedure towards a new master node with the secondary node remaining unchanged). At 1260, new serving master node 1205 may then transmit a secondary node addition request to secondary node 510-*g*, and, at 1265, secondary node 510-*g* may transmit a secondary node addition request acknowledgment to new serving master node 1205. At 1270, new serving master node 1205 may transmit a handover acknowledgment to last serving master node 505-*g*.

Master node 505-*g* may transmit a secondary node release request to secondary node 510-*g*, and secondary node 510-*g* may transmit a secondary node release request acknowledgment to master node 505-*g*. At 1275, master node 505-*g* may then transmit cell group configuration information (e.g., CG-configInfo) including delta signaling for the lower layer MCG and SCG configuration, and secondary node 510-*g* may forward the delta signaling for the lower layer MCG and SCG configuration to UE 115-*i* in a reconfiguration message. The delta signaling may indicate an updated lower layer MCG and SCG configuration for UE 115-*i* to use for communicating in a dual connectivity mode as an offset (or delta) of an original (or restored) lower layer MCG and SCG configuration. In some cases, master node 505-*g* may determine the updated lower layer MCG and SCG configuration based on the cell quality measurements received from UE 115-*i*.

UE 115-*i* may transmit a reconfiguration complete message to new serving master node 1205 indicating that the reconfiguration was successful, and UE 115-*i* may perform a random access procedure to gain access to new serving master node 1205. UE 115-*i* may then communicate (e.g., exchange uplink or downlink data) with new serving master node 1205 using the updated lower layer MCG and SCG configuration. UE 115-*i* may also communicate with secondary node 510-*g* using the updated lower layer MCG and SCG configuration.

Figure 13:
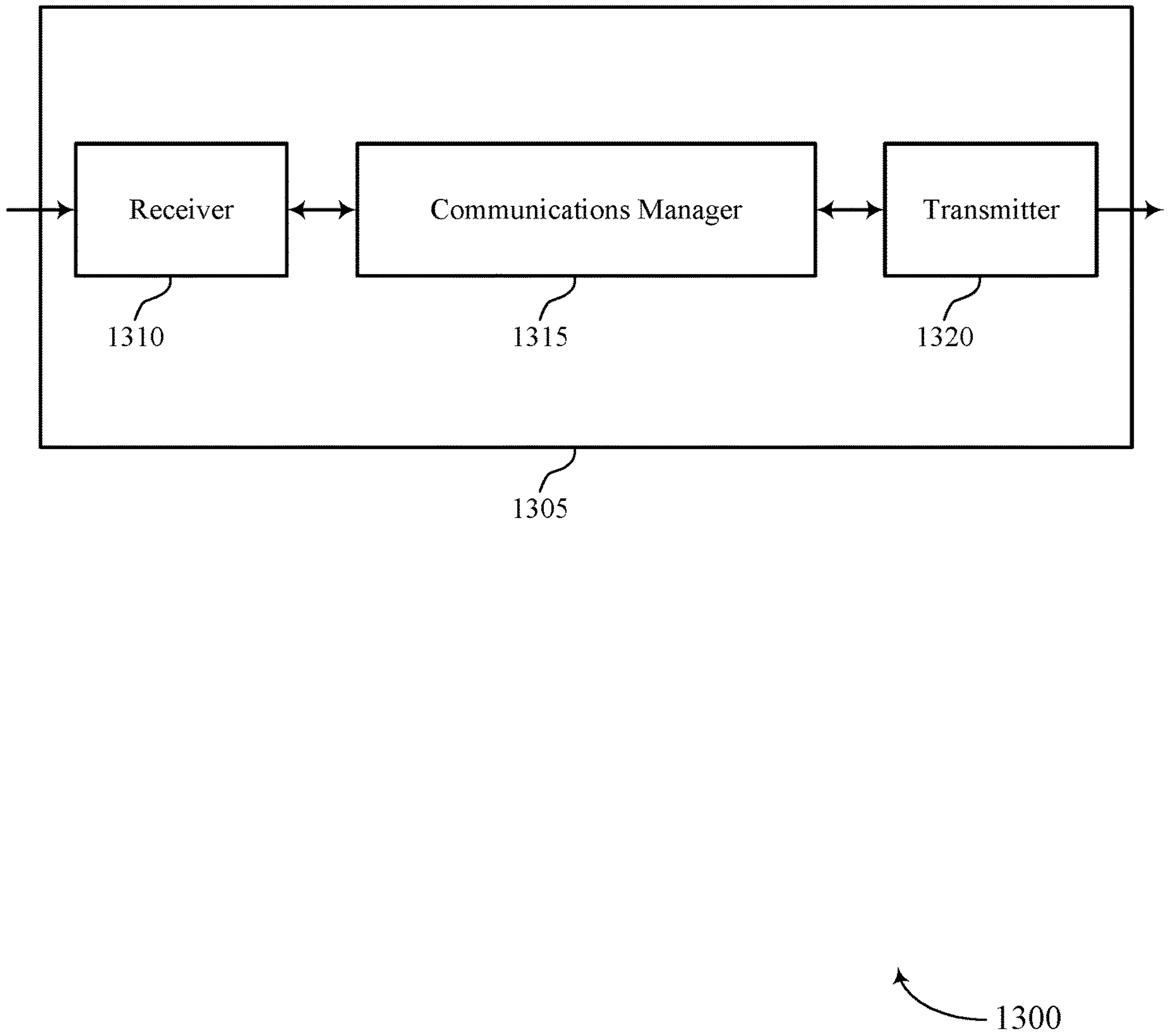
FIGS. 13 and 14 show block diagrams of devices that support resume of dual connectivity from secondary node with delta configuration in accordance with aspects of the present disclosure.

FIG. 13 shows a block diagram 1300 of a device 1305 that supports resume of dual connectivity from secondary node with delta configuration in accordance with aspects of the present disclosure. The device 1305 may be an example of aspects of a UE 115 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to resume of dual connectivity from secondary node with delta configuration, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may communicate with a master node and a secondary node in a dual-connectivity mode using a first lower layer configuration, receive an indication of a second lower layer configuration for communicating in the dual-connectivity mode based on the reporting, the second lower layer configuration being indicated as an offset of the first lower layer configuration, perform, after transitioning to an inactive state, cell quality measurements on signals received from the master node and the secondary node, determine that the cell quality measurements satisfy one or more thresholds, determine to transition from the inactive state to a connected state to resume communications in the dual-connectivity mode, and report the cell quality measurements performed on the signals received from the master node and the secondary node. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 1315 as described herein may be implemented to realize one or more potential advantages. One implementation may allow a UE to quickly resume communications in a dual connectivity mode after transitioning from an inactive state to a connected state. Accordingly, the latency associated with resuming communications in a dual connectivity mode may be reduced without compromising power savings. Further, because an updated lower layer configuration may be indicated as an offset of an original lower layer configuration, overhead associated with reconfiguration of a UE may be reduced. In addition, a processor at a UE may avoid having to process and apply an entirely new configuration after transitioning from an inactive state to a connected state, and the saved processing power may be used for other functions.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
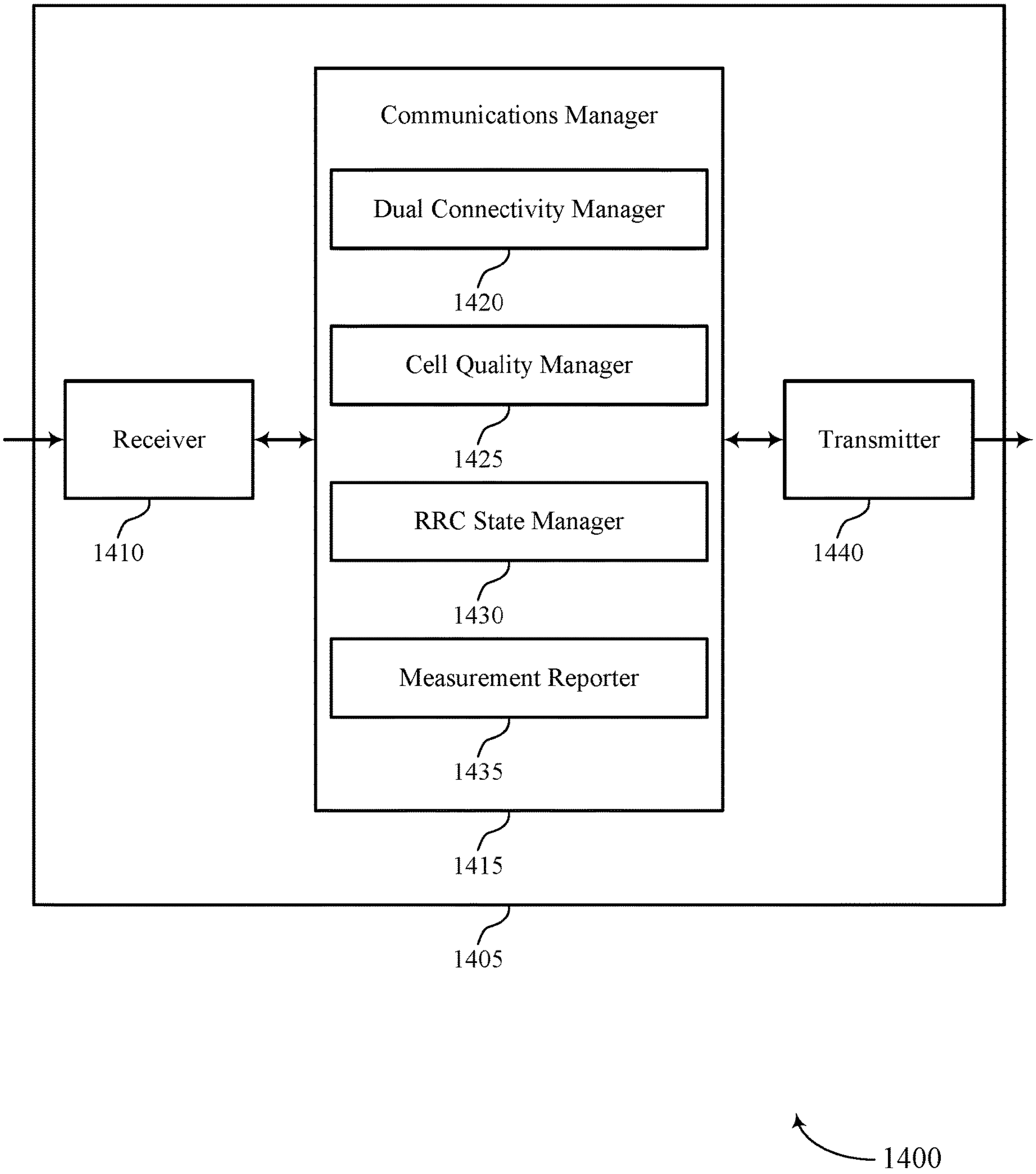

FIG. 14 shows a block diagram 1400 of a device 1405 that supports resume of dual connectivity from secondary node with delta configuration in accordance with aspects of the present disclosure. The device 1405 may be an example of aspects of a device 1305, or a UE 115 as described herein. The device 1405 may include a receiver 1410, a communications manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to resume of dual connectivity from secondary node with delta configuration, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a dual connectivity manager 1420, a cell quality manager 1425, a RRC state manager 1430, and a measurement reporter 1435. The communications manager 1415 may be an example of aspects of the communications manager 1610 described herein.

The dual connectivity manager 1420 may communicate with a master node and a secondary node in a dual-connectivity mode using a first lower layer configuration. The cell quality manager 1425 may perform, after transitioning to an inactive state, cell quality measurements on signals received from the master node and the secondary node and determine that the cell quality measurements satisfy one or more thresholds. The RRC state manager 1430 may determine to transition from the inactive state to a connected state to resume communications in the dual-connectivity mode. The measurement reporter 1435 may report the cell quality measurements performed on the signals received from the master node and the secondary node. The dual connectivity manager 1420 may receive an indication of a second lower layer configuration for communicating in the dual-connectivity mode based on the reporting, the second lower layer configuration being indicated as an offset of the first lower layer configuration.

The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
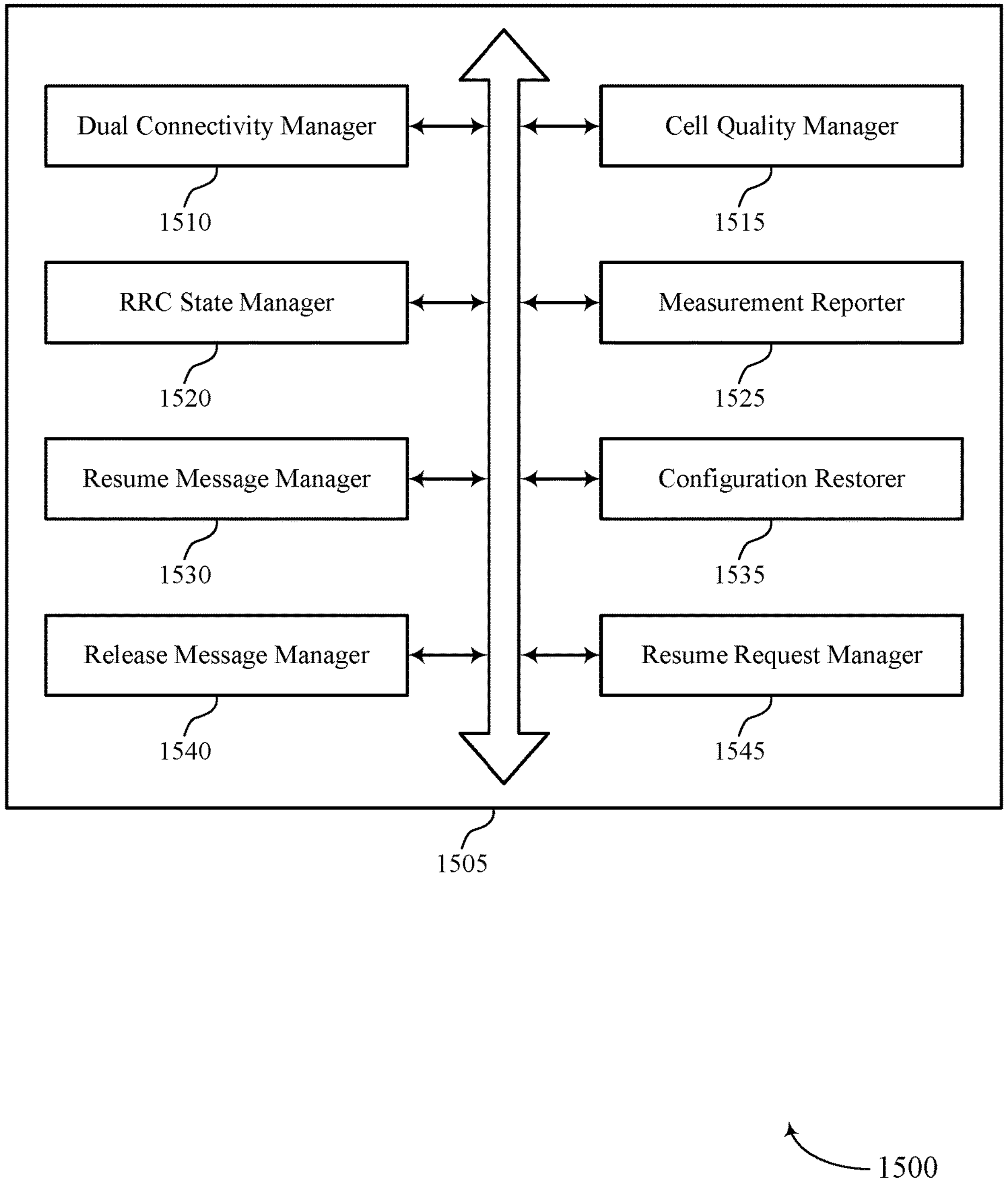
FIG. 15 shows a block diagram of a communications manager that supports resume of dual connectivity from secondary node with delta configuration in accordance with aspects of the present disclosure.

FIG. 15 shows a block diagram 1500 of a communications manager 1505 that supports resume of dual connectivity from secondary node with delta configuration in accordance with aspects of the present disclosure. The communications manager 1505 may be an example of aspects of a communications manager 1315, a communications manager 1415, or a communications manager 1610 described herein. The communications manager 1505 may include a dual connectivity manager 1510, a cell quality manager 1515, a RRC state manager 1520, a measurement reporter 1525, a resume message manager 1530, a configuration restorer 1535, a release message manager 1540, and a resume request manager 1545. Each of these modules may communicate, directly or indirectly, with one another (e.g., via one or more buses).

The dual connectivity manager 1510 may communicate with a master node and a secondary node in a dual-connectivity mode using a first lower layer configuration. In some examples, the dual connectivity manager 1510 may receive an indication of a second lower layer configuration for communicating in the dual-connectivity mode based on the reporting, the second lower layer configuration being indicated as an offset of the first lower layer configuration. In some examples, the dual connectivity manager 1510 may receive an indication of the offset of the first lower layer configuration. In some examples, the dual connectivity manager 1510 may determine the second lower layer configuration based on the first lower layer configuration and the offset of the first lower layer configuration. In some examples, the dual connectivity manager 1510 may receive an indication to add the other node as a new secondary node or as a new master node based on reporting the additional cell quality measurements. In some cases, the offset of the first lower layer configuration used to indicate the second lower layer configuration is based on the reported cell quality measurements. In some cases, the second lower layer configuration includes a master cell group and secondary cell group configuration and an indication to activate a secondary cell group.

The cell quality manager 1515 may perform, after transitioning to an inactive state, cell quality measurements on signals received from the master node and the secondary node. In some examples, the cell quality manager 1515 may determine that the cell quality measurements satisfy one or more thresholds. In some examples, the cell quality manager 1515 may perform additional cell quality measurements on signals received from another node. In some cases, the one or more thresholds include reference signal received power thresholds, reference signal received quality thresholds, or both. In some cases, the cell quality measurements include reference signal received power measurements, reference signal received quality measurements, or both. In some cases, the one or more thresholds include a single threshold for both the master node and the secondary node or separate thresholds for the master node and the secondary node.

The RRC state manager 1520 may determine to transition from the inactive state to a connected state to resume communications in the dual-connectivity mode. The measurement reporter 1525 may report the cell quality measurements performed on the signals received from the master node and the secondary node. In some examples, the measurement reporter 1525 may report the additional cell quality measurements performed on the signals received from the other node to the secondary node. The resume message manager 1530 may receive a resume message indicating that the UE is to restore the first lower layer configuration for communicating in the dual-connectivity mode. The configuration restorer 1535 may restore the first lower layer configuration as a baseline configuration for communicating in the dual-connectivity mode.

The release message manager 1540 may receive a release message prompting the UE to transition to the inactive state, where the release message indicates the one or more thresholds, a first resume identifier for indicating that the cell quality measurements fail to satisfy the one or more thresholds, and a second resume identifier for indicating that the cell quality measurements satisfy the one or more thresholds. The resume request manager 1545 may transmit, to the master node or the secondary node, a resume request message with the second resume identifier (ID) that indicates that the cell quality measurements satisfy the one or more thresholds. In some examples, the resume request manager 1545 may receive an indication to switch the secondary node to a new master node and the master node to a new secondary node for subsequent communications in the dual-connectivity mode.

In some cases, the resume request message is transmitted to the master node, and where the indication of the second lower layer configuration is received from the master node. In some cases, the resume request message is transmitted to the secondary node, and where the indication of the second lower layer configuration is received from the secondary node.

Figure 16:
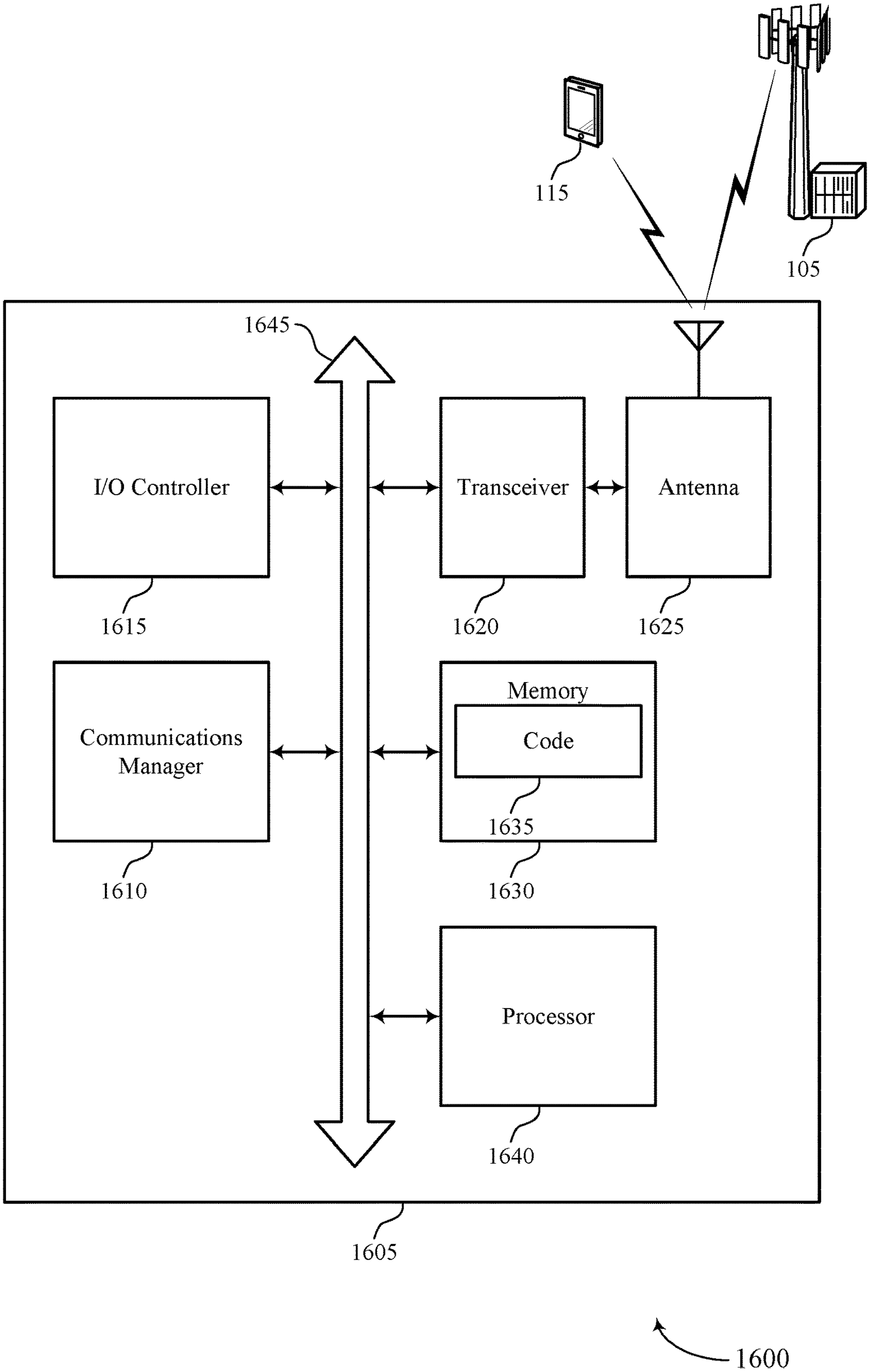
FIG. 16 shows a diagram of a system including a device that supports resume of dual connectivity from secondary node with delta configuration in accordance with aspects of the present disclosure.

FIG. 16 shows a diagram of a system 1600 including a device 1605 that supports resume of dual connectivity from secondary node with delta configuration in accordance with aspects of the present disclosure. The device 1605 may be an example of or include the components of device 1305, device 1405, or a UE 115 as described herein. The device 1605 may include components for bi-directional voice and data communications including components for transmitting and receiving communications, including a communications manager 1610, an I/O controller 1615, a transceiver 1620, an antenna 1625, memory 1630, and a processor 1640. These components may be in electronic communication via one or more buses (e.g., bus 1645).

The communications manager 1610 may communicate with a master node and a secondary node in a dual-connectivity mode using a first lower layer configuration, receive an indication of a second lower layer configuration for communicating in the dual-connectivity mode based on the reporting, the second lower layer configuration being indicated as an offset of the first lower layer configuration, perform, after transitioning to an inactive state, cell quality measurements on signals received from the master node and the secondary node, determine that the cell quality measurements satisfy one or more thresholds, determine to transition from the inactive state to a connected state to resume communications in the dual-connectivity mode, and report the cell quality measurements performed on the signals received from the master node and the secondary node.

The I/O controller 1615 may manage input and output signals for the device 1605. The I/O controller 1615 may also manage peripherals not integrated into the device 1605. In some cases, the I/O controller 1615 may represent a physical connection or port to an external peripheral. In some cases, the I/O controller 1615 may utilize an operating system such as iOS®, ANDROID®, MS-DOS®, MS-WINDOWS®, OS/2®, UNIX®, LINUX®, or another known operating system. In other cases, the I/O controller 1615 may represent or interact with a modem, a keyboard, a mouse, a touchscreen, or a similar device. In some cases, the I/O controller 1615 may be implemented as part of a processor. In some cases, a user may interact with the device 1605 via the I/O controller 1615 or via hardware components controlled by the I/O controller 1615.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM and ROM. The memory 1630 may store computer-readable, computer-executable code 1635 including instructions that, when executed, cause the processor to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting resume of dual connectivity from secondary node with delta configuration).

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
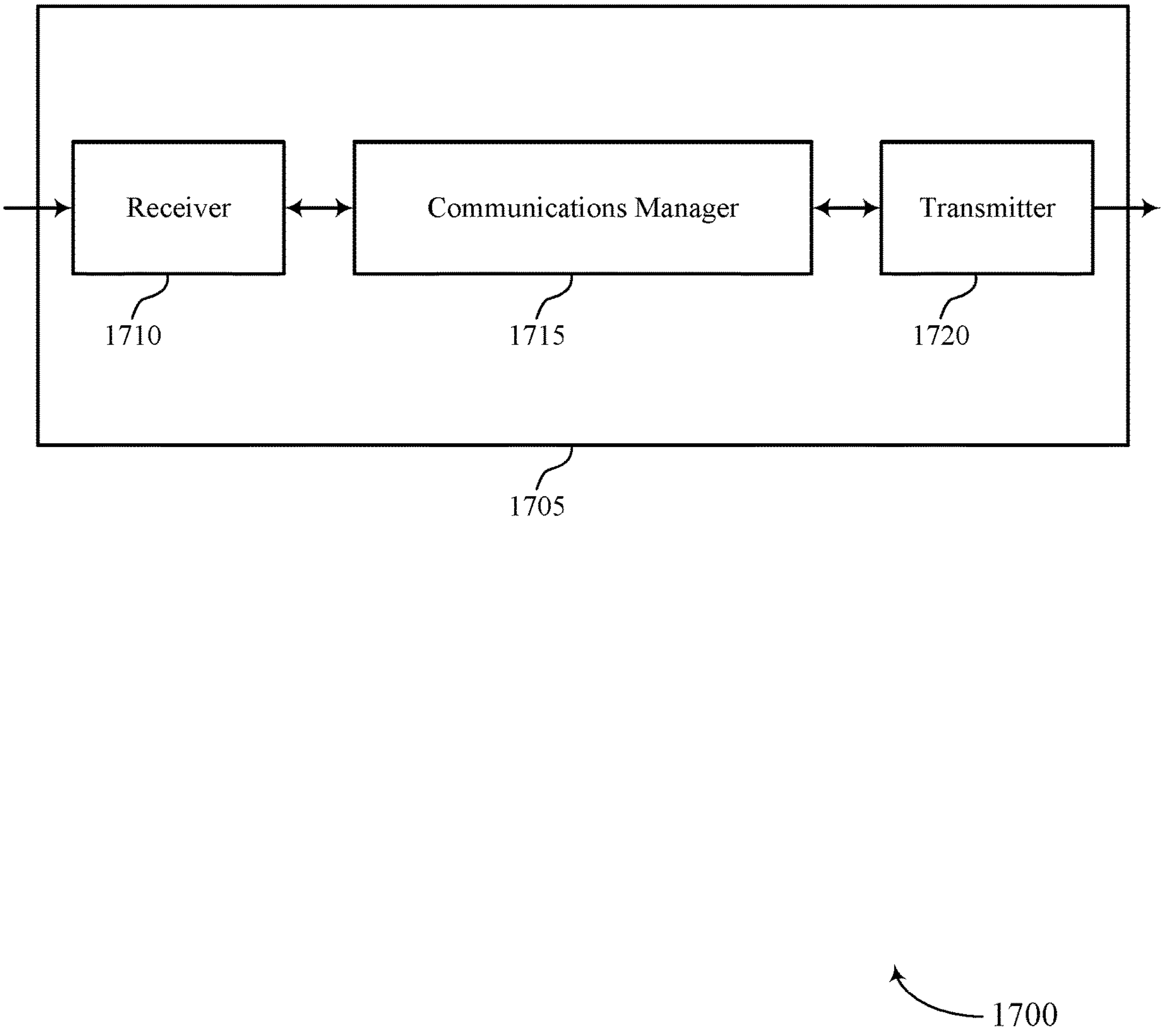
FIGS. 17 and 18 show block diagrams of devices that support resume of dual connectivity from secondary node with delta configuration in accordance with aspects of the present disclosure.

FIG. 17 shows a block diagram 1700 of a device 1705 that supports resume of dual connectivity from secondary node with delta configuration in accordance with aspects of the present disclosure. The device 1705 may be an example of aspects of a base station 105 as described herein. The device 1705 may include a receiver 1710, a communications manager 1715, and a transmitter 1720. The device 1705 may also include a processor. Each of these components may be in communication with one another (e.g., via one or more buses).

The receiver 1710 may receive information such as packets, user data, or control information associated with various information channels (e.g., control channels, data channels, and information related to resume of dual connectivity from secondary node with delta configuration, etc.). Information may be passed on to other components of the device 1705. The receiver 1710 may be an example of aspects of the transceiver 2020 described with reference to FIG. 20. The receiver 1710 may utilize a single antenna or a set of antennas.

The communications manager 1715 may communicate with a UE operating in a dual-connectivity mode in accordance with a first lower layer configuration, transmit an indication of a second lower layer configuration for the UE to use for communicating in the dual-connectivity mode based on receiving the report, the second lower layer configuration being indicated as an offset of the first lower layer configuration, transmit a release message prompting the UE to transition from a connected state to an inactive state, and receive a report of cell quality measurements performed by the UE in the inactive state, where the report is received as part of a procedure used by the UE to transition back to the connected state.

The communications manager 1715 may also communicate with a UE operating in a dual-connectivity mode in accordance with a first lower layer configuration, transmit an indication of a second lower layer configuration for the UE to use for communicating in the dual-connectivity mode based on receiving the cell quality measurements, the second lower layer configuration being indicated as an offset of the first lower layer configuration, and receive a report of cell quality measurements performed by the UE in an inactive state, where the indication is received as part of a procedure used by the UE to transition from the inactive state to a connected state. The communications manager 1715 may be an example of aspects of the communications manager 2010 described herein.

The communications manager 1715, or its sub-components, may be implemented in hardware, code (e.g., software or firmware) executed by a processor, or any combination thereof. If implemented in code executed by a processor, the functions of the communications manager 1715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1715, or its sub-components, may be physically located at various positions, including being distributed such that portions of functions are implemented at different physical locations by one or more physical components. In some examples, the communications manager 1715, or its sub-components, may be a separate and distinct component in accordance with various aspects of the present disclosure. In some examples, the communications manager 1715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1720 may transmit signals generated by other components of the device 1705. In some examples, the transmitter 1720 may be collocated with a receiver 1710 in a transceiver module. For example, the transmitter 1720 may be an example of aspects of the transceiver 2020 described with reference to FIG. 20. The transmitter 1720 may utilize a single antenna or a set of antennas.

Figure 18:
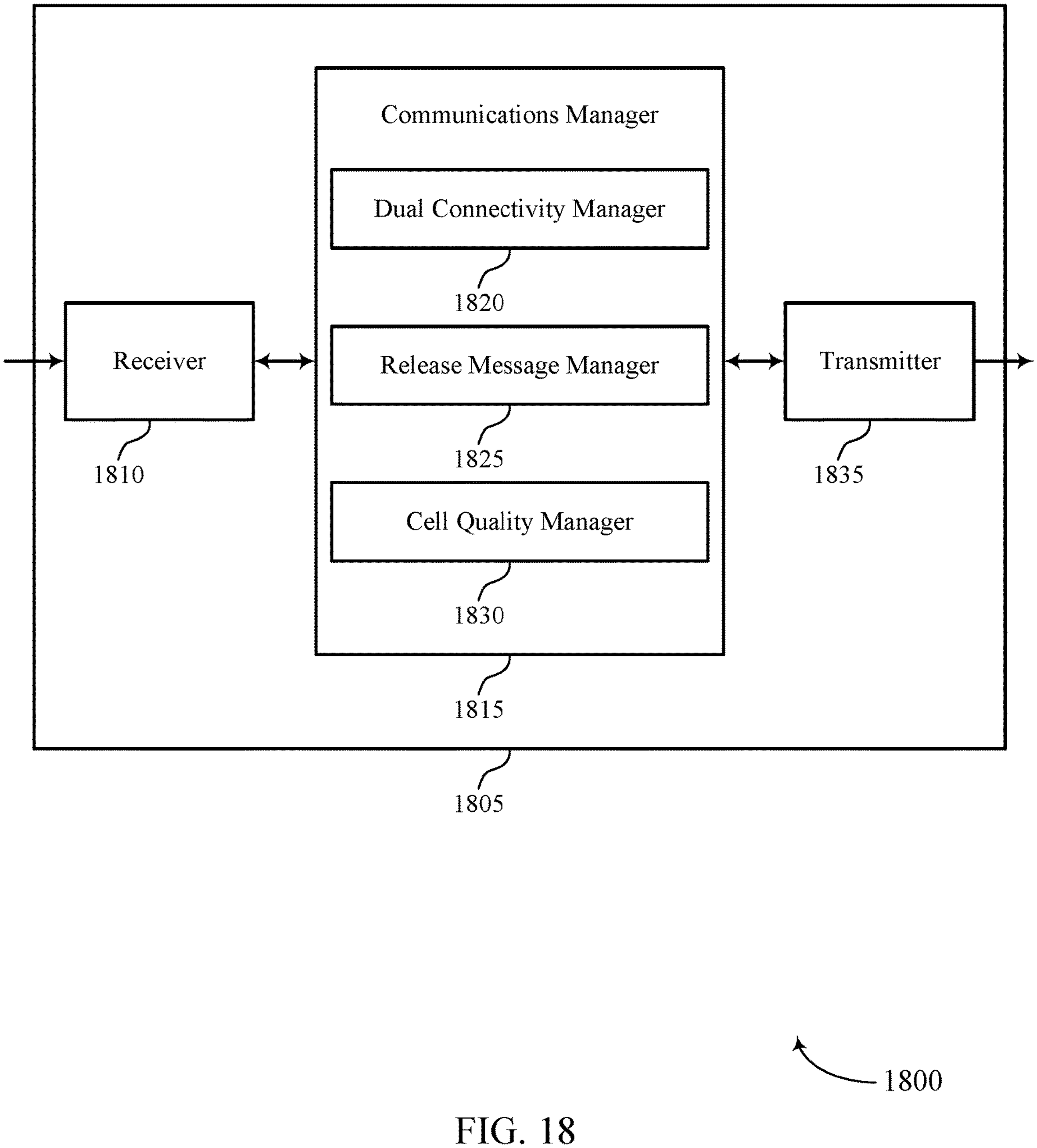

FIG. 18 shows a block diagram 1800 of a device 1805 that supports resume of dual connectivity from secondary node with delta configuration in accordance with aspects of the present disclosure. The device 1805 may be an example of aspects of a device 1705, or a base station 105 as described herein. The device 1805 may include a receiver 1810, a communications manager 1815, and a transmitter 1835. The device 1805 may also include a processor. Each of these components may be in communication with one another (e.g., via one or more buses).

The receiver 1810 may receive information such as packets, user data, or control information associated with various information channels (e.g., control channels, data channels, and information related to resume of dual connectivity from secondary node with delta configuration, etc.). Information may be passed on to other components of the device 1805. The receiver 1810 may be an example of aspects of the transceiver 2020 described with reference to FIG. 20. The receiver 1810 may utilize a single antenna or a set of antennas.

The communications manager 1815 may be an example of aspects of the communications manager 1715 as described herein. The communications manager 1815 may include a dual connectivity manager 1820, a release message manager 1825, and a cell quality manager 1830. The communications manager 1815 may be an example of aspects of the communications manager 2010 described herein.

The dual connectivity manager 1820 may communicate with a UE operating in a dual-connectivity mode in accordance with a first lower layer configuration. The release message manager 1825 may transmit a release message prompting the UE to transition from a connected state to an inactive state. The cell quality manager 1830 may receive a report of cell quality measurements performed by the UE in the inactive state, where the report is received as part of a procedure used by the UE to transition back to the connected state. The dual connectivity manager 1820 may transmit an indication of a second lower layer configuration for the UE to use for communicating in the dual-connectivity mode based on receiving the report, the second lower layer configuration being indicated as an offset of the first lower layer configuration.

The dual connectivity manager 1820 may communicate with a UE operating in a dual-connectivity mode in accordance with a first lower layer configuration. The cell quality manager 1830 may receive a report of cell quality measurements performed by the UE in an inactive state, where the indication is received as part of a procedure used by the UE to transition from the inactive state to a connected state. The dual connectivity manager 1820 may transmit an indication of a second lower layer configuration for the UE to use for communicating in the dual-connectivity mode based on receiving the cell quality measurements, the second lower layer configuration being indicated as an offset of the first lower layer configuration.

The transmitter 1835 may transmit signals generated by other components of the device 1805. In some examples, the transmitter 1835 may be collocated with a receiver 1810 in a transceiver module. For example, the transmitter 1835 may be an example of aspects of the transceiver 2020 described with reference to FIG. 20. The transmitter 1835 may utilize a single antenna or a set of antennas.

Figure 19:
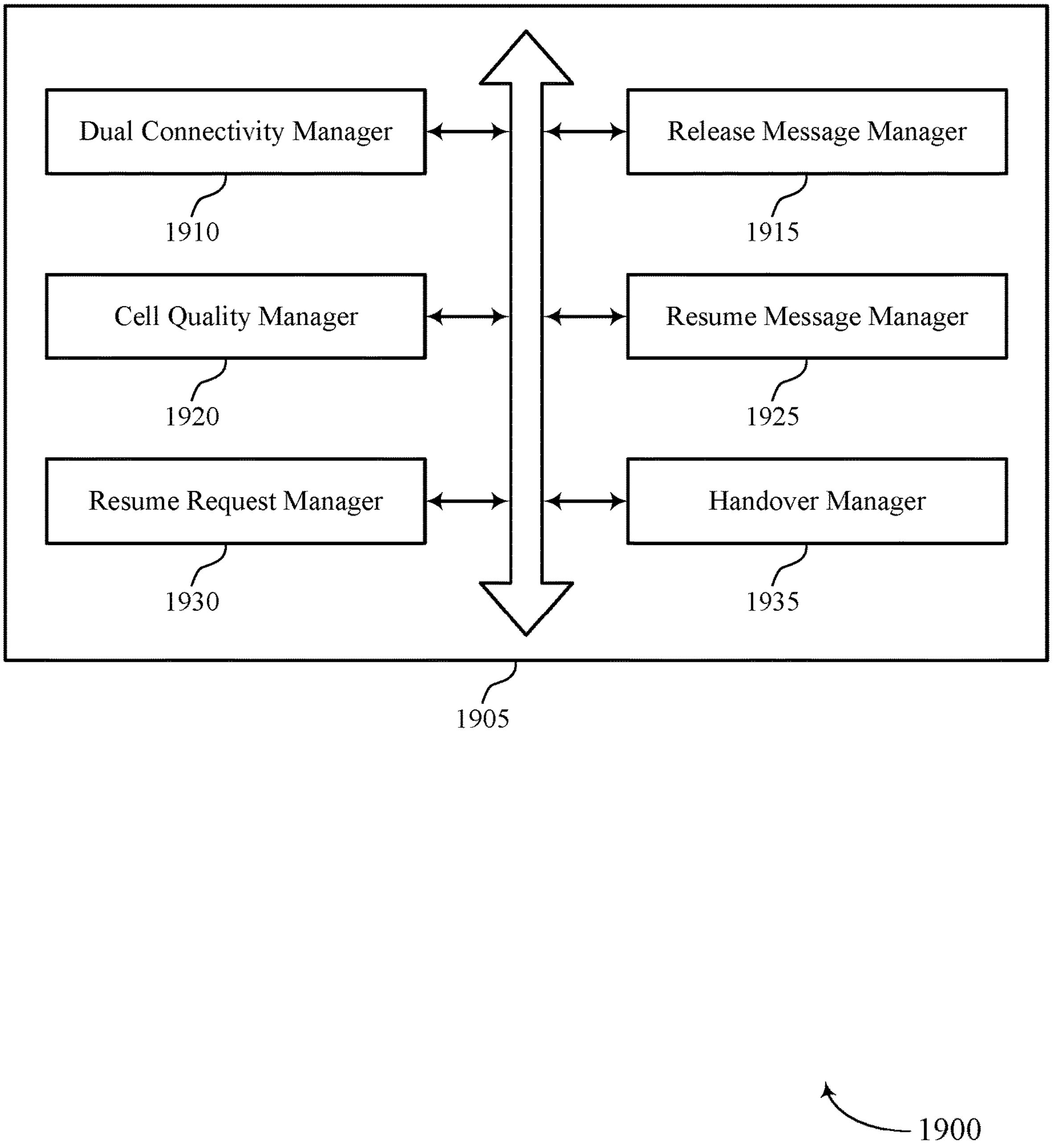
FIG. 19 shows a block diagram of a communications manager that supports resume of dual connectivity from secondary node with delta configuration in accordance with aspects of the present disclosure.

FIG. 19 shows a block diagram 1900 of a communications manager 1905 that supports resume of dual connectivity from secondary node with delta configuration in accordance with aspects of the present disclosure. The communications manager 1905 may be an example of aspects of a communications manager 1715, a communications manager 1815, or a communications manager 2010 described herein. The communications manager 1905 may include a dual connectivity manager 1910, a release message manager 1915, a cell quality manager 1920, a resume message manager 1925, a resume request manager 1930, and a handover manager 1935. Each of these modules may communicate, directly or indirectly, with one another (e.g., via one or more buses).

The dual connectivity manager 1910 may communicate with a UE operating in a dual-connectivity mode in accordance with a first lower layer configuration. In some examples, the dual connectivity manager 1910 may transmit an indication of a second lower layer configuration for the UE to use for communicating in the dual-connectivity mode based on receiving the report, the second lower layer configuration being indicated as an offset of the first lower layer configuration. In some examples, the dual connectivity manager 1910 may communicate with a UE operating in a dual-connectivity mode in accordance with a first lower layer configuration. In some examples, the dual connectivity manager 1910 may transmit an indication of a second lower layer configuration for the UE to use for communicating in the dual-connectivity mode based on receiving the cell quality measurements, the second lower layer configuration being indicated as an offset of the first lower layer configuration.

In some examples, the dual connectivity manager 1910 may transmit an indication of the offset of the first lower layer configuration. In some examples, the dual connectivity manager 1910 may transmit the indication of the second lower layer configuration to a secondary node on a split SRB1 for forwarding to the UE on the split SRB1. In some examples, the dual connectivity manager 1910 may transmit the indication of the second lower layer configuration to a secondary node in a configuration message for forwarding to the UE on an SRB3. In some examples, the dual connectivity manager 1910 may transmit an indication of the offset of the first lower layer configuration. In some examples, the dual connectivity manager 1910 may transmit, to a master node, a request for switching the secondary node or another node to a new master node and switching the master node to a new secondary node.

In some examples, the dual connectivity manager 1910 may receive, from the master node, a configuration for switching the secondary node or the other node to the new master node and switching the master node to the new secondary node. In some examples, the dual connectivity manager 1910 may determine the second lower layer configuration based on the reported cell quality measurements. In some examples, the dual connectivity manager 1910 may transmit the indication of the second lower layer configuration to the UE based on the determining. In some examples, the dual connectivity manager 1910 may receive the indication of the second lower layer configuration from a master node on a split SRB1. In some examples, the dual connectivity manager 1910 may forward the indication of the second lower layer configuration to the UE on the split SRB1.

In some examples, the dual connectivity manager 1910 may receive the indication of the second lower layer configuration from a master node in a configuration message. In some examples, the dual connectivity manager 1910 may transmit the indication of the second lower layer configuration to the UE on an SRB3. In some cases, the offset of the first lower layer configuration used to indicate the second lower layer configuration is based on the reported cell quality measurements. In some cases, the offset of the first lower layer configuration used to indicate the second lower layer configuration is based on the reported cell quality measurements. The release message manager 1915 may transmit a release message prompting the UE to transition from a connected state to an inactive state. In some examples, the release message manager 1915 may transmit, in the release message, an indication of the one or more thresholds, an indication of a first resume identifier for indicating that the cell quality measurements fail to satisfy the one or more thresholds, and an indication of a second resume identifier for indicating that the cell quality measurements satisfy the one or more thresholds.

The cell quality manager 1920 may receive a report of cell quality measurements performed by the UE in the inactive state, where the report is received as part of a procedure used by the UE to transition back to the connected state. In some examples, the cell quality manager 1920 may receive a report of cell quality measurements performed by the UE in an inactive state, where the indication is received as part of a procedure used by the UE to transition from the inactive state to a connected state. In some examples, the cell quality manager 1920 may receive an indication that cell quality measurements performed by the UE in the inactive state satisfy the one or more thresholds. In some examples, the cell quality manager 1920 may receive the report of the cell quality measurements from a secondary node on a split signaling radio bearer one (SRB1).

In some examples, the cell quality manager 1920 may receive the report of the cell quality measurements from a secondary node in a transfer control message, where the report is encoded with a radio resource control format of the master node. In some examples, the cell quality manager 1920 may receive an indication that cell quality measurements performed by the UE in the inactive state satisfy the one or more thresholds. In some examples, the cell quality manager 1920 may transmit the report of the cell quality measurements to a master node on a split signaling radio bearer one (SRB1) or in a transfer control message. In some examples, the cell quality manager 1920 may transmit the report of the cell quality measurements to a master node in a transfer control message, where the report is encoded with a radio resource control format of the master node.

The resume message manager 1925 may transmit a resume message indicating that the UE is to restore the first lower layer configuration as a baseline configuration for communicating in the dual-connectivity mode based on receiving the indication. In some examples, the resume message manager 1925 may transmit a resume message indicating that the UE is to restore the first lower layer configuration as a baseline configuration for communicating in the dual-connectivity mode based on receiving the indication. The resume request manager 1930 may receive a resume request message with the second resume identifier that indicates that the cell quality measurements satisfy the one or more thresholds. In some examples, the resume request manager 1930 may receive a resume request message with a resume ID that indicates that the cell quality measurements satisfy the one or more thresholds.

The handover manager 1935 may determine to perform a handover from the master node to another node based on the reported cell quality measurements performed by the UE. In some examples, the handover manager 1935 may transmit a handover request message to the other node to perform the handover from the master node to the other node, the handover request message including the first lower layer configuration. In some examples, the handover manager 1935 may determine to perform a handover from the master node to the other node based on the reported cell quality measurements performed by the UE. In some examples, the handover manager 1935 may transmit a handover request message to the other node to perform the handover from the master node to the other node, the handover request message including the first lower layer configuration.

Figure 20:
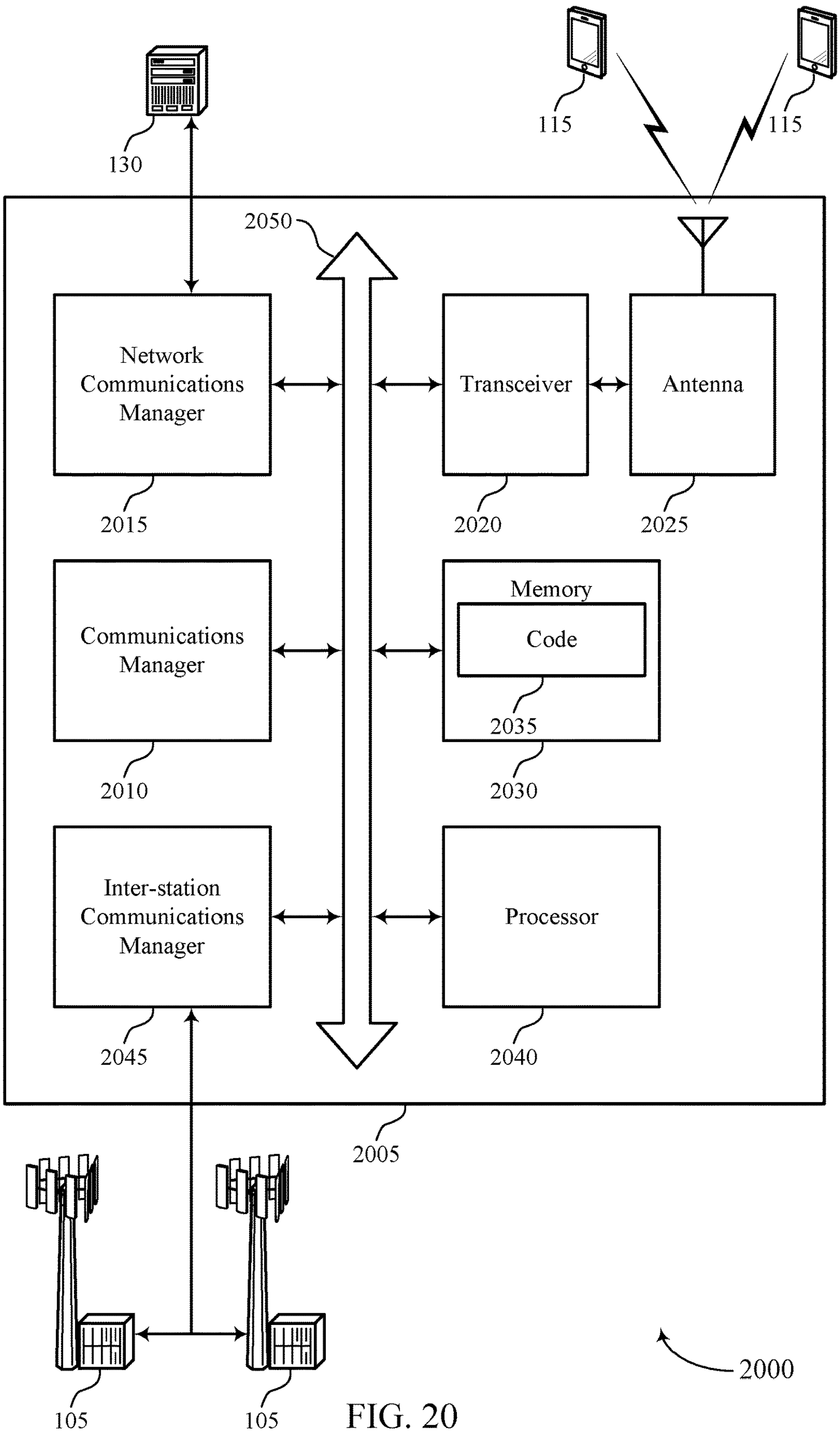
FIG. 20 shows a diagram of a system including a device that supports resume of dual connectivity from secondary node with delta configuration in accordance with aspects of the present disclosure.

FIG. 20 shows a diagram of a system 2000 including a device 2005 that supports resume of dual connectivity from secondary node with delta configuration in accordance with aspects of the present disclosure. The device 2005 may be an example of or include the components of device 1705, device 1805, or a base station 105 as described herein. The device 2005 may include components for bi-directional voice and data communications including components for transmitting and receiving communications, including a communications manager 2010, a network communications manager 2015, a transceiver 2020, an antenna 2025, memory 2030, a processor 2040, and an inter-station communications manager 2045. These components may be in electronic communication via one or more buses (e.g., bus 2050).

The communications manager 2010 may communicate with a UE operating in a dual-connectivity mode in accordance with a first lower layer configuration, transmit an indication of a second lower layer configuration for the UE to use for communicating in the dual-connectivity mode based on receiving the report, the second lower layer configuration being indicated as an offset of the first lower layer configuration, transmit a release message prompting the UE to transition from a connected state to an inactive state, and receive a report of cell quality measurements performed by the UE in the inactive state, where the report is received as part of a procedure used by the UE to transition back to the connected state.

The communications manager 2010 may also communicate with a UE operating in a dual-connectivity mode in accordance with a first lower layer configuration, transmit an indication of a second lower layer configuration for the UE to use for communicating in the dual-connectivity mode based on receiving the cell quality measurements, the second lower layer configuration being indicated as an offset of the first lower layer configuration, and receive a report of cell quality measurements performed by the UE in an inactive state, where the indication is received as part of a procedure used by the UE to transition from the inactive state to a connected state.

The network communications manager 2015 may manage communications with the core network (e.g., via one or more wired backhaul links). For example, the network communications manager 2015 may manage the transfer of data communications for client devices, such as one or more UEs 115.

The transceiver 2020 may communicate bi-directionally, via one or more antennas, wired, or wireless links as described above. For example, the transceiver 2020 may represent a wireless transceiver and may communicate bi-directionally with another wireless transceiver. The transceiver 2020 may also include a modem to modulate the packets and provide the modulated packets to the antennas for transmission, and to demodulate packets received from the antennas.

In some cases, the wireless device may include a single antenna 2025. However, in some cases the device may have more than one antenna 2025, which may be capable of concurrently transmitting or receiving multiple wireless transmissions.

The memory 2030 may include RAM, ROM, or a combination thereof. The memory 2030 may store computer-readable code 2035 including instructions that, when executed by a processor (e.g., the processor 2040) cause the device to perform various functions described herein. In some cases, the memory 2030 may contain, among other things, a BIOS which may control basic hardware or software operation such as the interaction with peripheral components or devices.

The processor 2040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2040 may be configured to operate a memory array using a memory controller. In some cases, a memory controller may be integrated into processor 2040. The processor 2040 may be configured to execute computer-readable instructions stored in a memory (e.g., the memory 2030) to cause the device 2005 to perform various functions (e.g., functions or tasks supporting resume of dual connectivity from secondary node with delta configuration).

The inter-station communications manager 2045 may manage communications with other base station 105, and may include a controller or scheduler for controlling communications with UEs 115 in cooperation with other base stations 105. For example, the inter-station communications manager 2045 may coordinate scheduling for transmissions to UEs 115 for various interference mitigation techniques such as beamforming or joint transmission. In some examples, the inter-station communications manager 2045 may provide an X2 interface within an LTE/LTE-A wireless communication network technology to provide communication between base stations 105.

The code 2035 may include instructions to implement aspects of the present disclosure, including instructions to support wireless communications. The code 2035 may be stored in a non-transitory computer-readable medium such as system memory or other type of memory. In some cases, the code 2035 may not be directly executable by the processor 2040 but may cause a computer (e.g., when compiled and executed) to perform functions described herein.

Figure 21:
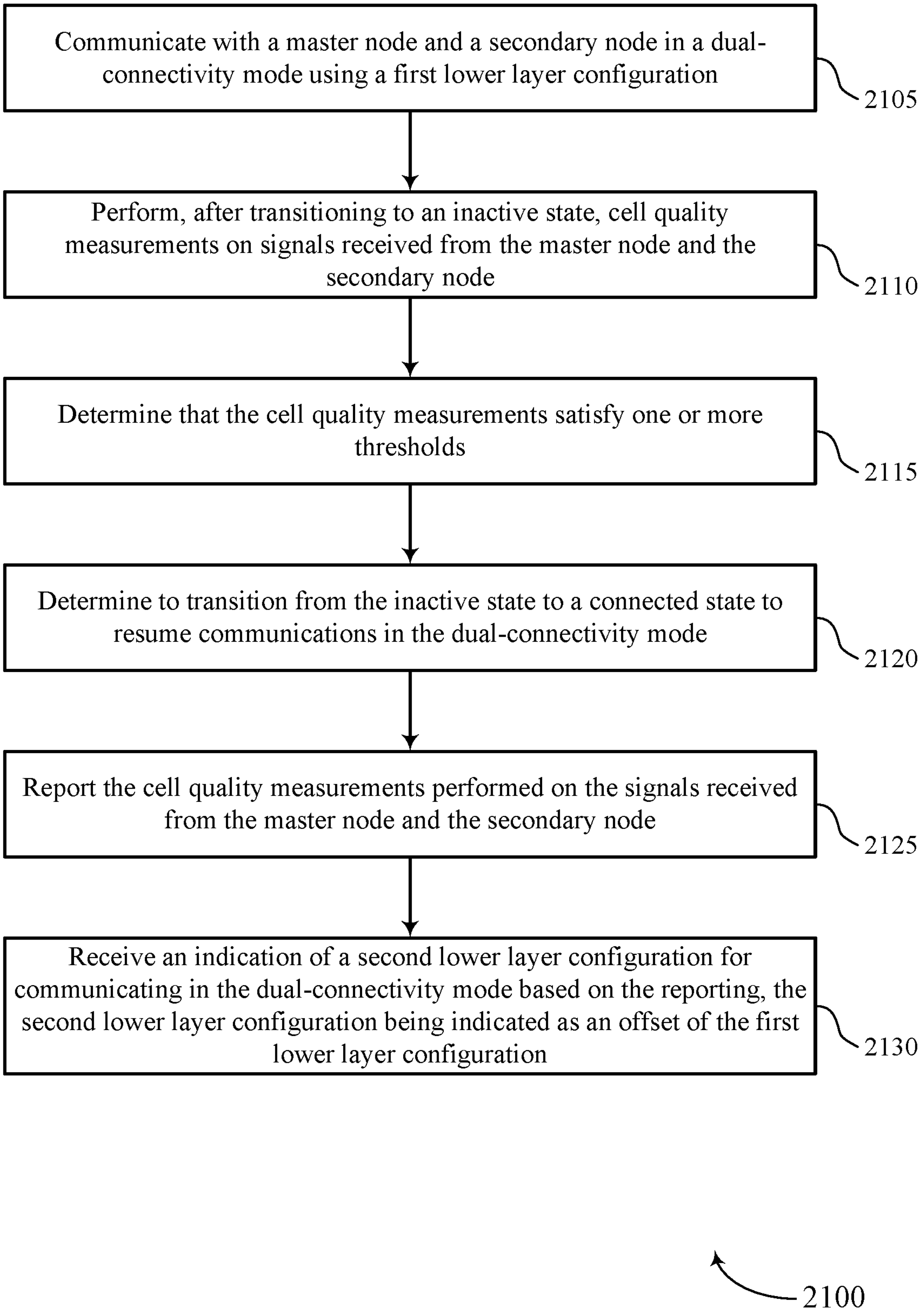
FIGS. 21 through 23 show flowcharts illustrating methods that support resume of dual connectivity from secondary node with delta configuration in accordance with aspects of the present disclosure.

FIG. 21 shows a flowchart illustrating a method 2100 that supports resume of dual connectivity from secondary node with delta configuration in accordance with aspects of the present disclosure. The operations of method 2100 may be implemented by a UE 115 or its components as described herein. For example, the operations of method 2100 may be performed by a communications manager as described with reference to FIGS. 13 through 16. In some examples, a UE may execute a set of instructions to control the functional elements of the UE to perform the functions described below. Additionally, or alternatively, a UE may perform aspects of the functions described below using special-purpose hardware.

At 2105, the UE may communicate with a master node and a secondary node in a dual-connectivity mode using a first lower layer configuration. The operations of 2105 may be performed according to the methods described herein. In some examples, aspects of the operations of 2105 may be performed by a dual connectivity manager as described with reference to FIGS. 13 through 16.

At 2110, the UE may perform, after transitioning to an inactive state, cell quality measurements on signals received from the master node and the secondary node. The operations of 2110 may be performed according to the methods described herein. In some examples, aspects of the operations of 2110 may be performed by a cell quality manager as described with reference to FIGS. 13 through 16.

At 2115, the UE may determine that the cell quality measurements satisfy one or more thresholds. The operations of 2115 may be performed according to the methods described herein. In some examples, aspects of the operations of 2115 may be performed by a cell quality manager as described with reference to FIGS. 13 through 16.

At 2120, the UE may determine to transition from the inactive state to a connected state to resume communications in the dual-connectivity mode. The operations of 2120 may be performed according to the methods described herein. In some examples, aspects of the operations of 2120 may be performed by a RRC state manager as described with reference to FIGS. 13 through 16.

At 2125, the UE may report the cell quality measurements performed on the signals received from the master node and the secondary node. The operations of 2125 may be performed according to the methods described herein. In some examples, aspects of the operations of 2125 may be performed by a measurement reporter as described with reference to FIGS. 13 through 16.

At 2130, the UE may receive an indication of a second lower layer configuration for communicating in the dual-connectivity mode based on the reporting, the second lower layer configuration being indicated as an offset of the first lower layer configuration. The operations of 2130 may be performed according to the methods described herein. In some examples, aspects of the operations of 2130 may be performed by a dual connectivity manager as described with reference to FIGS. 13 through 16.

Figure 22:
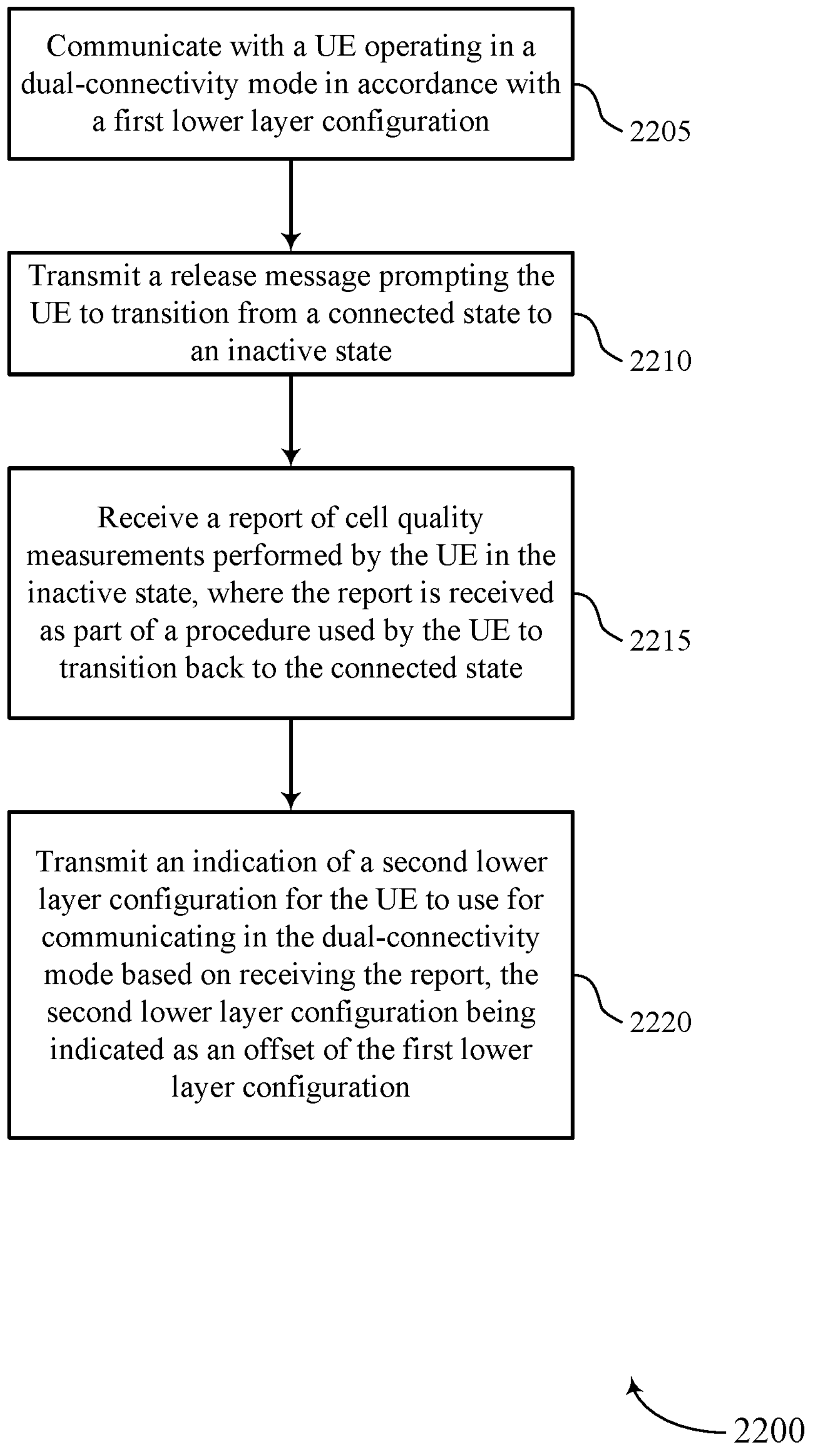

FIG. 22 shows a flowchart illustrating a method 2200 that supports resume of dual connectivity from secondary node with delta configuration in accordance with aspects of the present disclosure. The operations of method 2200 may be implemented by a base station 105 or its components as described herein. For example, the operations of method 2200 may be performed by a communications manager as described with reference to FIGS. 17 through 20. In some examples, a base station may execute a set of instructions to control the functional elements of the base station to perform the functions described below. Additionally or alternatively, a base station may perform aspects of the functions described below using special-purpose hardware.

At 2205, the base station may communicate with a UE operating in a dual-connectivity mode in accordance with a first lower layer configuration. The operations of 2205 may be performed according to the methods described herein. In some examples, aspects of the operations of 2205 may be performed by a dual connectivity manager as described with reference to FIGS. 17 through 20.

At 2210, the base station may transmit a release message prompting the UE to transition from a connected state to an inactive state. The operations of 2210 may be performed according to the methods described herein. In some examples, aspects of the operations of 2210 may be performed by a release message manager as described with reference to FIGS. 17 through 20.

At 2215, the base station may receive a report of cell quality measurements performed by the UE in the inactive state, where the report is received as part of a procedure used by the UE to transition back to the connected state. The operations of 2215 may be performed according to the methods described herein. In some examples, aspects of the operations of 2215 may be performed by a cell quality manager as described with reference to FIGS. 17 through 20.

At 2220, the base station may transmit an indication of a second lower layer configuration for the UE to use for communicating in the dual-connectivity mode based on receiving the report, the second lower layer configuration being indicated as an offset of the first lower layer configuration. The operations of 2220 may be performed according to the methods described herein. In some examples, aspects of the operations of 2220 may be performed by a dual connectivity manager as described with reference to FIGS. 17 through 20.

Figure 23:
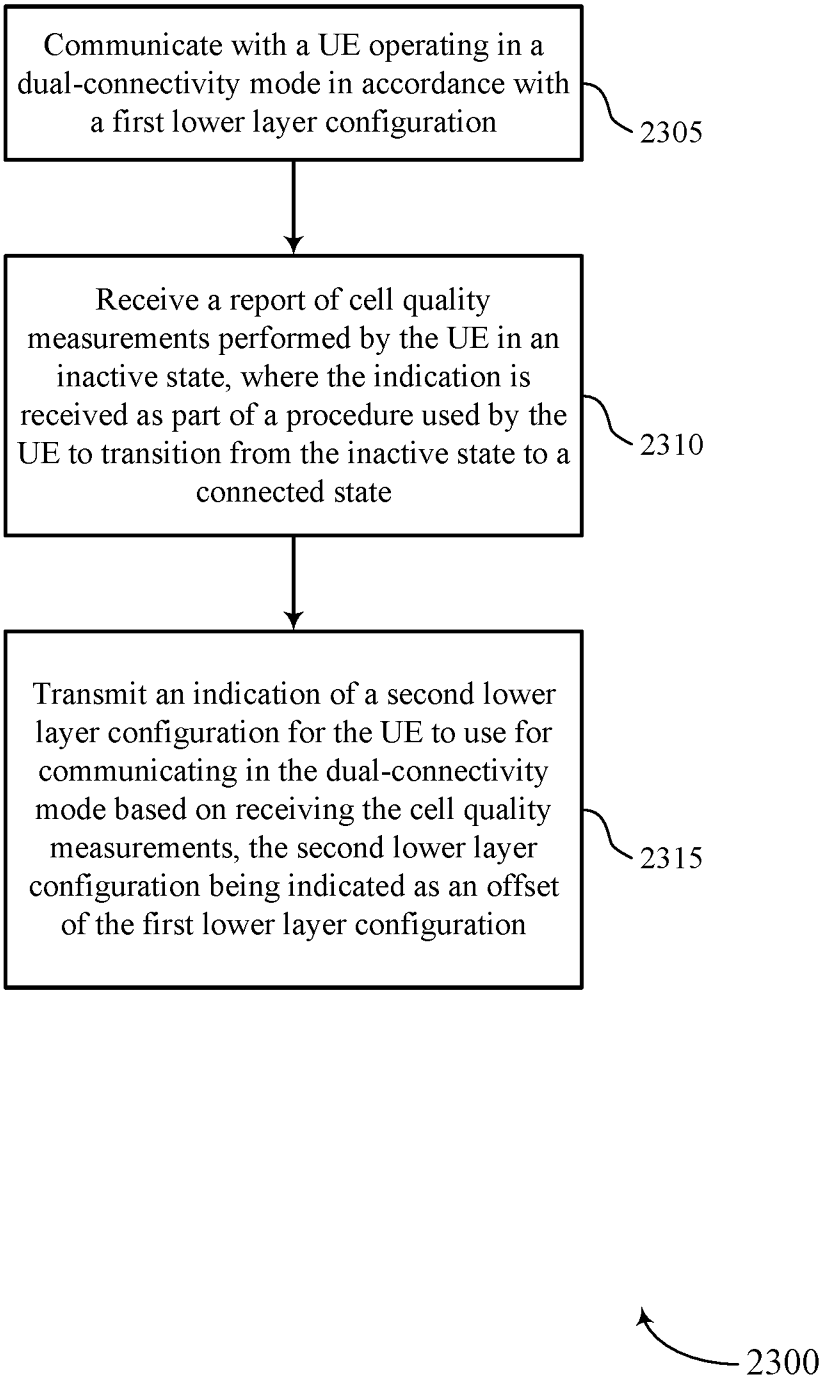

FIG. 23 shows a flowchart illustrating a method 2300 that supports resume of dual connectivity from secondary node with delta configuration in accordance with aspects of the present disclosure. The operations of method 2300 may be implemented by a base station 105 or its components as described herein. For example, the operations of method 2300 may be performed by a communications manager as described with reference to FIGS. 17 through 20. In some examples, a base station may execute a set of instructions to control the functional elements of the base station to perform the functions described below. Additionally, or alternatively, a base station may perform aspects of the functions described below using special-purpose hardware.

At 2305, the base station may communicate with a UE operating in a dual-connectivity mode in accordance with a first lower layer configuration. The operations of 2305 may be performed according to the methods described herein. In some examples, aspects of the operations of 2305 may be performed by a dual connectivity manager as described with reference to FIGS. 17 through 20.

At 2310, the base station may receive a report of cell quality measurements performed by the UE in an inactive state, where the indication is received as part of a procedure used by the UE to transition from the inactive state to a connected state. The operations of 2310 may be performed according to the methods described herein. In some examples, aspects of the operations of 2310 may be performed by a cell quality manager as described with reference to FIGS. 17 through 20.

At 2315, the base station may transmit an indication of a second lower layer configuration for the UE to use for communicating in the dual-connectivity mode based on receiving the cell quality measurements, the second lower layer configuration being indicated as an offset of the first lower layer configuration. The operations of 2315 may be performed according to the methods described herein. In some examples, aspects of the operations of 2315 may be performed by a dual connectivity manager as described with reference to FIGS. 17 through 20.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure:

Example 1: A method for wireless communication at a UE, comprising: communicating with a master node and a secondary node in a dual-connectivity mode using a first lower layer configuration; performing, after transitioning to an inactive state, cell quality measurements on signals received from the master node and the secondary node; determining that the cell quality measurements satisfy one or more thresholds; determining to transition from the inactive state to a connected state to resume communications in the dual-connectivity mode; reporting the cell quality measurements performed on the signals received from the master node and the secondary node; and receiving an indication of a second lower layer configuration for communicating in the dual-connectivity mode based at least in part on the reporting, the second lower layer configuration being indicated as an offset of the first lower layer configuration.

Example 2: The method of example 1, wherein receiving the indication of the second lower layer configuration for communicating in the dual-connectivity mode comprises: receiving an indication of the offset of the first lower layer configuration; and determining the second lower layer configuration based at least in part on the first lower layer configuration and the offset of the first lower layer configuration.

Example 3: The method of example 1 or 2, further comprising: receiving a resume message indicating that the UE is to restore the first lower layer configuration for communicating in the dual-connectivity mode; and restoring the first lower layer configuration as a baseline configuration for communicating in the dual-connectivity mode.

Example 4: The method of any one of examples 1 through 3, wherein the offset of the first lower layer configuration used to indicate the second lower layer configuration is based at least in part on the reported cell quality measurements.

Example 5: The method of any one of examples 1 through 4, further comprising: receiving a release message prompting the UE to transition to the inactive state, wherein the release message indicates the one or more thresholds, a first resume identifier for indicating that the cell quality measurements fail to satisfy the one or more thresholds, and a second resume identifier for indicating that the cell quality measurements satisfy the one or more thresholds.

Example 6: The method of any one of examples 1 through 5, further comprising: transmitting, to the master node, a resume request message with the second resume identifier that indicates that the cell quality measurements satisfy the one or more thresholds, and wherein the indication of the second lower layer configuration is received from the master node.

Example 7: The method of any one of examples 1 through 5, further comprising: transmitting, to the secondary node, a resume request message with the second resume identifier that indicates that the cell quality measurements satisfy the one or more thresholds, and wherein the indication of the second lower layer configuration is received from the secondary node.

Example 8: The method of any one of examples 1 through 5, further comprising: transmitting, to the secondary node, a resume request message with the second resume identifier that indicates that the cell quality measurements satisfy the one or more thresholds; and receiving an indication to switch the secondary node to a new master node and the master node to a new secondary node for subsequent communications in the dual-connectivity mode.

Example 9: The method of any one of examples 1 through 5, further comprising: transmitting, to the secondary node, a resume request message with the second resume identifier that indicates that the cell quality measurements satisfy the one or more thresholds; performing additional cell quality measurements on signals received from another node; reporting the additional cell quality measurements performed on the signals received from the other node to the secondary node; and receiving an indication to add the other node as a new secondary node or as a new master node based at least in part on reporting the additional cell quality measurements.

Example 10: The method of any one of examples 1 through 9, wherein: the one or more thresholds comprise reference signal received power thresholds, reference signal received quality thresholds, or both; and the cell quality measurements comprise reference signal received power measurements, reference signal received quality measurements, or both.

Example 11: The method of any one of examples 1 through 10, wherein the second lower layer configuration comprises a master cell group and secondary cell group configuration and an indication to activate a secondary cell group.

Example 12: The method of any one of examples 1 through 11, wherein the one or more thresholds comprise a single threshold for both the master node and the secondary node or separate thresholds for the master node and the secondary node.

Example 13: A method for wireless communication at a master node, comprising: communicating with a UE operating in a dual-connectivity mode in accordance with a first lower layer configuration; transmitting a release message prompting the UE to transition from a connected state to an inactive state; receiving a report of cell quality measurements performed by the UE in the inactive state, wherein the report is received as part of a procedure used by the UE to transition back to the connected state; and transmitting an indication of a second lower layer configuration for the UE to use for communicating in the dual-connectivity mode based at least in part on receiving the report, the second lower layer configuration being indicated as an offset of the first lower layer configuration.

Example 14: The method of example 13: wherein transmitting the indication of the second lower layer configuration comprises: transmitting an indication of the offset of the first lower layer configuration.

Example 15: The method of example 13 or 14, further comprising: receiving an indication that the cell quality measurements performed by the UE in the inactive state satisfy the one or more thresholds; and transmitting a resume message indicating that the UE is to restore the first lower layer configuration as a baseline configuration for communicating in the dual-connectivity mode based at least in part on receiving the indication.

Example 16: The method of any one of examples 13 through 15, further comprising: transmitting, in the release message, an indication of the one or more thresholds, an indication of a first resume identifier for indicating that the cell quality measurements fail to satisfy the one or more thresholds, and an indication of a second resume identifier for indicating that the cell quality measurements satisfy the one or more thresholds.

Example 17: The method of example 15 or 16: wherein receiving the indication that the cell quality measurements satisfy the one or more thresholds comprises: receiving a resume request message with the second resume identifier that indicates that the cell quality measurements satisfy the one or more thresholds.

Example 18: The method of any one of examples 13 through 17, wherein the offset of the first lower layer configuration used to indicate the second lower layer configuration is based at least in part on the reported cell quality measurements.

Example 19: The method of any one of examples 13 through 18, wherein transmitting the indication of the second lower layer configuration comprises: transmitting the indication of the second lower layer configuration to a secondary node on a split SRB1 for forwarding to the UE on the split SRB1.

Example 20: The method of any one of examples 13 through 18, wherein transmitting the indication of the second lower layer configuration comprises: transmitting the indication of the second lower layer configuration to a secondary node in a configuration message for forwarding to the UE on an SRB3.

Example 21: The method of any one of examples 13 through 20, wherein receiving the report of the cell quality measurements comprises: receiving the report of the cell quality measurements from a secondary node on a split SRB1.

Example 22: The method of any one of examples 13 through 20, wherein receiving the report of the cell quality measurements comprises: receiving the report of the cell quality measurements from a secondary node in a transfer control message, wherein the report is encoded with a radio resource control format of the master node.

Example 23: The method of any one of examples 13 through 22, further comprising: determining to perform a handover from the master node to another node based at least in part on the reported cell quality measurements performed by the UE; and transmitting a handover request message to the other node to perform the handover from the master node to the other node, the handover request message comprising the first lower layer configuration.

Example 24: A method for wireless communication at a secondary node, comprising: communicating with a user equipment (UE) operating in a dual-connectivity mode in accordance with a first lower layer configuration; receiving a report of cell quality measurements performed by the UE in an inactive state, wherein the indication is received as part of a procedure used by the UE to transition from the inactive state to a connected state; and transmitting an indication of a second lower layer configuration for the UE to use for communicating in the dual-connectivity mode based at least in part on receiving the cell quality measurements, the second lower layer configuration being indicated as an offset of the first lower layer configuration.

Example 25: The method of example 24, wherein transmitting the indication of the second lower layer configuration comprises: transmitting an indication of the offset of the first lower layer configuration.

Example 26: The method of example 24 or 25, further comprising: receiving an indication that cell quality measurements performed by the UE in the inactive state satisfy the one or more thresholds; and transmitting a resume message indicating that the UE is to restore the first lower layer configuration as a baseline configuration for communicating in the dual-connectivity mode based at least in part on receiving the indication.

Example 27: The method of example 26, wherein receiving the indication that the cell quality measurements satisfy the one or more thresholds comprises: receiving a resume request message with a resume identifier that indicates that the cell quality measurements satisfy the one or more thresholds.

Example 28: The method of any one of examples 24 through 27, wherein the offset of the first lower layer configuration used to indicate the second lower layer configuration is based at least in part on the reported cell quality measurements.

Example 29: The method of any one of examples 24 through 28, further comprising: transmitting, to a master node, a request for switching the secondary node or another node to a new master node and switching the master node to a new secondary node; and receiving, from the master node, a configuration for switching the secondary node or the other node to the new master node and switching the master node to the new secondary node.

Example 30: The method of example 29, wherein transmitting the indication of the second lower layer configuration comprises: determining the second lower layer configuration based at least in part on the reported cell quality measurements; and transmitting the indication of the second lower layer configuration to the UE based at least in part on the determining.

Example 31: The method of example 29, further comprising: determining to perform a handover from the master node to the other node based at least in part on the reported cell quality measurements performed by the UE; and transmitting a handover request message to the other node to perform the handover from the master node to the other node, the handover request message comprising the first lower layer configuration.

Example 32: The method of any one of examples 24 through 31, wherein transmitting the indication of the second lower layer configuration comprises: receiving the indication of the second lower layer configuration from a master node on a split SRB1; and forwarding the indication of the second lower layer configuration to the UE on the split SRB1.

Example 33: The method of any one of examples 24 through 31, wherein transmitting the indication of the second lower layer configuration comprises: receiving the indication of the second lower layer configuration from a master node in a configuration message; and transmitting the indication of the second lower layer configuration to the UE on an SRB3.

Example 34: The method of any one of examples 24 through 33, further comprising: transmitting the report of the cell quality measurements to a master node on a split SRB1 or in a transfer control message.

Example 35: The method of any one of examples 24 through 34, further comprising: transmitting the report of the cell quality measurements to a master node in a transfer control message, wherein the report is encoded with a radio resource control format of the master node.

Example 36: An apparatus comprising at least one means for performing a method of any of examples 1 to 12.

Example 37: An apparatus comprising at least one means for performing a method of any of examples 13 to 23.

Example 38: An apparatus comprising at least one means for performing a method of any of examples 24 to 35.

Example 39: An apparatus for wireless communications comprising a processor; memory coupled with the processor; and instructions stored in the memory and executable by the processor to cause the apparatus to perform a method of any of examples 1 to 12.

Example 40: An apparatus for wireless communications comprising a processor; memory coupled with the processor; and instructions stored in the memory and executable by the processor to cause the apparatus to perform a method of any of examples 13 to 23.

Example 41: An apparatus for wireless communications comprising a processor; memory coupled with the processor; and instructions stored in the memory and executable by the processor to cause the apparatus to perform a method of any of examples 24 to 35.

Example 42: A non-transitory computer-readable medium storing code for wireless communications, the code comprising instructions executable by a processor to perform a method of any of examples 1 to 12.

Example 43: A non-transitory computer-readable medium storing code for wireless communications, the code comprising instructions executable by a processor to perform a method of any of examples 13 to 23.

Example 44: A non-transitory computer-readable medium storing code for wireless communications, the code comprising instructions executable by a processor to perform a method of any of examples 24 to 35.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
communicating with a master node and a secondary node in a dual-connectivity mode using a first lower layer configuration;
performing, after transitioning to an inactive state, cell quality measurements on signals received from the master node and the secondary node;
determining that the cell quality measurements satisfy one or more thresholds;
determining to transition from the inactive state to a connected state to resume communications in the dual-connectivity mode;
reporting the cell quality measurements performed on the signals received from the master node and the secondary node; and
receiving an indication of a second lower layer configuration for communicating in the dual-connectivity mode based at least in part on the reporting, the second lower layer configuration being indicated as an offset of the first lower layer configuration.

2. The method of claim 1, wherein receiving the indication of the second lower layer configuration for communicating in the dual-connectivity mode comprises:
receiving an indication of the offset of the first lower layer configuration; and
determining the second lower layer configuration based at least in part on the first lower layer configuration and the offset of the first lower layer configuration.

3. The method of claim 1, further comprising:
receiving a resume message indicating that the UE is to restore the first lower layer configuration for communicating in the dual-connectivity mode; and
restoring the first lower layer configuration as a baseline configuration for communicating in the dual-connectivity mode.

4. The method of claim 1, wherein the offset of the first lower layer configuration used to indicate the second lower layer configuration is based at least in part on the reported cell quality measurements.

5. The method of claim 1, further comprising:
receiving a release message prompting the UE to transition to the inactive state, wherein the release message indicates the one or more thresholds, a first resume identifier for indicating that the cell quality measurements fail to satisfy the one or more thresholds, and a second resume identifier for indicating that the cell quality measurements satisfy the one or more thresholds.

6. The method of claim 5, further comprising:
transmitting, to the master node, a resume request message with the second resume identifier that indicates that the cell quality measurements satisfy the one or more thresholds, and wherein the indication of the second lower layer configuration is received from the master node.

7. The method of claim 5, further comprising:
transmitting, to the secondary node, a resume request message with the second resume identifier that indicates that the cell quality measurements satisfy the one or more thresholds, and wherein the indication of the second lower layer configuration is received from the secondary node.

8. The method of claim 5, further comprising:
transmitting, to the secondary node, a resume request message with the second resume identifier that indicates that the cell quality measurements satisfy the one or more thresholds; and
receiving an indication to switch the secondary node to a new master node and the master node to a new secondary node for subsequent communications in the dual-connectivity mode.

9. The method of claim 5, further comprising:
transmitting, to the secondary node, a resume request message with the second resume identifier that indicates that the cell quality measurements satisfy the one or more thresholds;
performing additional cell quality measurements on signals received from another node;
reporting the additional cell quality measurements performed on the signals received from the other node to the secondary node; and
receiving an indication to add the other node as a new secondary node or as a new master node based at least in part on reporting the additional cell quality measurements.

10. The method of claim 1, wherein:
the one or more thresholds comprise reference signal received power thresholds, reference signal received quality thresholds, or both; and
the cell quality measurements comprise reference signal received power measurements, reference signal received quality measurements, or both.

11. The method of claim 1, wherein the second lower layer configuration comprises a master cell group and secondary cell group configuration and an indication to activate a secondary cell group.

12. A method for wireless communication at a master node, comprising:
communicating with a user equipment (UE) operating in a dual-connectivity mode in accordance with a first lower layer configuration;
transmitting a release message prompting the UE to transition from a connected state to an inactive state;
receiving a report of cell quality measurements performed by the UE in the inactive state, wherein the report is received as part of a procedure used by the UE to transition back to the connected state; and
transmitting an indication of a second lower layer configuration for the UE to use for communicating in the dual-connectivity mode based at least in part on receiving the report, the second lower layer configuration being indicated as an offset of the first lower layer configuration.

13. The method of claim 12, wherein transmitting the indication of the second lower layer configuration comprises:
transmitting an indication of the offset of the first lower layer configuration.

14. The method of claim 12, further comprising:
receiving an indication that the cell quality measurements performed by the UE in the inactive state satisfy the one or more thresholds; and
transmitting a resume message indicating that the UE is to restore the first lower layer configuration as a baseline configuration for communicating in the dual-connectivity mode based at least in part on receiving the indication.

15. The method of claim 14, further comprising:

transmitting, in the release message, an indication of the one or more thresholds, an indication of a first resume identifier for indicating that the cell quality measurements fail to satisfy the one or more thresholds, and an indication of a second resume identifier for indicating that the cell quality measurements satisfy the one or more thresholds.

16. The method of claim 15, wherein receiving the indication that the cell quality measurements satisfy the one or more thresholds comprises:

receiving a resume request message with the second resume identifier that indicates that the cell quality measurements satisfy the one or more thresholds.

17. The method of claim 12, wherein the offset of the first lower layer configuration used to indicate the second lower layer configuration is based at least in part on the reported cell quality measurements.

18. The method of claim 12, wherein transmitting the indication of the second lower layer configuration comprises:

transmitting the indication of the second lower layer configuration to a secondary node on a split signaling radio bearer one (SRB1) for forwarding to the UE on the split SRB1.

19. The method of claim 12, wherein transmitting the indication of the second lower layer configuration comprises:

transmitting the indication of the second lower layer configuration to a secondary node in a configuration message for forwarding to the UE on a signaling radio bearer three (SRB3).

20. The method of claim 12, wherein receiving the report of the cell quality measurements comprises:

receiving the report of the cell quality measurements from a secondary node on a split signaling radio bearer one (SRB1).

21. The method of claim 12, wherein receiving the report of the cell quality measurements comprises:

receiving the report of the cell quality measurements from a secondary node in a transfer control message, wherein the report is encoded with a radio resource control format of the master node.

22. The method of claim 12, further comprising:

determining to perform a handover from the master node to another node based at least in part on the reported cell quality measurements performed by the UE; and transmitting a handover request message to the other node to perform the handover from the master node to the other node, the handover request message comprising the first lower layer configuration.

23. An apparatus for wireless communication at a user equipment (UE), comprising:

a processor, memory coupled with the processor; and instructions stored in the memory and executable by the processor to cause the apparatus to:

communicate with a master node and a secondary node in a dual-connectivity mode using a first lower layer configuration;

perform, after transitioning to an inactive state, cell quality measurements on signals received from the master node and the secondary node;

determine that the cell quality measurements satisfy one or more thresholds;

determine to transition from the inactive state to a connected state to resume communications in the dual-connectivity mode;

report the cell quality measurements performed on the signals received from the master node and the secondary node; and receive an indication of a second lower layer configuration for communicating in the dual-connectivity mode based at least in part on the reporting, the second lower layer configuration being indicated as an offset of the first lower layer configuration.

24. The apparatus of claim 23, wherein the instructions to receive the indication of the second lower layer configuration for communicating in the dual-connectivity mode are executable by the processor to cause the apparatus to:

receive an indication of the offset of the first lower layer configuration; and determine the second lower layer configuration based at least in part on the first lower layer configuration and the offset of the first lower layer configuration.

25. The apparatus of claim 23, wherein the instructions are further executable by the processor to cause the apparatus to:

receive a resume message indicating that the UE is to restore the first lower layer configuration for communicating in the dual-connectivity mode; and restore the first lower layer configuration as a baseline configuration for communicating in the dual-connectivity mode.

26. The apparatus of claim 23, wherein the offset of the first lower layer configuration used to indicate the second lower layer configuration is based at least in part on the reported cell quality measurements.

27. The apparatus of claim 23, wherein the instructions are further executable by the processor to cause the apparatus to:

receive a release message prompting the UE to transition to the inactive state, wherein the release message indicates the one or more thresholds, a first resume identifier for indicating that the cell quality measurements fail to satisfy the one or more thresholds, and a second resume identifier for indicating that the cell quality measurements satisfy the one or more thresholds.

28. An apparatus for wireless communication at a master node, comprising:

a processor, memory coupled with the processor; and instructions stored in the memory and executable by the processor to cause the apparatus to:

communicate with a user equipment (UE) operating in a dual-connectivity mode in accordance with a first lower layer configuration;

transmit a release message prompting the UE to transition from a connected state to an inactive state;

receive a report of cell quality measurements performed by the UE in the inactive state, wherein the report is received as part of a procedure used by the UE to transition back to the connected state; and transmit an indication of a second lower layer configuration for the UE to use for communicating in the dual-connectivity mode based at least in part on receiving the report, the second lower layer configuration being indicated as an offset of the first lower layer configuration.

29. The apparatus of claim 28, wherein the instructions to transmit the indication of the second lower layer configuration are executable by the processor to cause the apparatus to:

transmit an indication of the offset of the first lower layer configuration.

30. The apparatus of claim 28, wherein the instructions are further executable by the processor to cause the apparatus to:

receive an indication that cell quality measurements performed by the UE in the inactive state satisfy the one or more thresholds; and transmit a resume message indicating that the UE is to restore the first lower layer configuration as a baseline configuration for communicating in the dual-connectivity mode based at least in part on receiving the indication.

* * * * *